US007510251B2

(12) United States Patent
Wanibe et al.

(10) Patent No.: US 7,510,251 B2

(45) Date of Patent: Mar. 31, 2009

(54) LIQUID CONTAINER AND CIRCUIT BOARD FOR LIQUID CONTAINER

(75) Inventors: Akihisa Wanibe, Nagano (JP); Minoru Yajima, Nagano (JP); Akira Ichihashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 467 days.

(21) Appl. No.: 11/393,309

(22) Filed: Mar. 30, 2006

(65) Prior Publication Data

US 2006/0250426 A1 Nov. 9, 2006

(30) Foreign Application Priority Data

| | | |
|---|---|---|
| Mar. 31, 2005 | (JP) | P2005-103265 |
| May 12, 2005 | (JP) | P2005-140437 |
| Dec. 12, 2005 | (JP) | P2005-357275 |
| Dec. 12, 2005 | (JP) | P2005-357276 |
| Dec. 12, 2005 | (JP) | P2005-357277 |
| Dec. 12, 2005 | (JP) | P2005-357278 |

(51) Int. Cl.

*B41J 2/195* (2006.01)
*B41J 2/175* (2006.01)
*G01F 23/28* (2006.01)

(52) U.S. Cl. ........................... 347/7; 347/86; 73/290 V

(58) Field of Classification Search ..................... 347/7, 347/19, 85, 86, 87; 73/64.53, 290 V; 29/25.35; 702/55

See application file for complete search history.

(56) References Cited

U.S. PATENT DOCUMENTS

| | | | | |
|---|---|---|---|---|
| 5,188,536 | A | 2/1993 | Ganthier et al. | |
| 5,466,161 | A | 11/1995 | Yumibe et al. | |
| 5,697,248 | A * | 12/1997 | Brown | 73/290 V |
| 6,302,527 | B1 * | 10/2001 | Walker | 347/50 |
| 6,312,074 | B1 * | 11/2001 | Walker | 347/7 |
| 6,536,861 | B1 | 3/2003 | Usui et al. | |
| 6,802,602 | B2 * | 10/2004 | Sakai et al. | 347/86 |
| 6,994,415 | B2 | 2/2006 | Asauchi et al. | |
| 2002/0012015 | A1 | 1/2002 | Tsukada et al. | |
| 2002/0135623 | A1 | 9/2002 | Tsukada et al. | |
| 2003/0140694 | A1 | 7/2003 | Usui et al. | |
| 2004/0027432 | A1 | 2/2004 | Childers et al. | |
| 2004/0056910 | A1 | 3/2004 | Usui et al. | |

FOREIGN PATENT DOCUMENTS

| | | | |
|---|---|---|---|
| CN | 1274647 | A | 11/2000 |
| CN | 1478658 | A | 3/2004 |
| EP | 0710569 | A | 5/1996 |
| EP | 1053877 | A | 11/2000 |

(Continued)

OTHER PUBLICATIONS

Combined Search and Examination Report for U.K. patent appln. No. GB0606405.9 (Jul. 13, 2006).

Search Report and Written Opinion for International patent appln. No. PCT/JP2006/307280 (Aug. 16, 2006).

*Primary Examiner*—Anh T. N. Vo

(74) *Attorney, Agent, or Firm*—Stroock & Stroock & Lavan LLP

(57) ABSTRACT

A liquid container (21) has: an outer electrode (32*d*) contactable with an electrode (91*c*) of a liquid consuming apparatus; an electrode supporting member (32,33) which supports the outer electrode (32*d*) and is fixed to a container body (31); a piezoelectric sensor unit (35) which is discrete from the electrode supporting member (32,33), which is attached to the container body (31) for detecting liquid existing in a part of a liquid supply path and which includes a piezoelectric element (41) having an electrode (41*a*); and a connector (45) which has an elasticity and which electrically connects the outer electrode (32*d*) to the electrode (41*a*) of the piezoelectric element (41).

62 Claims, 23 Drawing Sheets

FOREIGN PATENT DOCUMENTS

| | | | |
|---|---|---|---|
| EP | 1199178 | A | 4/2002 |
| EP | 1 211 754 | A2 | 6/2002 |
| EP | 1462263 | A | 9/2004 |
| GB | 2 421 007 | A | 6/2006 |
| JP | 2001-146024 | A | 5/2001 |
| JP | 2001-146030 | A | 5/2001 |
| JP | 2001-147146 | A | 5/2001 |
| JP | 2002-337358 | | 11/2002 |
| JP | 2004-106382 | | 4/2004 |
| JP | 2005-066902 | | 3/2005 |

* cited by examiner

FIG. 17 (B)
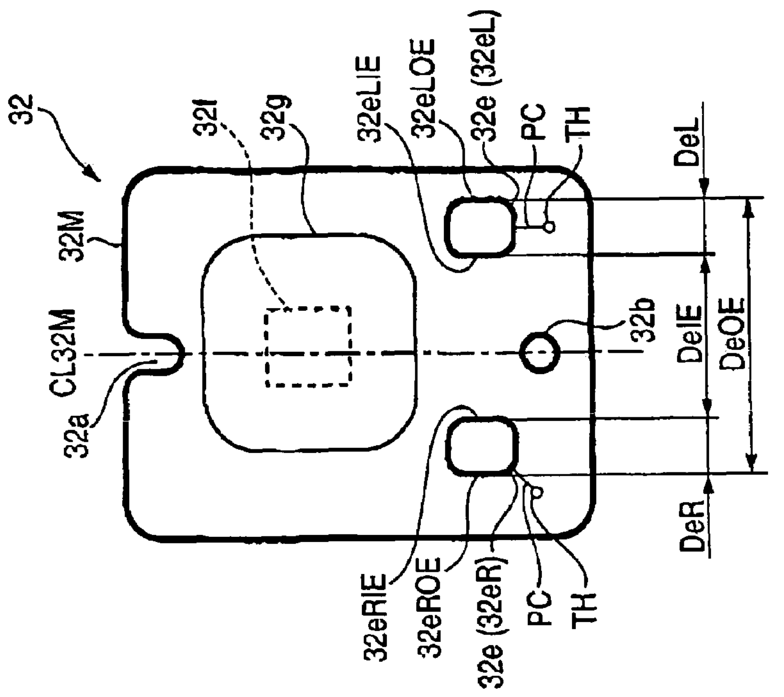
FIG. 17 (A)
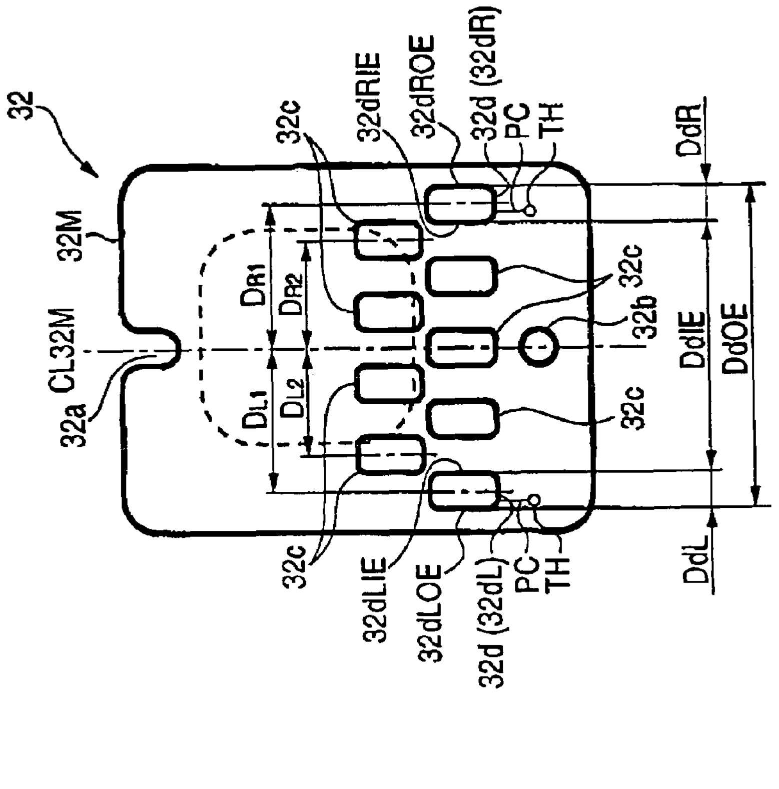
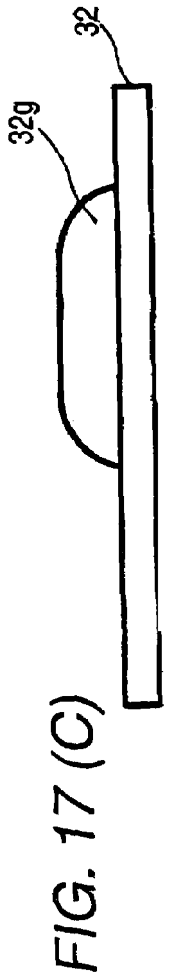
FIG. 17 (C)

LIQUID CONTAINER AND CIRCUIT BOARD FOR LIQUID CONTAINER

TECHNICAL FIELD

The present invention relates to a liquid container to be applied to a liquid ejecting apparatus (liquid consuming apparatus) such as a recording apparatus of an ink jet type. The present invention also relates to a circuit board for the liquid container.

BACKGROUND ART

Typical examples of a liquid ejecting apparatus (liquid consuming apparatus) include a recording apparatus of an ink jet type which comprises a recording head of an ink jet type for recording an image. Examples of other liquid ejecting apparatuses include an apparatus comprising a coloring material ejecting head to be used for manufacturing a color filter of a liquid crystal display, an apparatus comprising an electrode material (conducting paste) ejecting head to be used for forming an electrode of an organic EL display or a field emission display (FED), an apparatus comprising a bioorganism ejecting head to be used for manufacturing a biochip, and an apparatus comprising a sample ejecting head to be a precision pipette.

The recording apparatus of the ink jet type according to the typical example of the liquid ejecting apparatus has such a structure that an ink jet recording head having pressure generating means for pressurizing a pressure generating chamber and a nozzle opening for ejecting pressurized ink as an ink droplet is mounted on a carriage and the ink in an ink container is smoothly supplied to the recording head through a passage, and printing can be thus carried out continuously. The ink container is constituted as a removable cartridge which can easily be exchanged by a user when the ink is consumed, for example.

To transfer information between the recording apparatus and the ink container, an electric or electronic equipment is mounted to the ink container. For example, a consumed ink amount, a remaining ink amount, etc. are transferred as information between the recording apparatus and the ink container.

JP-2002-337358-A (EP-1199178-A) discloses a technology in which a memory is mounted to an ink container and a consumed ink amount or a remaining ink amount is stored in the memory.

JP-2001-146030-A (EP-1053877-A) and JP-2001-147146-A (EP-1053877-A) disclose a technology in which a piezoelectric sensor is provided for an ink container to detect the exhaustion of ink.

JP-2005-66902-A (EP-1462263-A) discloses a technology in which electrodes that contact with and separate from each other depending on the presence or absence of a pressure applied to ink and also depending on a remaining ink amount are provided for an ink container to detect the exhaustion of ink and so on.

JP-2004-106382 discloses a technology in which a piezoelectric sensor is provided for an ink container to detect the exhaustion of ink, and information is transferred between the ink container and a recording apparatus by wireless communication.

In addition, EP0710569-A discloses a structure for electric connection between a carriage of a recording apparatus and an ink jet type recording unit mounted to the carriage.

In a case in which an electric or electronic equipment is provided to an ink container removably mountable to a recording apparatus:

(1) it is necessary to reliably establish an electric connection between the recording apparatus and the equipment;

(2) it is necessary to protect the equipment from an external force that the ink container receives from an electrode of the recording apparatus;

(3) it is necessary to protect the equipment from ink mist and dust;

(4) it is necessary to design the ink container so that the ink container can be easily and efficiently subjected to recycle process after the ink container has been used; and (5) it is necessary to reduce the manufacturing cost of the ink container.

DISCLOSURE OF THE INVENTION

The present invention has been made in view of these circumstances.

As an illustrative, non-limiting embodiment, the present invention provides a liquid container removably mountable to a liquid consuming apparatus, the liquid container comprising: a container body having a liquid accommodating portion that can store liquid therein, a liquid supply port from which the liquid can be discharged to the liquid consuming apparatus, and a liquid supply path which is in fluid communication with the liquid accommodating portion and the liquid supply port; an outer electrode contactable with an electrode of the liquid consuming apparatus; an electrode supporting member which supports the outer electrode and is fixed to the container body; a piezoelectric sensor unit which is discrete from the electrode supporting member, which is attached to the container body for detecting the liquid existing in a part of the liquid supply path and which includes an piezoelectric element having an electrode; and a connector which is elastic and which electrically connects the outer electrode to the electrode of the piezoelectric element.

As an illustrative, non-limiting embodiment, the present invention provides a liquid container removably mountable to a liquid consuming apparatus, the liquid container comprising: a container body having a liquid accommodating portion for accommodating liquid therein, and a liquid supply port from which the liquid can be discharged to the liquid consuming apparatus; an outer electrode contactable with an electrode of the liquid consuming apparatus; an electrode supporting member which supports the outer electrode and is fixed to the container body; a sensor unit which is discrete from the electrode supporting member, is attached to the container body and includes an electrode; and a connector which has an elasticity and which electrically connects the outer electrode to the electrode of the sensor.

As an illustrative, non-limiting embodiment, the present invention provides a circuit board for electrically connecting the terminal plates of a piezoelectric sensor unit installed in a liquid container to the electrodes of a liquid consuming apparatus when the liquid container is mounted to the liquid consuming apparatus, the circuit board comprising: a board main body; a pair of first electrodes for contact with and electrical connection to the electrodes of the liquid consuming apparatus, the first electrodes being formed on a first surface of the board main body; and a pair of second electrodes for contact with and electrical connection to the terminal plates of the sensor unit, the second electrodes being formed on an opposite, second surface of the board main body and electrically connected respectively to the first electrodes.

As an illustrative, non-limiting embodiment, the present invention provides a circuit board for electrically connecting the terminal plates of a piezoelectric sensor unit installed in a liquid container to the electrodes of a liquid consuming apparatus when the liquid container is mounted to the liquid consuming apparatus, the circuit board comprising: a board main body; a pair of first electrodes for electrical connection to the electrodes of the liquid consuming apparatus, the first electrodes being formed on a first surface of the board main body; a pair of second electrodes for electrical connection to the terminal plates of the sensor unit, the second electrodes being formed on an opposite, second surface of the board main body and electrically connected respectively to the first electrodes; a memory mounted to the second surface of the board main body; and third electrodes formed on the first surface of the board main body and electrically connected to the memory. The first electrodes and the third electrodes are arrayed in a first row, and the first electrodes are respectively disposed at the outermost ends of the row.

As an illustrative, non-limiting embodiment, the present invention provides a connector board for electrically connecting terminal plates of a sensor unit mounted to a liquid container to electrodes of a liquid consuming apparatus when the liquid container is mounted to the liquid consuming apparatus, the connector board comprising: a board main body; a pair of first electrodes for electrical connection to the electrodes of the liquid consuming apparatus, the first electrodes being formed on a first surface of the board main body; and a pair of second electrodes for electrical connection to the terminal plates of the sensor unit, the second electrodes being formed on an opposite, second surface of the board main body and electrically connected respectively to the first electrodes.

It is undesirable to allow all of the liquid in the liquid path from the liquid container the liquid ejection head to be consumed, because if the liquid ejection head operates in the absence of the liquid, damage may occur. By providing a piezoelectric sensor unit in the liquid path, it is possible to detect that the liquid in the liquid cartridge has been consumed, while liquid remains in the liquid path leading to the liquid ejection head. This way, the cartridge can be replaced while there is still liquid in the liquid ejection head, and so damage can be avoided.

By locating the piezoelectric sensor in the liquid cartridge near the liquid supply port it is possible to maximize the amount of liquid that can be withdrawn from the liquid cartridge before the piezoelectric sensor detects that the liquid has been consumed. That is, only a small amount of liquid is needed to fill the liquid path between the piezoelectric sensor and the liquid head once the piezoelectric sensor detects that all of the ink in the liquid cartridge's reservoir has been consumed.

The present disclosure relates to the subject matter contained in Japanese patent application Nos.:

2005-103265 filed on Mar. 31, 2005;
2005-140437 filed on May 12, 2005;
2005-357275 filed on Dec. 12, 2005;
2005-357276 filed on Dec. 12, 2005;
2005-357277 filed on Dec. 12, 2005; and
2005-357278 filed on Dec. 12, 2005, each of which is expressly incorporated herein by reference in its entirety.

BRIEF DESCRIPTION OF THE DRAWINGS

FIGS. 17A, 17B and 17C show the board shown in FIG. 15.

BEST MODE FOR CARRYING OUT THE INVENTION

An ink cartridge, which is an example of a liquid container, according to a first embodiment of the invention will be described below with reference to the drawings.

Figure 1:
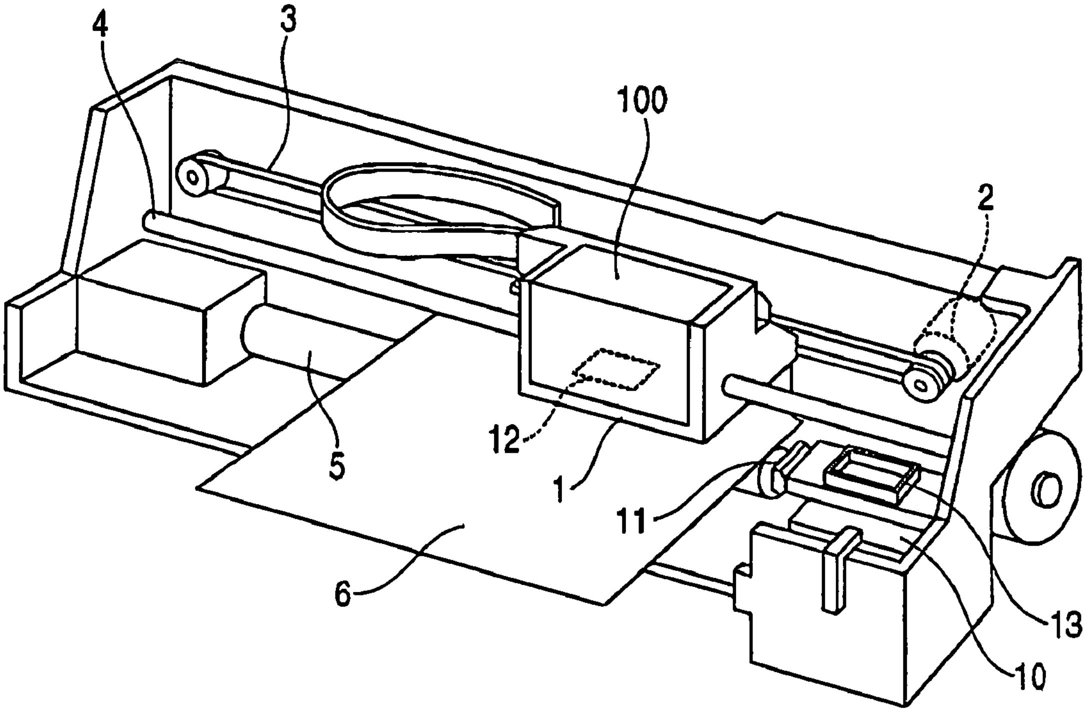
FIG. 1 is a perspective view showing a schematic structure of an ink jet type recording apparatus (liquid consuming apparatus) in which an ink cartridge according to a first embodiment of the invention is used.

FIG. 1 shows a schematic structure of a recording apparatus of an ink jet type (a liquid consuming apparatus) in which the ink cartridge according to the embodiment is used. In FIG. 1, the reference numeral 1 denotes a carriage. The carriage 1 is constituted to be guided by means of a guide member 4 and reciprocated in an axial direction of a platen 5 through a timing belt 3 to be driven by means of a carriage motor 2.

A recording head 12 of an ink jet type is mounted on a side of the carriage 1 which is opposed to a recording paper 6, and an ink cartridge 100 for supplying ink to the recording head 12 is removably attached to an upper part thereof.

A cap member 13 is disposed at a home position that is a non-printing region of the recording apparatus (on the right side in the drawing). The cap member 13 has such a structure as to be pushed against a nozzle forming surface of the recording head 12 and to form a hermetic closed space together with the nozzle forming surface when the recording head 12 mounted on the carriage 1 is moved to the home position. A pump unit 10 for applying negative pressure to the hermetic closed space formed by the cap member 13 to execute cleaning is disposed below the cap member 13.

Moreover, wiping member 11 including an elastic plate such as a rubber blade is disposed in the vicinity of a printing region side of the cap member 13 so as to be freely moved forward and backward in a horizontal direction with respect to a moving track of the recording head 12, for example, and has such a structure as to freely sweep over the nozzle forming surface of the recording head 12 if necessary when the carriage 1 is reciprocated toward the cap member 13 side.

As to the details of the carriage 1, reference is made to FIGS. 22A to 24 and the description associated therewith because the structure of the carriage 1 is similar to the structure of a carriage 19.

Figure 2:
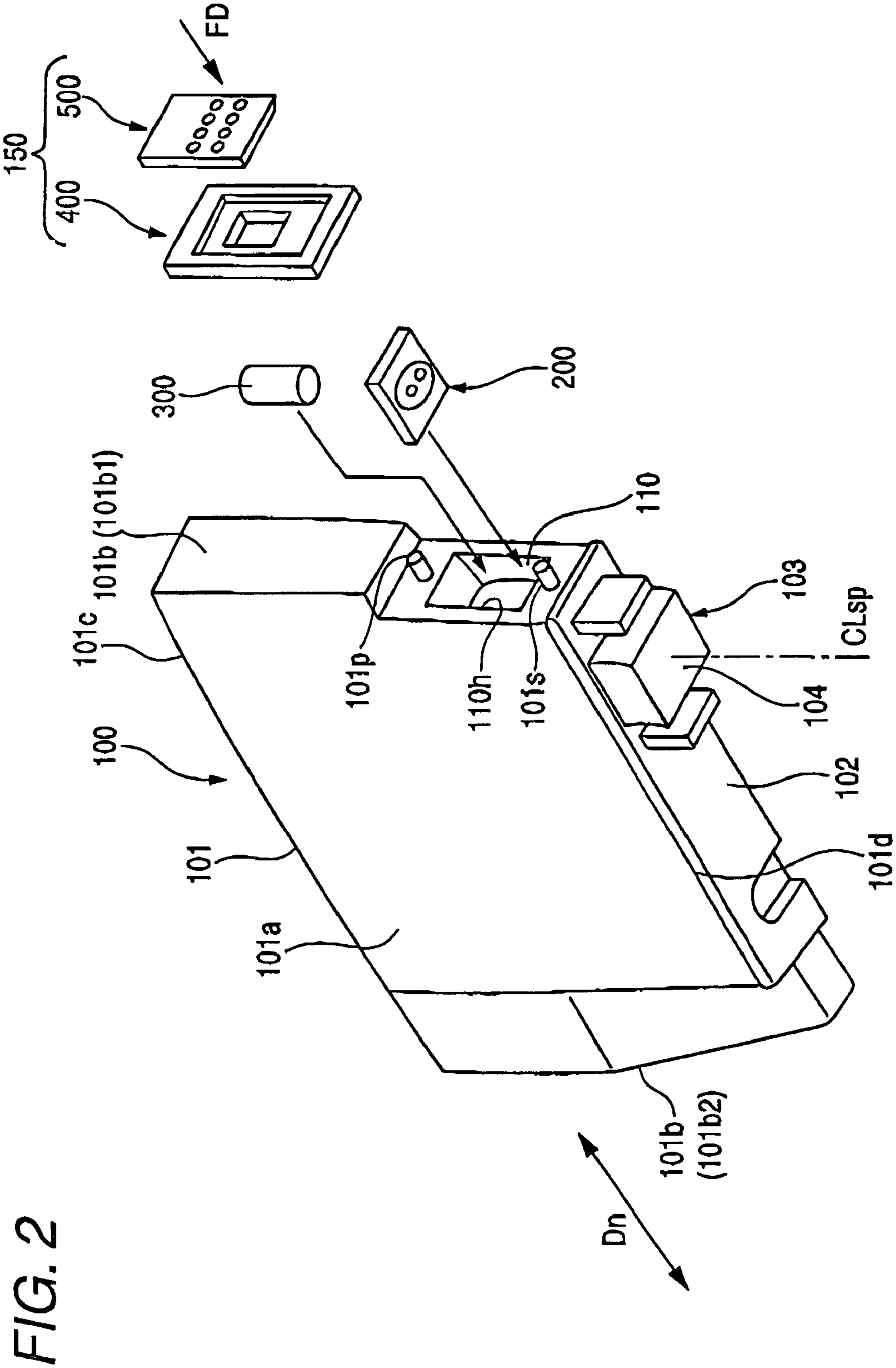
FIG. 2 is an exploded perspective view showing a schematic structure of the ink cartridge according to the first embodiment of the invention.

FIG. 2 is a perspective view showing a schematic structure of the ink cartridge 100. The ink cartridge 100 includes a sensor unit 200 which can be an electric or electronic device.

The ink cartridge 100 has a cartridge case (a container body) 101 formed of resin and which includes an ink storage portion (liquid accommodating portion) and a cover 102 formed of resin which is attached to cover a lower end face of the cartridge case 101. The cover 102 is provided to protect various sealing films joined to the lower end face of the cartridge case 101. An ink feeding portion 103 protrudes from the lower end face of the cartridge case 101 and a cover film 104 for protecting an ink feeding port (liquid supply port which is not shown) are joined to the lower end face of the ink feeding portion 103.

The cartridge case 101 can have nearly the shape of a rectangular parallelepiped of small thickness (depth) which includes a pair of side surfaces 101*a* of great width, a pair of side surfaces 101*b* of small width, a top face 101*c* and a bottom face 101*d*. A sensor accommodating recess portion 110 for accommodating the sensor unit 200 is provided in a lower part of the small-width side surface 101*b*1 in the cartridge case 101. The sensor unit 200 and a spring (urging member) 300 are accommodated in the sensor accommodating recess portion 110.

The spring 300 pushes the sensor unit 200 against a sensor receiving wall 120 (see FIG. 7) in an inner bottom part of the sensor accommodating recess portion 110 to deform a sealing ring 270, thereby maintaining a sealing property between the sensor unit 200 and the cartridge case 101, which will be described in detail below.

In this case, a cylindrical compression coil spring can be used as the spring 300, and the spring 300 and the sensor unit 200 are arranged in a direction orthogonal to the top face 101*c* and the bottom face 101*d* of the cartridge case 101, that is, a direction of a height of the cartridge case 101. The sensor unit 200 and the spring 300 are accommodated in the sensor accommodating recess portion 110 such that the sensor unit 200 is positioned on an upper side of the sensor receiving wall 120 and the spring 300 is further positioned on an upper side of the sensor unit 200.

The sensor accommodating recess portion 110 has an insertion opening on the small-width side surface 101*b*1 of the cartridge case 101, and the sensor unit 200 and the spring 300 are inserted from the insertion opening. The insertion opening of the sensor accommodating recess portion 110 is covered (sealed, if necessary) with a cover member (electrode supporting member) 150 from the outside in a state in which the sensor unit 200 and the spring 300 are accommodated therein. The cover member 150 is constituted by a cover 400 having sized to cover the insertion opening of the sensor accommodating recess portion 110 and a circuit board 500 formed separately from the cover 400 is fitted and fixed into the cover 400, which will be described below in detail. If necessary, the cover 400 may have a sealing function for sealing the insertion opening of the sensor accommodating recess portion 101.

Figure 3:
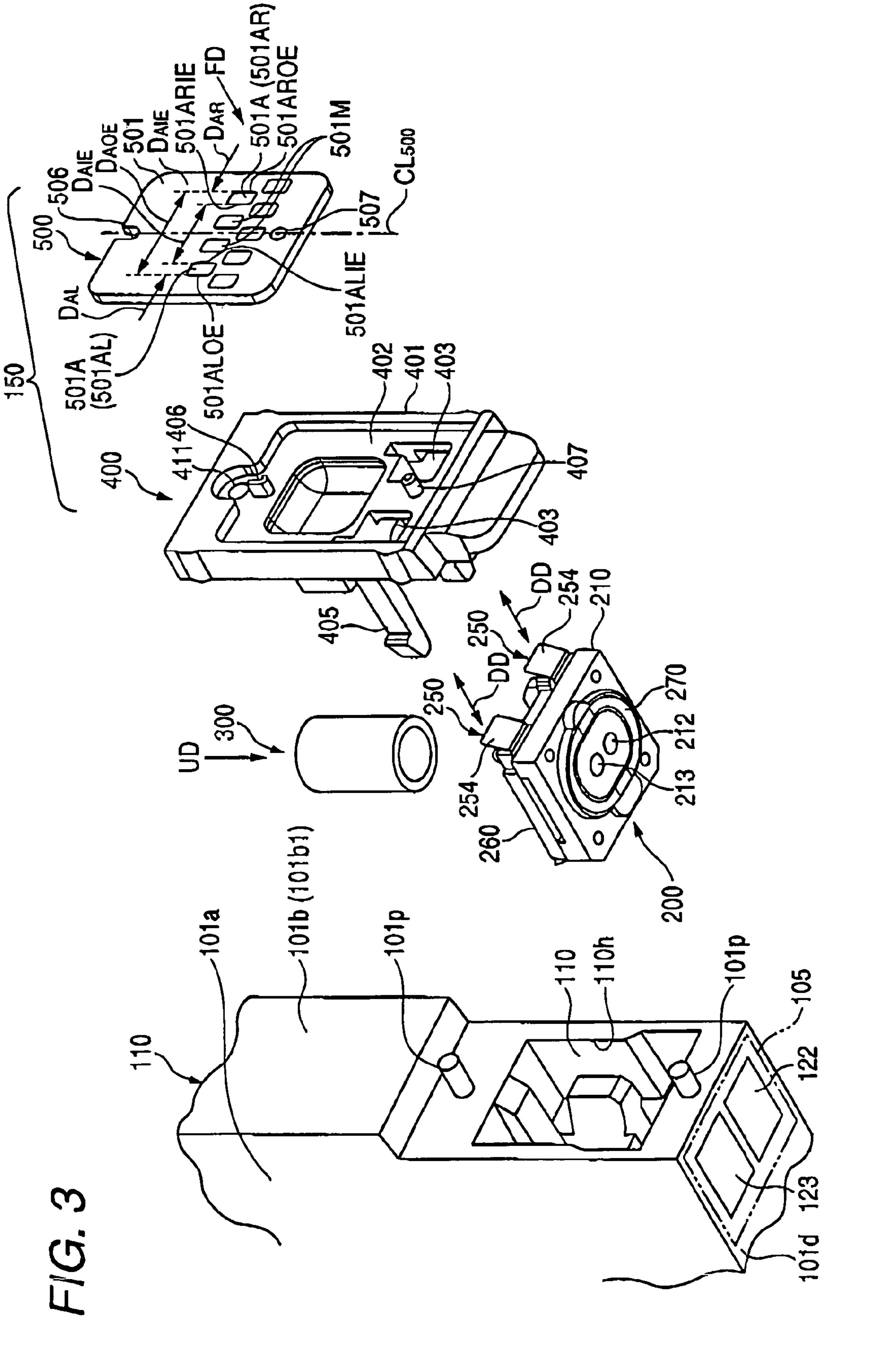
FIG. 3 is a perspective view showing detailed structures of components including a sensor unit (liquid detecting device) provided in the ink cartridge of FIG. 2.
Figure 4:
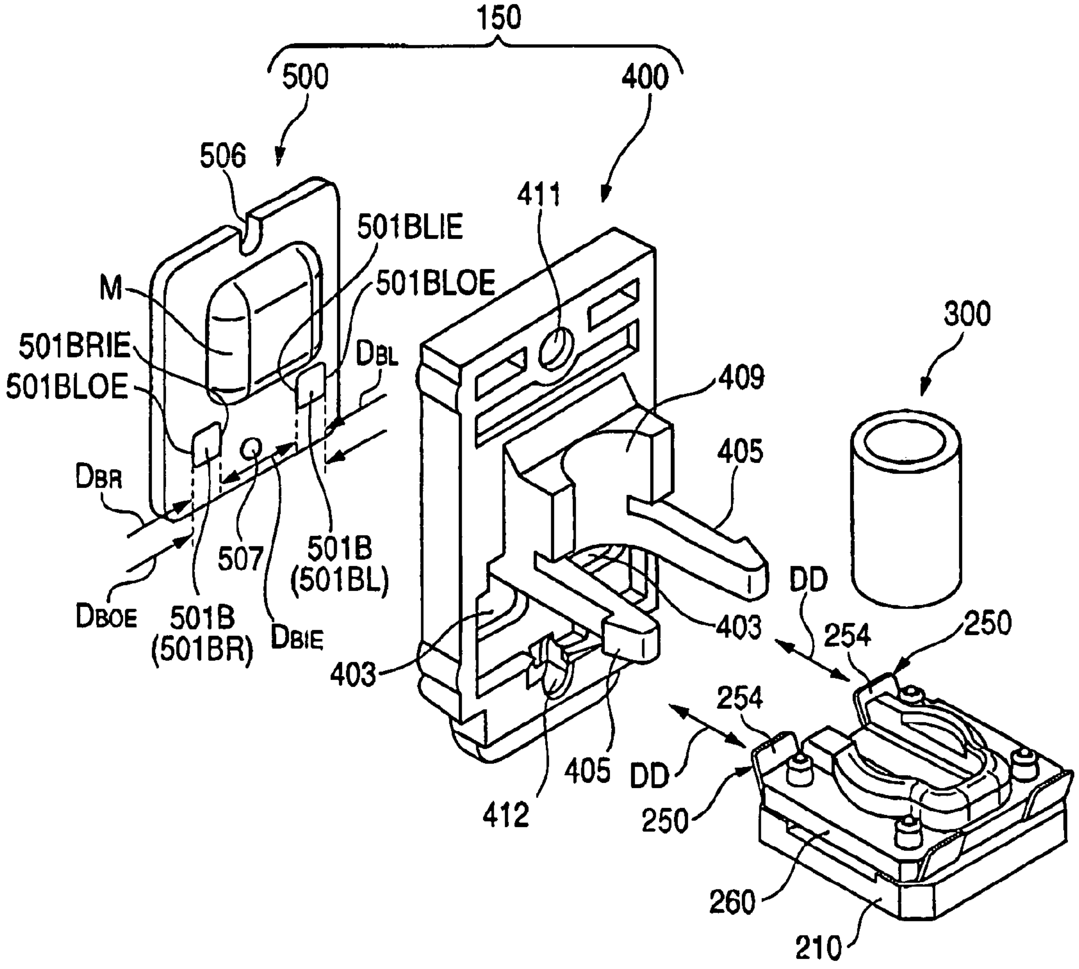
FIG. 4 is a perspective view showing the detailed structure of components including the sensor unit (liquid detecting device) provided in the ink cartridge of FIG. 2 as seen in another direction.
Figure 5:
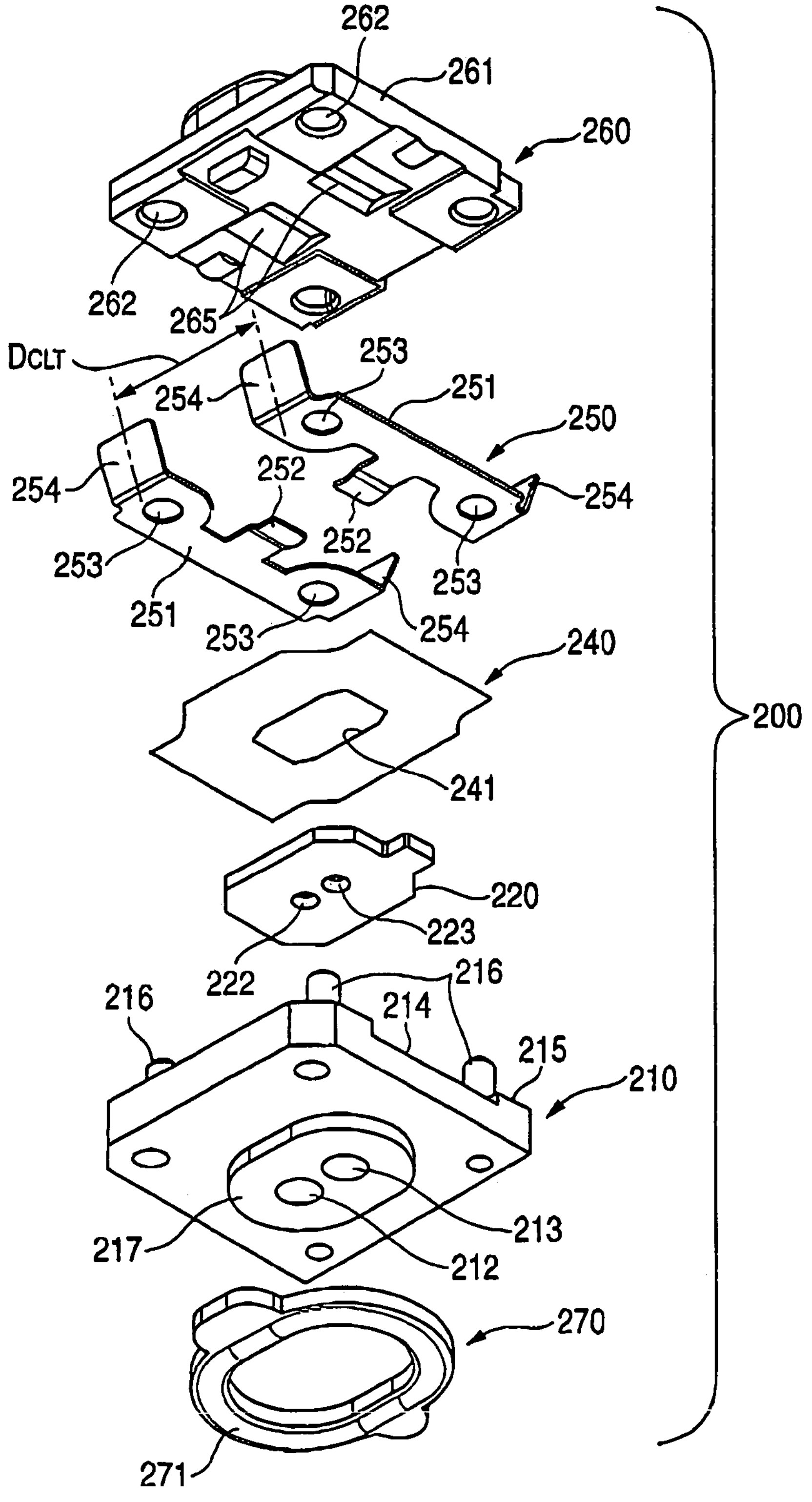
FIG. 5 is an exploded perspective view showing the sensor unit in FIGS. 3 and 4.
Figure 6:
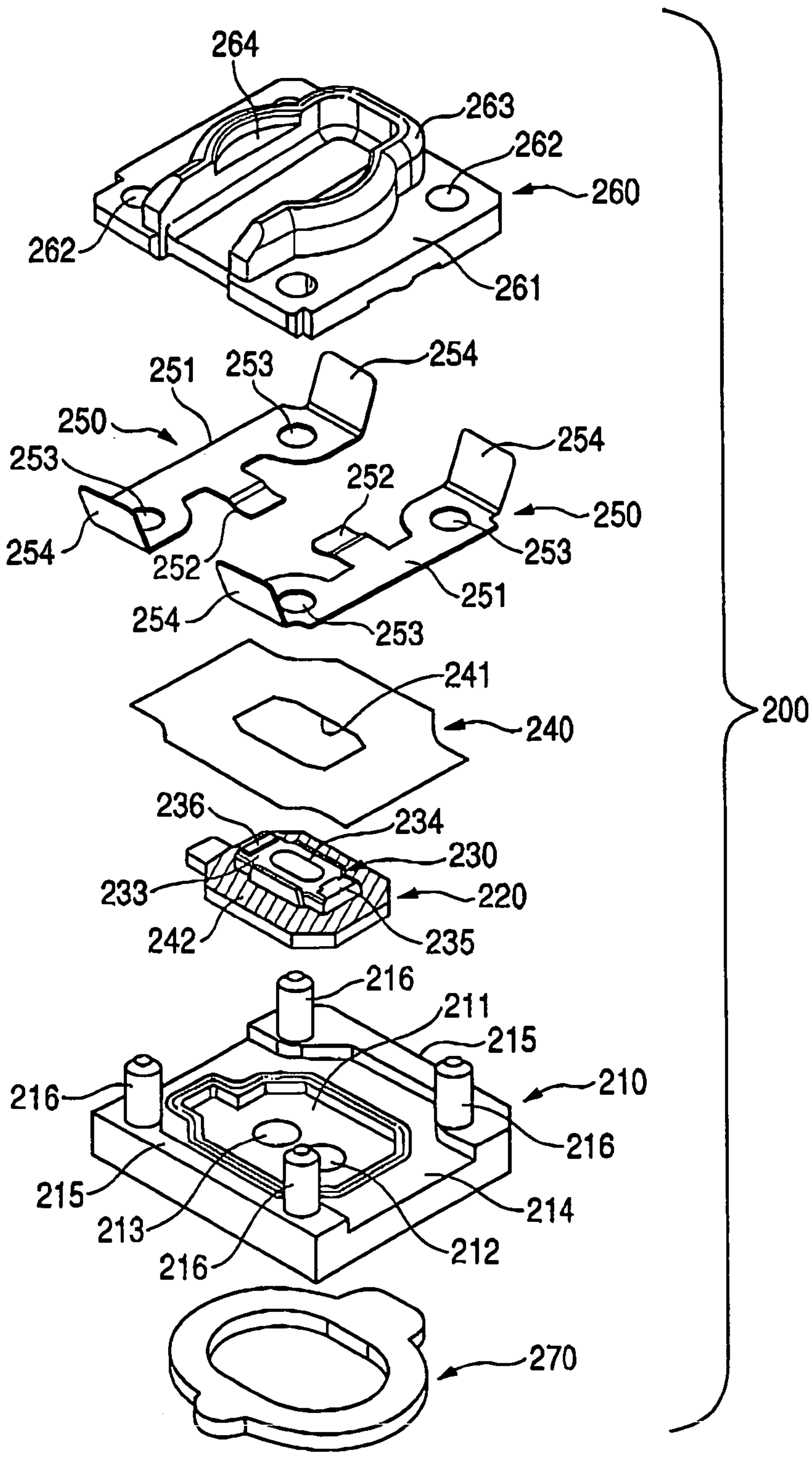
FIG. 6 is an exploded perspective view showing the sensor unit in FIGS. 3 and 4 as seen at another angle.
Figure 7:
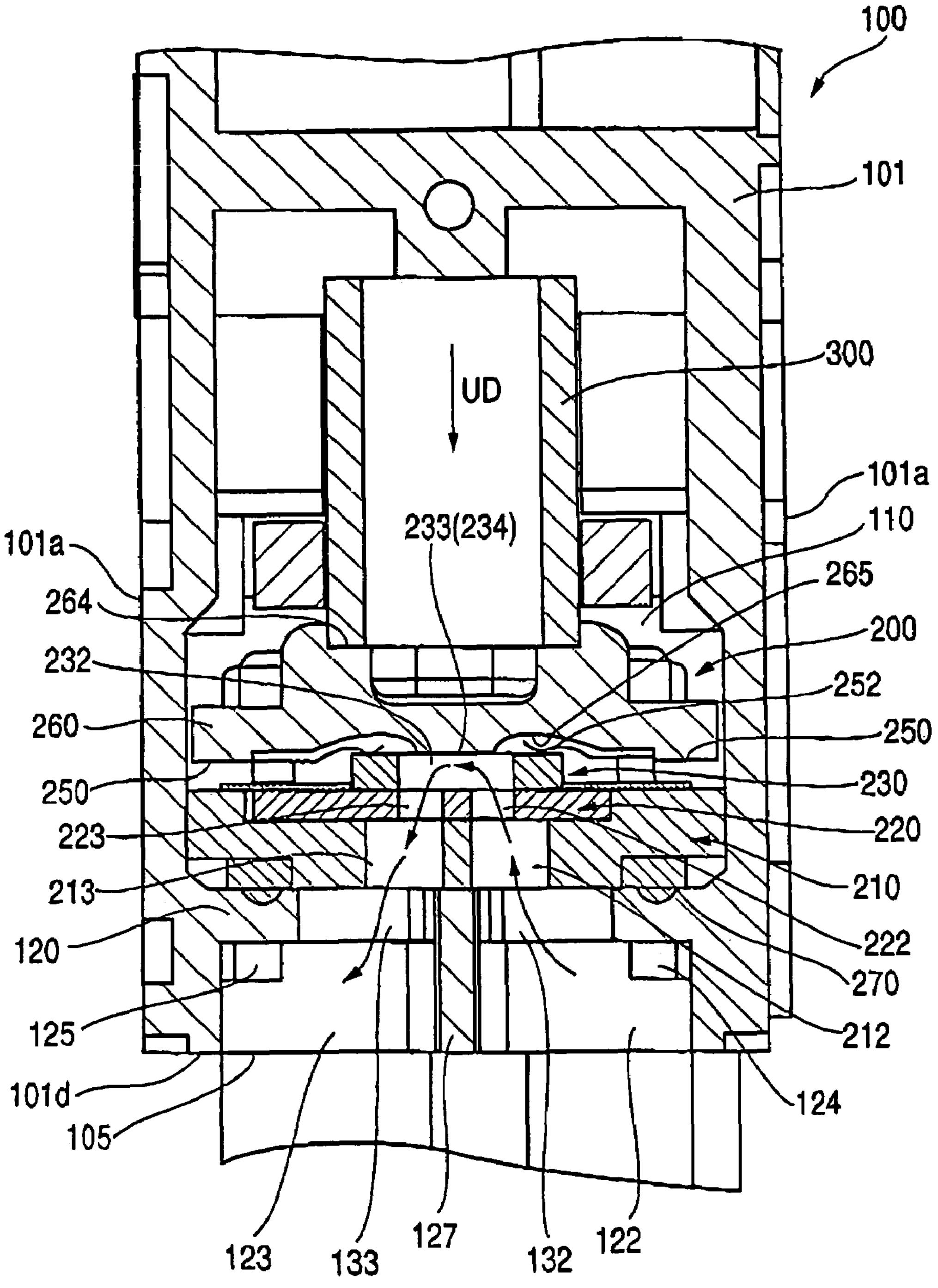
FIG. 7 is a longitudinal sectional view showing a portion of the ink cartridge in FIG. 2, to which the sensor unit is attached.
Figure 8:
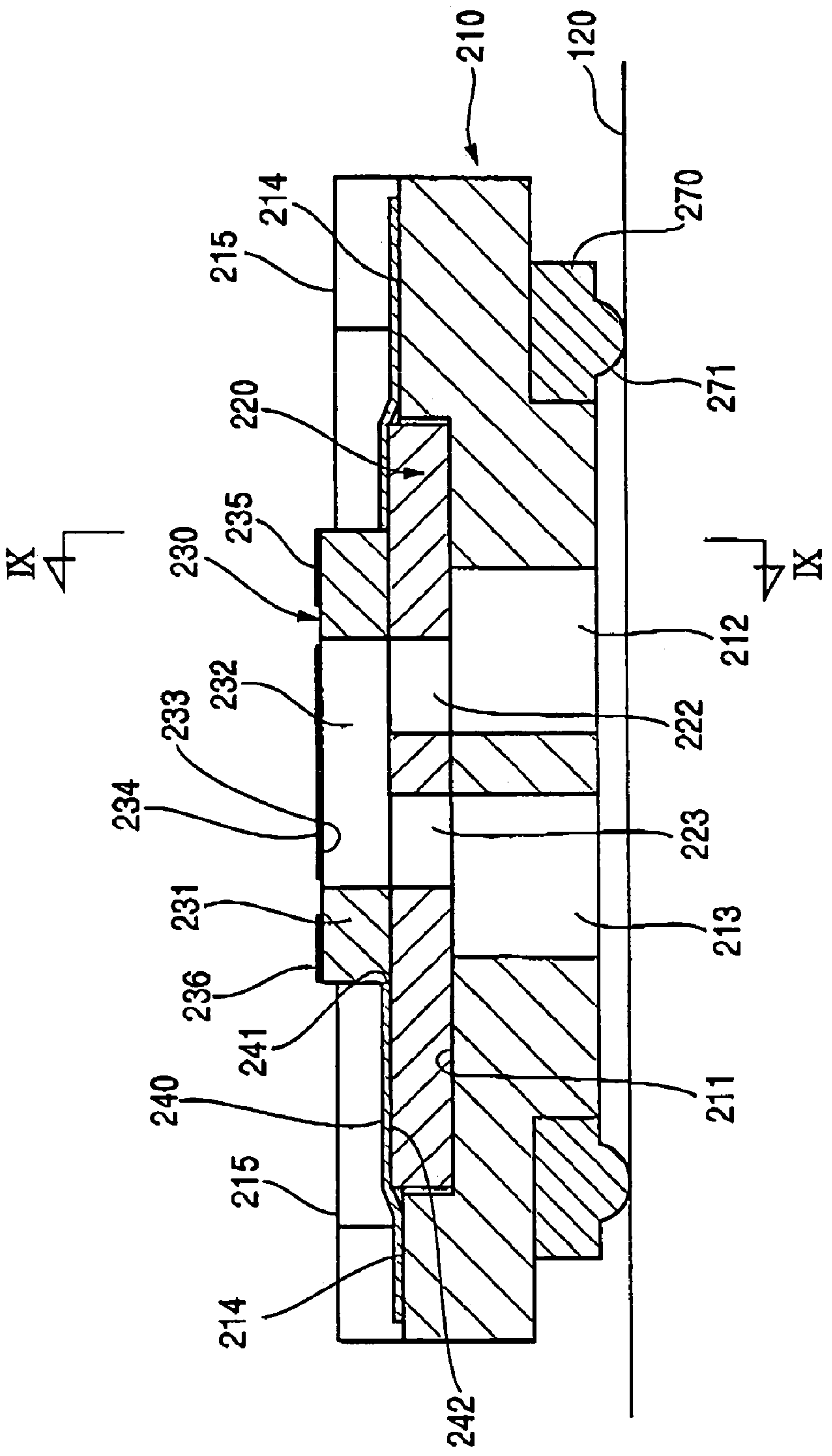
FIG. 8 is an enlarged sectional view showing a main part of the sensor unit in FIG. 7.
Figure 9:
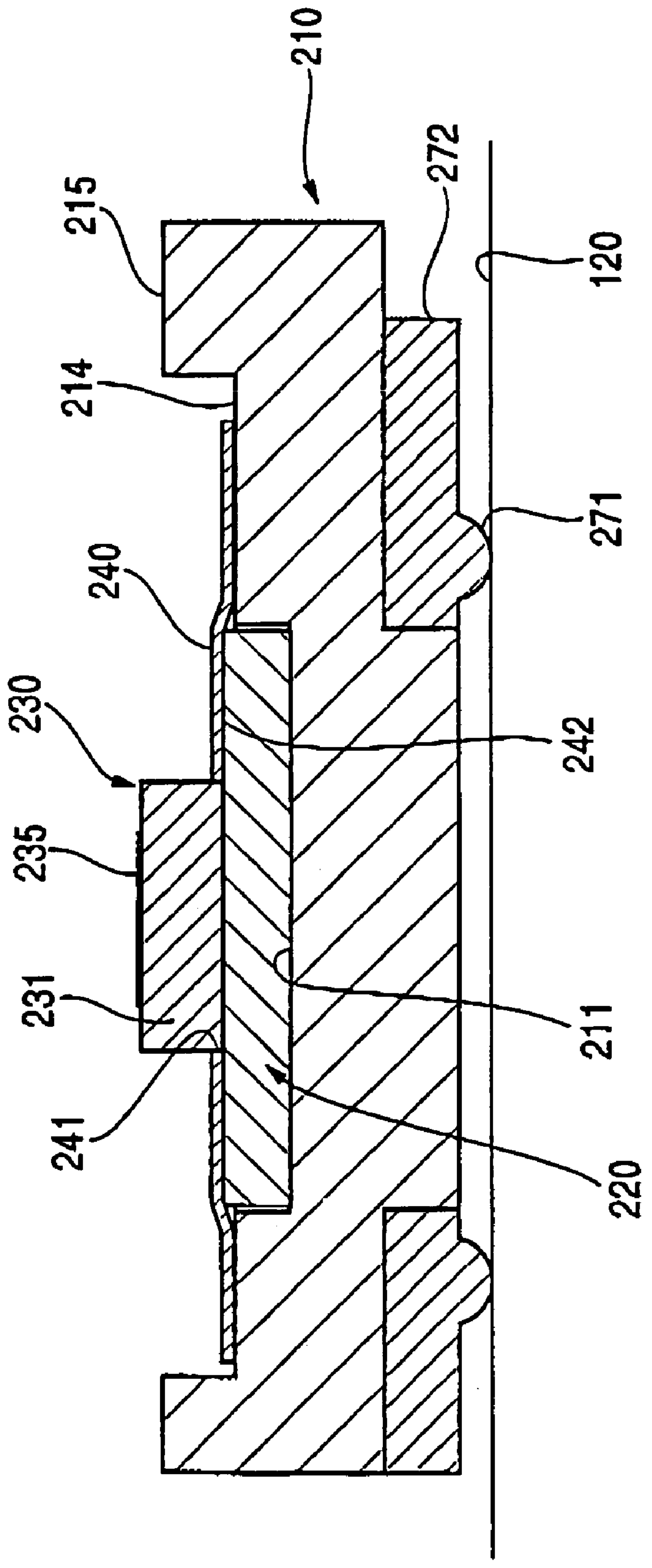
FIG. 9 is a sectional view taken along an IX-IX line in FIG. 8.

FIGS. 3 and 4 are exploded perspective views showing the structure of the sensor unit 200, the spring 300, the cover 400 and the circuit board 500. Moreover, FIG. 5 is an exploded perspective view showing the sensor unit 200, FIG. 6 is an exploded perspective view showing the sensor unit 200 seen at another angle, and FIG. 7 is a longitudinal sectional view showing the sensor unit accommodating portion of the ink cartridge 100. Moreover, FIG. 8 is a sectional view showing a main part of the sensor unit 200 and FIG. 9 is a sectional view taken along line IX-IX in FIG. 8.

As shown in FIG. 7, the sensor receiving wall 120 for receiving a lower end of the sensor unit 200 is provided in the inner bottom part of the sensor accommodating recess portion 110 of the cartridge case 101. The sensor receiving wall 120 has an upper surface mounting the sensor unit 200 thereon. That is, the sensor receiving wall 120 is a portion pressed by the seal ring 270 provided on a lower end of the sensor unit 200 due to the elastic force exerted by the spring 300.

An upstream side sensor buffer chamber 122 and a downstream side sensor buffer chamber 123 are provided on the lower side of the sensor receiving wall 120. The buffer chambers 122 and 123 are separated from each other by a partition wall 127 interposed therebetween. The sensor receiving wall 120 is provided with a pair of communicating holes 132 and 133 corresponding to the sensor buffer chambers 122 and 123.

The ink cartridge case 101 has a feeding path (liquid supply path) so that the ink stored in the ink storing portion (liquid accommodating portion) can be discharged from the ink feeding port (ink supply port) to an outside, which is not particularly shown. The sensor accommodating recess portion 110 is positioned in the vicinity of the termination of the feeding path, i.e. in the vicinity of the ink feeding port, and the sensor unit 200 is provided in the sensor accommodating recess portion 110. In this case, the upstream side sensor buffer chamber 122 communicates with an upstream side feeding passage of the feeding path through a connecting hole 124 and the downstream side sensor buffer chamber 123 communicates with a downstream side feeding passage of the feeding path through a connecting hole 125. The downstream side feeding passage of the feeding path continues to the ink feeding port (liquid supply port). The sensor unit 200 is disposed to detect if ink exists in the vicinity of the termination of the feeding path, i.e. in a portion of the ink feeding path.

Moreover, lower surfaces of the sensor buffer chambers 122 and 123 may be sealed with a rigid wall but are open in the embodiment, and the openings are covered with a thin sealing film 105 formed of resin.

As shown in FIGS. 5 and 6, the sensor unit 200 is constituted by a plate-shaped unit base 210 having a recess portion 211 on an upper surface and formed of resin, a plate-shaped sensor base 220 accommodated in the recess portion 211 provided on the upper surface of the unit base 210 and formed of metal, a sensor chip 230 mounted and fixed onto the upper surface of the sensor base 220, an adhesive film 240 for fixing the sensor base 220 to the unit base 210, a pair of elastically deformable terminal plates (connectors) 250 disposed on an upper side of the unit base 210, a plate-shaped presser cover 260 for pressing the terminal plates 250 and protecting the sensor chip 230, and the seal ring 270 provided on a lower surface of the unit base 210 and formed of rubber.

Each of the components will be described in detail. As shown in FIG. 6, the unit base 210 has the recess portion 211 which is provided on an upper surface and to which the sensor base 220 is fitted. The unit base 210 also has a pair of attachment walls 215 which are located on an outside of an upper surface wall 214 around the recess portion 211 and which are higher than the upper surface wall 214. The attachment walls 215 are opposed to each other across the recess portion 211, and four support pins 216 are positioned on the attachment walls 215 and are located at four corners of the upper surface of the unit base 210. Moreover, an inlet side passage 212 and an outlet side passage 213 (liquid reserving spaces) in the form of circular through holes pass through the bottom wall of the recess portion 211. Furthermore, an elliptical protruded portion 217 to which the seal ring 270 is fitted is provided on the lower surface of the unit base 210 as shown in FIG. 5, and the inlet side passage 212 and the outlet side passage 213 are positioned in the protruded portion 217. The seal ring 270 can be a ring-shaped packing formed of rubber and has a lower surface provided with an annular protruded portion 271 taking a semicircular section. As shown in FIG. 5 the sealing ring and protruded portion are oval.

The sensor base 220 is constituted by a metal plate such as stainless steel which has a higher rigidity than resin in order to enhance the acoustic behavior of the sensor. The sensor base 220 takes the shape of a generally rectangular plate having four chamfered corners and includes an inlet side passage 222 and an outlet side passage 223 (liquid reserving spaces) formed by two through holes corresponding respectively to the inlet side passage 212 and the outlet side passage 213 in the unit base 210.

An adhesive layer 242 is formed on the upper surface of the sensor base 220 from a double-sided adhesive film or an applied adhesive, for example, and the sensor chip 230 is mounted and fixed onto the adhesive layer 242.

The sensor chip 230 has a sensor cavity 232 for receiving ink (liquid) to be detected. The sensor cavity 232 has a lower surface opened to freely receive the ink and an upper surface closed by an oscillating plate 233, and a piezoelectric unit 234 is provided on the upper surface of the oscillating plate 233.

More specifically, as shown in FIGS. 7 and 8, the sensor chip 230 is constituted by a ceramic chip body 231 having, the sensor cavity 232 constituted by a circular opening, the oscillating plate 233 laminated on an upper surface of the chip body 231 and constituting a bottom face wall of the sensor cavity 232, the piezoelectric unit 234 laminated on the oscillating plate 233, and terminals 235 and 236 laminated on the chip body 231.

The piezoelectric unit (piezoelectric element) 234 is constituted by upper and lower electrode layers connected to the terminals 235 and 236 and a piezoelectric layer laminated between the upper and lower electrode layers, which is not specifically shown. The piezoelectric unit 234 fulfills can be used to detect the exhaustion of ink based on the difference in electrical characteristics depending on the presence of ink in the sensor cavity 232, for example. For the piezoelectric material layer, lead zirconate titanate (PZT), lanthanum lead zirconate titanate (PLZT) or a lead-free piezoelectric film which does not utilize lead can be used.

In the sensor chip 230, the lower surface of the chip body 231 is mounted on a central part of the upper surface of the sensor base 220 and is thus fixed integrally to the sensor base 220 by the adhesive layer 242, and the sensor base 220 and the sensor chip 230 are sealed with the adhesive layer 242 at the same time. As can be seen in FIG. 8, the inlet side passages 222 and 212 and the outlet side passages 223 and 213 (the liquid reserving spaces) in the sensor base 220 and the unit base 210 communicate with the sensor cavity 232 of the sensor chip 230. By this structure, the ink enters the sensor cavity 232 through the inlet side passages 212 and 222 and is discharged from the sensor cavity 232 through the outlet side passages 223 and 213.

Thus, the sensor base 220 formed of metal on which the sensor chip 230 is mounted is accommodated in the recess portion 211 on the upper surface of the unit base 210. The adhesive film 240 formed of resin covers the structure so that the sensor base 220 and the unit base 210 are joined together.

More specifically, the adhesive film 240 has an opening 241 at its approximate center and is put from above in a state in which the sensor base 220 is accommodated in the recess portion 211 on the upper surface of the unit base 210 so that the sensor chip 230 is exposed through the opening 241 in the center. Moreover, the adhesive film 240 has an inner peripheral portion bonded to the upper surface of the sensor base 220 through the adhesive layer 242 and an outer peripheral portion bonded to the upper surface wall 214 provided around the recess portion 211 of the unit base 210, that is, the adhesive film 240 covers and adheres to the upper surfaces of the two components (the sensor base 220 and the unit base 210) so that the sensor base 220 and the unit base 210 are fixed to each other and are sealed at the same time.

In this case, the upper surface of the sensor base 220 protrudes upward from the recess portion 211 of the unit base 210. Consequently, the adhesive film 240 is bonded to the upper surface of the sensor base 220 at a higher position than a bonding position to the upper surface wall 214 provided around the recess portion 211 of the unit base 210. Thus, the height of a film bonding surface to the sensor base 220 is set to be greater than that of a film bonding surface to the unit base 210. Consequently, the sensor base 220 can be pressed by means of the adhesive film 240 with a step so that a fixing force of the sensor base 220 to the unit base 210 can be increased. Moreover, it is also possible to carry out an attachment having no looseness.

Moreover, each of the terminal plates 250 has a band-shaped board portion 251, a spring piece 252 protruded from a side edge of the board portion 251, attachment holes 253 formed at both sides of the board portion 251, and bent pieces 254 formed at both ends of the board portion 251. Each of the terminal plates 250 is disposed on the upper surfaces of the attachment walls 215 of the unit base 210 in a state in which the support pins 216 are inserted through the attachment holes 253 to carry out positioning. The presser cover 260 is mounted from thereabove so that the terminal plates 250 are interposed between and held by the unit base 210 and the presser cover 260. The spring pieces 252 electrically contact the terminals 235 and 236 provided on the upper surface of the sensor chip 230.

The presser cover 260 has a plate portion 261 to be mounted on the upper surfaces of the attachment walls 215 of the unit base 210 with the board portions 251 of the terminal plates 250 interposed therebetween, four attachment holes 262 provided at four corners of the plate portion 261 to respectively receive the support pins 216 of the unit base 210, an erected wall 263 provided on an upper surface of a center of the plate portion 261, a spring receiving seat 264 provided on the erected wall 263, and concave portions 265 provided on the lower surface of the plate portion 261 and forming a relief for accommodating the spring pieces 252 of the terminal plates 250. The presser cover 260 is mounted on the upper surface of the unit base 210 while pressing the terminal plates 250 from above and thus protects the sensor plate 220 and the sensor chip 230 which are accommodated in the recess portion 211 formed on the upper surface of the unit base 210.

In order to assemble the sensor unit 200 made from the above components, first of all, the adhesive layer 242 is formed on substantially the whole upper surface of the sensor base 220 and the sensor chip 230 is mounted on the adhesive layer 242. Consequently, the sensor chip 230 and the sensor base 220 are fixed and sealed integrally with each other by the adhesive layer 242.

Subsequently, the sensor base 220 provided integrally with the sensor chip 230 is accommodated in the recess portion 211 formed on the upper surface of the unit base 210 and is then covered from above by the adhesive film 240. Consequently, the inner peripheral side of the adhesive film 240 is bonded to the upper surface of the sensor base 220 through the adhesive layer 242 and the outer peripheral side of the adhesive film 240 is bonded to the upper surface wall 214 provided around the recess portion 211 of the unit base 210. This way, the sensor base 220 and the unit base 210 can be fixed and sealed integrally with each other by the adhesive film 240.

Next, the terminal plates 250 are provided on the unit base 210 while the attachment holes 253 are fitted around the support pins 216 of the unit base 210, and the presser cover 260 is disposed thereabove. Moreover, the seal ring 270 is fitted around the protruded portion 217 formed on the lower surface of the unit base 210 in an optional stage. Thus, the sensor unit 200 can be assembled.

The sensor unit 200 is constituted as described above and is accommodated in the sensor accommodating recess portion 110 of the cartridge case 100 together with the spring 300. When the spring 300 presses the presser cover 260 downward in the accommodating state as shown in FIG. 7, the seal ring 270 provided on the lower surface of the sensor unit 200 comes in pressure contact with the sensor receiving wall 120 in the sensor accommodating recess portion 110 while deforming. Consequently, a seal can be maintained between the sensor unit 200 and the cartridge case 101.

By carrying out the assembly, the upstream side buffer chamber 122 in the cartridge case 101 is caused to communicate with the inlet side passages 212 and 222 in the sensor unit 200 through the communicating hole 132 of the sensor receiving wall 120 and the downstream side buffer chamber 123 in the cartridge case 101 is caused to communicate with the outlet side passages 213 and 223 in the sensor unit 200 through the communicating hole 133 of the sensor receiving wall 120 under the condition that the sealing property is maintained. The inlet side passages 212 and 222, the sensor cavity 232 and the outlet side passages 223 and 213 are provided in series in the feeding path in the cartridge case 101 so as to be arranged from the upstream side in this order.

More specifically, the feeding path in the cartridge 100 includes the upstream side passage connected to the sensor cavity 232 and the downstream side passage connected to the sensor cavity 233. The upstream side passage connected to the sensor cavity 232 includes the upstream side buffer chamber 122 having a large passage section and in the cartridge case 101, the communicating hole 132 in the sensor receiving wall 120 of the cartridge case 101, and the inlet side passages 212 and 222 (upstream side narrow and small passages) having small passage sections and in the sensor unit 200. Moreover, the downstream side passage connected to the sensor cavity 232 includes the downstream side buffer chamber 123 having a large passage section and in the cartridge case 101, the communicating hole 133 in the sensor receiving wall 120 of the cartridge case 101, and the outlet side passages 213 and 223 (downstream side narrow and small passages) having small passage sections and in the sensor unit 200.

Moreover, the cover 400 for closing the opening of the sensor accommodating recess portion 110 at the side surface 101*b*1 has such structure as shown in FIGS. 3 and 4. An external surface of a plate-shaped cover body 401 has a recess portion 402 into which the circuit board 500 is fitted. A bottom wall of the recess portion 402 is provided with two openings 403 (through holes) through which the bent pieces (protruded portions) 254 of the terminal plates 250 are exposed Pins 406 and 407 for positioning the circuit board 500 protrude from the bottom wall of the recess portion 402. An internal surface of the cover body 401 is provided with a spring support portion 409 shaped to provide lateral support for an outer peripheral surface of the spring 300. A pair of engagement arms (protruded engagement portions) 405 are protruded from the internal surface of the cover body 401 for engagement with corresponding regions (engagement recess portions) in the sensor accommodating recess portion 110. The engagement arms 405 are provided in such positions as to laterally interpose the spring 300 therebetween. In addition, the cover 400 is provided with positioning holes 411 and 412 to which a pair of upper and lower positioning pins 101*p* and 101*p* protruded from a peripheral wall of the sensor accommodating recess portion 110 are fitted.

Moreover, the circuit board 500 has contacts 501A and 501B respectively formed on external and internal surfaces of an insulating board 501 having such a size as to be exactly fitted to the recess portion 402 of the cover body 401. If necessary, the circuit board 500 may be provided with an electronic circuit (not shown) including an electronic component such as a memory M as in the present embodiment. The insulating board 501 is provided with a notch 506 and a hole 507 which are to be engaged with the positioning pins 406 and 407 on the cover 400.

In this case, each of the inside contacts 501B exposed from an internal surface of the circuit board 500 is brought into contact with and electrically conducted to corresponding one of the bent pieces 254 of the terminal plates 250 of the sensor unit 200 when the sensor accommodating recess portion 110 is closed with the cover member 150. Each of the outside contacts 501A electrically communicates directly or through the electronic circuit to a corresponding one of the inside contact 501B, and serves to carry out an electrical connection with an external apparatus.

The cover member 150 constituted by the cover 400 and the circuit board 500 is attached to the cartridge case 101 with the sensor unit 200 and the spring 300 accommodated in the sensor accommodating recess portion 110, and in that state, the contacts 501A provided on the external surface of the circuit board 500 contact the terminal plates 250.

Next, description will be given to a detecting principle of the ink by the sensor unit 200.

When the ink in the ink cartridge 101 is consumed, the stored ink passes through the sensor cavity 232 of the sensor unit 200 and is fed from the ink feeding portion 103 to the recording head 12 of the ink jet type recording apparatus.

In this case, when sufficient ink remains in the ink cartridge 100, the sensor cavity 232 is filled with the ink. On the other hand, when the amount of ink remaining in the ink cartridge 100 decreases beyond a certain amount, the ink is not present in the sensor cavity 232.

Therefore, the sensor unit 200 detects a difference in an acoustic impedance which is caused by a change in this state. Consequently, it is possible to detect whether sufficient ink remains or the ink has been consumed beyond a certain amount or more.

More specifically, when a voltage is applied to the piezoelectric unit 234, the oscillating plate 233 is deformed due to the deformation of the piezoelectric unit 234. When the piezoelectric unit 234 is forcibly deformed and the application of the voltage is then released, a flexural oscillation remains in the oscillating plate 233 for a while. The residual oscillation is a free oscillation of the oscillating plate 233 and a medium in the cavity 232. By setting the voltage to be applied to the piezoelectric unit 234 to have a pulse waveform or a rectangular waveform, it is possible to easily obtain a resonant condition of the oscillating plate 233 and the medium after the application of the voltage.

The residual oscillation is generated by the oscillating plate 233 and deforms the piezoelectric unit 234. For this reason, the piezoelectric unit 234 generates a back electromotive force with the residual oscillation. The back electromotive force is detected by an external apparatus through the terminal plate 250.

By the back electromotive force thus detected, it is possible to determine a resonant frequency. Therefore, it is possible to detect the presence or absence of the ink in the ink cartridge 100 based on the resonant frequency.

The liquid container 100 according to the present embodiment has: the outer electrode 501A contactable with the electrode 91*c* of the liquid consuming apparatus (FIG. 23); the electrode supporting member 150 which supports the outer electrode 501A and is fixed to the container body 101; the piezoelectric sensor unit 200 which is discrete from the electrode supporting member 150, which is attached to the container body 101 for detecting the liquid existing in a part of the liquid supply path and which includes the piezoelectric element 220 having electrodes 235,236; and the terminal plate 250 which is elastic and which electrically connects the outer electrode 501A to the electrodes 235, 236 of the piezoelectric element 220.

The electrode supporting member 150 supporting the outer electrode 501A is discrete from the piezoelectric sensor unit 200, and the outer electrodes 501A and the electrodes 235, 236 of the piezoelectric element 220 of the piezoelectric sensor unit 200 are electrically connected to each other by the bent pieces 254 of the elastic terminal plate 250. Since the electrode supporting member 150 is discrete from the piezoelectric sensor unit 200, an external force received by the outer electrode 501A from the electrode 91*c* of the liquid consuming apparatus is not directly transmitted to the piezoelectric sensor unit 200, and therefore it is possible to protect the piezoelectric sensor unit 200, in particular, the piezoelectric element 220 which is a precision equipment, from the applied external force. Further, an output signal of the piezoelectric element 220 is significantly influenced by a fixing state of the piezoelectric element 220. By adopting such a structure that the external force cannot be directly transmitted to the piezoelectric element 220, the output characteristics of the piezoelectric element 220 can be maintained. Although the circuit board 500 and the cover 400 are used as the electrode supporting member in the present embodiment, the electrode supporting member should not be restricted to this arrangement. For example, the circuit board 500 alone may be used as the electrode supporting member, that is, the circuit board 500 may be directly fixed to the container body 101. Alternatively, the outer electrode 501A may be provided on the cover 400 (in this case, the electrode supporting member can be constructed using the cover 400 alone).

Since the outer electrode 501A and the electrodes 235, 236 of the piezoelectric element 220 are electrically connected to each other by the elastic terminal plate 250, the terminal plate 250 can use its elasticity to absorb the external force received by the outer electrode 501A. Further, even if the external force is applied to the outer electrode 501A, the terminal plate 250 can use its elasticity to maintain the electrical connection between the outer electrode 501A and the electrodes 235, 236 of the piezoelectric element 220. Although the terminal plate 250 is used as the connector in the present embodiment, the connector should not be restricted thereto. For example, the outer electrode 501A may be electrically connected to the electrodes 235, 236 of the piezoelectric element 220 by an elastic electric wire, a flexible printed circuit (FPC), or the like.

The outer electrode 501A and the electrode supporting member 150 supporting the outer electrode 501A directly contact the liquid consuming apparatus when the liquid container is mounted to and removed from the liquid consuming apparatus. In contrast, the piezoelectric sensor unit 200 either is not directly contacted by the liquid consuming apparatus or has a low possibility of being directly contacted by the liquid consuming apparatus, depending upon the location where the piezoelectric sensor unit 200 is attached to the container body 101. Further, the electrode supporting member 150 including the outer electrode 501A and the piezoelectric sensor unit 200 including the piezoelectric element 220 are at least in part formed of different materials. Furthermore, a process for checking the performance of the electrode supporting member 150 including the outer electrode 501A is different from a process for checking the performance of the piezoelectric sensor unit 200 including the piezoelectric element 220. Since the electrode supporting member 150 including the outer electrode 501A is discrete from the piezoelectric sensor unit 200 including the piezoelectric element 220, the exhausted liquid container used by a user and collected from the user can be efficiently subjected to a recycling process.

The piezoelectric sensor unit 200 is discrete from the electrode supporting member 150. The position where the electrode supporting member 150 is disposed on the container body 101 is restricted in relation to the position of the electrode 91*c* of the liquid consuming apparatus, but the piezoelectric sensor unit 200 can be attached to any desired position of the container body 101 as long as the piezoelectric element 220 of the piezoelectric sensor unit 200 is electrically connected to the outer electrode 501A supported by the electrode supporting member 150. That is to say, the piezoelectric sensor unit 200 can be disposed at any position where it can be protected from ink mist and dust.

The liquid container 100 according to the present embodiment has: the deformable seal member 270 disposed between the piezoelectric sensor unit 200 and the wall 120 of the container body 101, and the urging member 300 that urges the piezoelectric sensor unit 200 toward the wall 120 of the container body 101. The piezoelectric sensor unit 200 is attached to the container body 101 using the seal member 270 and the urging member 300.

Since the piezoelectric sensor unit 200 is attached to the container body 101 using the seal member 270 and the urging member 300, any external force caused by an impact applied to the container body 101 will be absorbed by the seal member 270 and the urging member 300 and so such force is not directly transmitted to the piezoelectric sensor unit 200.

Accordingly, it is possible to protect the piezoelectric sensor unit 200, in particular, the piezoelectric element 220.

Since it is possible to finely adjust the position of the piezoelectric sensor unit 200 using the elastic force of the seal member 270 and the urging force of the urging member 300, the piezoelectric sensor unit 200 can be disposed at a position where the piezoelectric sensor unit 200 can perform as is desired, thereby compensating for any differences in performance of individual piezoelectric sensor units 200. Further, in recycling, it is possible to easily remove the piezoelectric sensor unit 200 from the container body 101. Moreover, it is possible to elastically support the piezoelectric sensor unit 200 to the container body 101 using the seal member 270 disposed between the piezoelectric sensor unit 200 and the wall 120 of the container body 101 for fluid communication with the liquid supply path.

Although a compression coil spring 300 is used as the urging member in the present embodiment, the urging member is not limited thereto. Any suitable element such as a plate spring, a rubber member, a tensile spring or the like can be used as the urging member. Likewise, the seal member 270 should not be restricted to the illustrated structure, configuration or the like.

In the liquid container according to the present embodiment, the terminal plate 250 is at least in part elastically deformable in a direction DD (see FIGS. 3 and 4) substantially perpendicular to a direction UD (see FIGS. 3, 7, 10 and 11) along which the urging member 300 urges the piezoelectric sensor unit 200.

Since the urging direction UD in which the urging member 300 and the seal member 270 elastically supporting the piezoelectric sensor unit 200 to the container body 101 is substantially perpendicular to the deformable direction DD of the terminal plate 250, the piezoelectric sensor unit 200 can be elastically supported to the container body 101 in a stable manner.

In the liquid container according to the present embodiment, the outer electrode 501A receives a force from the electrode 91*c* of the liquid consuming apparatus applied in a first direction FD (see FIGS. 2, 3 and 10) when the outer electrode 501A contacts the electrode 91*c* of the liquid consuming apparatus, the terminal plate 250 being at least in part elastically deformable in a second direction DD, and the first direction FD being substantially parallel to the second direction DD.

Since the deformable direction DD of the terminal plate 250 and the force direction FD in which the outer electrode 501A receives the external force are substantially parallel to each other, it is possible to absorb efficiently the external force applied to the terminal plate 250. Accordingly, the external force does not directly act on the piezoelectric sensor unit 200. The electrical connection between the terminal plate 250 and the outer electrode 501A is not affected by the presence or absence of the external force and can be maintained reliably.

The liquid container according to the present embodiment has the deformable seal member 270 disposed between the piezoelectric sensor unit 200 and the wall 120 of the container body 101, and the urging member 300 that urges the piezoelectric sensor unit 200 toward the wall 120 of the container body 101 in a third direction UD substantially perpendicular to the second direction DD. The piezoelectric sensor unit 200 is attached to the container body through the seal member 270 and the urging member 120.

Since the piezoelectric sensor unit 200 is attached to the container body 101 through the seal member 270 and the urging member 300, any external force or impact applied to the container body 101 can be absorbed by the seal member 270 and the urging member 300 and therefore will not be directly transmitted to the piezoelectric sensor unit 200. Accordingly, it is possible to protect the piezoelectric sensor unit 200, in particular, the piezoelectric element 220.

Since it is possible to adjust finely the position of the piezoelectric sensor unit 200 relative to the wall 120 of the container body 101 using the elastic force of the seal member 270 and the urging force of the urging member 300, the piezoelectric sensor unit 200 can be disposed at a position where the piezoelectric sensor unit 200 can perform as is desired, thereby compensating for any differences in performance of individual piezoelectric sensor units 200. Further, in recycling, it is possible to easily remove the piezoelectric sensor unit 200 from the container body 101. Moreover, it is possible to elastically support the piezoelectric sensor unit 200 to the container body 101 using the seal member 270 disposed between the piezoelectric sensor unit 200 and the wall 120 of the container body for fluid communication with the liquid supply path.

Since the urging direction UD in which the urging member 300 and the seal member 270 elastically support the piezoelectric sensor unit 200 to the container body 101 is substantially perpendicular to the deformable direction DD of the terminal plate 250, the piezoelectric sensor unit 200 can be elastically supported to the container body 101 in a stable manner.

In the liquid container according to the present embodiment, the container body 101 has a recess 110 for accommodating the piezoelectric sensor unit 200 therein, and the electrode supporting member 150 closes an opening of the recess 110.

Since the piezoelectric sensor unit 200 is disposed in a closed space formed by the recess 110 of the container body 101 and the electrode supporting member 150, the piezoelectric sensor unit 200 can be protected from ink mist, dust and external force.

In the liquid container according to the present embodiment, the container body 101 includes a first wall 101*b*1 and an opposing second wall 101*b*2, the liquid supply port is disposed at an offset position closer to the first wall 101*b*1 than to the second wall 101*b*2, and the piezoelectric sensor unit 200 is disposed at an offset portion closer to the first wall 101*b*1 than to the second wall 101*b*2.

The piezoelectric sensor unit 200 can be disposed close to the liquid supply port. In general, a portion of the container body 101 which is close to the liquid supply port has high rigidity. Accordingly, by disposing the piezoelectric sensor unit 200 at such a highly rigid portion of the container body 101, it is possible to protect the piezoelectric sensor unit 200 and to install the piezoelectric sensor unit 200 in a stable way.

In the liquid container according to the present embodiment, the piezoelectric sensor unit 200 is disposed between the liquid supply port and the first wall 101*b*1 in a horizontal direction Dh (see FIG. 2) in which the first wall 101*b*1 and the second wall 101*b*2 are opposed to each other.

In the liquid container according to the present embodiment, the container body 101 includes a top wall 101*c* and a bottom wall 101*d* having the ink supply port, and the piezoelectric sensor unit 200 is disposed at an offset position closer to the bottom wall 101*d* than to the top wall 10*c*.

The piezoelectric sensor unit 200 can be disposed at the more highly rigid portion of the container body 101.

Since the location where the piezoelectric sensor 200 is disposed is the more rigid portion of the container body 101, the required rigidity of that portion of the container body 101 can be assured even if the recess 110, which otherwise might lower the rigidity, is formed in the container body 101. Therefore, the recess 110 is formed in the container body 101 and the piezoelectric sensor unit 200 is accommodated in the recess 110. Again, since the piezoelectric sensor unit 200 can be disposed inside the container body 101, it is possible to protect the piezoelectric sensor unit 200 from ink mist, dust and external force.

In the liquid container according to the present embodiment, an opening of the recess 110 is closed by the electrode supporting member 150 fixed to the first wall **101*b*1**.

Since the electrode supporting member 150 serves as a reinforcing member for the portion of the container body 101 where the recess 110 is formed, this increases the rigidity of the container body where the piezoelectric sensor unit 200 is disposed.

The liquid container according to the present embodiment has an inner electrode 501B which is electrically connected to the outer electrode 501A and which is supported by the electrode supporting member 150. The terminal plate 250 contacts the inner electrode 501B for electrical connection to the outer electrode 501A.

When the liquid container 100 is mounted to or removed from the liquid consuming apparatus, the outer electrode 501A is subjected to sliding contact by the electrode 91*c* of the liquid consuming apparatus. Since the terminal plate 250 contacts the inner electrode 501B, which is different from the outer electrode 501A, to be electrically connected to the outer electrode 501A, the contact portion of the terminal plate 250 is not subjected to the sliding contact by the electrode 91*c* of the liquid consuming apparatus. Accordingly, the electrical connection between the terminal plate 250 and the outer electrode 501A avoids making sliding contact with the electrode 91*c* of the liquid consuming apparatus, and so thereby establishes a reliable electrical connection.

In the liquid container according to the present embodiment, the terminal plate 250 includes elastic terminal plate 250, the elastic terminal plate 250 is attached to the piezoelectric sensor unit 200 and electrically connected to the electrodes 235, 236 of the piezoelectric element 220, and the elastic terminal plate 250 contacts the inner electrode 501B for electrical connection between the outer electrode 501A and the electrodes 235, 236 of the piezoelectric element 220.

Since the elastic terminal plate 250 is attached to the piezoelectric sensor unit 200, the elastic terminal plate 250 can also be handled as a component of the piezoelectric sensor unit 200. That is, the piezoelectric sensor unit 200 including the elastic terminal plate 250 can be attached to and removed from the container body 101 as one unit. Accordingly, it is possible to enhance the manufacturing process efficiency and the recycling process efficiency.

The contact of the elastic terminal plate 250 with the inner electrode 501B can establish electrical connection between the outer electrode 501A and the electrodes 235, 236 of the piezoelectric element 220. Therefore, since the electrode supporting member 150 having the outer electrode 501A and the inner electrode 501B can be separate from the piezoelectric sensor unit 200 having the piezoelectric element 220 and the elastic terminal plate 250, it is possible to enhance the manufacturing process efficiency and the recycling process efficiency.

Since the elastic terminal plate 250 can be positively contacted to the inner electrode 501B using the elasticity of the elastic terminal plate 250, the elastic terminal plate 250 can be electrically connected to the inner electrode 501B with high reliability.

In the liquid container according to the present embodiment, the elastic terminal plate 250 is displaceable relative to the inner electrode 501B while still maintaining contact with the inner electrode 501B.

Contact between the elastic terminal plate 250 with the inner electrode 501B, i.e. the electrical connection, can be reliably secured even if the relative position of the elastic terminal plate 250 to the inner electrode 501B shifts somewhat. By connecting the components this way it is easy to manage the dimensional precision of component parts and assembly precision of the component parts during manufacture and recycle.

This arrangement is advantageous also in the case where the piezoelectric sensor unit 200 is elastically supported by the container body 101. That is, even if the piezoelectric sensor unit 200 is shifted relative to the electrode supporting member 150 in the direction DD, the direction UD and a direction perpendicular to these directions DD and UD, it is possible to maintain contact between the elastic terminal plate 250 and the inner electrode 501B by simply changing the contact position of the elastic terminal plate 250 with the inner electrode 501B correspondingly.

In the liquid container according to the present embodiment, the electrode supporting member 150 includes a circuit board 500 that has a first surface on which the outer electrode 501A is formed and an opposite, second surface on which the inner electrode 501B is formed, and the circuit board 500 is fixed to the container body 101 so that the second surface is located between the first surface and the piezoelectric sensor unit 200.

Since the electrode supporting member includes the circuit board 500, the outer electrode 501A and the inner electrode 501B can be formed easily, for example, using conductor printing technology.

The outer electrode 501A is formed on the first surface (front surface) of the circuit board 500 and the inner electrode 501B is formed on the second surface (back surface) of the circuit board 500. Therefore, the side where the electrode 91*c* of the liquid consuming apparatus contacts the outer electrode 501A and the side where the terminal plate 250 contacts the inner electrode 501B are assuredly separated by the circuit board 500, and so the contact portion between the terminal plate 250 and the inner electrode 501B is not subjected to sliding contact with the electrode 91*c* of the liquid consuming apparatus.

Since the piezoelectric sensor unit 200 is also disposed at the side where the terminal plate 250 contacts the inner electrode 501B, the piezoelectric sensor unit 200 is also free from sliding contact with the electrode 91*c* of the liquid consuming apparatus.

By fixing the circuit board 500 to the container body 101 such that the terminal plate 250 press-contacts the inner electrode 501B of the second surface due to the elasticity of the terminal plate 250, it is possible to easily establish the electrical connection between the outer electrode 501A and the electrodes 235, 236 of the piezoelectric element 220.

In the liquid container according to the present embodiment, the electrode supporting member 150 further includes a circuit board supporting member 400 that supports the circuit board 500, and the circuit board 500 is fixed to the container body 101 through the circuit board supporting member 400.

For example, it is possible to fix the circuit board 500 to the circuit board supporting member 400 before the circuit board supporting member 400 is joined to the container body 101. In this case, since the circuit board 500 is fixed to the circuit board supporting member 400, it is possible to easily handle the circuit board 500 and protect the circuit board 50.

In the liquid container according to the present embodiment, the circuit board supporting member 400 has a through-hole 403 into which a protruded portion 254 of the elastic terminal plate 250 projects to make contact with the inner electrode 501B of the circuit board 500.

Even when the circuit board supporting member 400 is interposed between the circuit board 500 and the sensor unit 200, the terminal plate 250 can be easily brought into contact with the inner electrode 501B using the through hole 403.

In the liquid container according to the present embodiment, a clearance is provided between the through-hole 403 and the protruded portion 254 so that the protruded portion 254 can shift in position relative to the through-hole 403 without contacting the perimeter of through-hole 403.

The through-hole 403 allows the contact position of the elastic terminal plate 250 with the inner electrode 501B to change.

In the liquid container according to the present embodiment, the through-hole 403 is covered by the circuit board 500.

It is possible to prevent ink mist and dust from passing through the through hole 403 to reach the contact portion between the inner electrode 501B and the elastic terminal plate 250 and the piezoelectric sensor unit 200.

In the liquid container according to the present embodiment, the circuit board supporting member 400 has a protruded engagement portion 405, and the container body 101 has a mating engagement recess portion for engagement with the protruded engagement portion 405 when the circuit board supporting member 400 is disposed in place with respect to the container body 101.

The circuit board supporting member 400 can be fixed to the container body 101 by engagement between the protruded engagement portion 405 and the engagement recess portion. In particular, when the circuit board 500 is fixed to the circuit board supporting member 400 before the circuit board supporting member 400 is fixed to the container body 101, the circuit board supporting member 400 having the circuit board 500 can be fixed to the container body 101 by engagement between the protruded engagement portion 405 and the engagement recess portion. The circuit board supporting member 400 having the circuit board 500 can be removed from the container body 101 by disengaging the protruded engagement portion 405 from the engagement recess portion. Accordingly, this arrangement can enhance the workability, for example, when it is necessary to make a fine adjustment for the piezoelectric sensor unit 200 (such as a fine adjustment in the position of the piezoelectric sensor unit 200 relative to the container body 101) or an exchange of the piezoelectric sensor unit 200 is needed after the circuit board 500 is fixed to the container body 101.

The liquid container according to the present embodiment has a memory M mounted to the second surface (back surface) of the circuit board 500, and at least one memory electrode 501M electrically connected to the memory M and formed on the first surface (front surface) of the circuit board 500.

Various types of information involving the liquid consuming apparatus and/or the liquid container can be stored in the circuit board 500 having the memory M.

Since the memory M is mounted to the second surface (back surface) of the circuit board 500 similarly to the inner electrode 501B, it is possible to protect the memory M.

Since the memory electrode 501M is slidingly contacted by the electrode of the liquid consuming apparatus and is formed on the first surface (front surface), the contact portion between the terminal plate 250 and the inner electrode 501B is not subjected to the sliding contact by the electrode of the liquid consuming apparatus.

The circuit board 500 according to the present embodiment has a board main body 501, a pair of first electrodes 501A for contact with and electrical connection to the electrodes 91*c* of the liquid consuming apparatus, the first electrodes 501A being formed on a first surface (front surface) of the board main body 501, and a pair of second electrodes 501B for contact with and electrical connection to the terminal plates 250 of the sensor unit 200, the second electrodes 501B being formed on an opposite, second surface (back surface) of the board main body 501 and being electrically connected respectively to the first electrodes 501A.

Accordingly, since a side in which the electrodes 91*c* of the liquid consuming apparatus contact the first electrodes 501A, and a side in which the terminal plates 250 contact the second electrodes 501B can be surely separated one from the other by the board main body 501, the contact portions between the terminal plates 250 and the second electrodes 501B are not subjected to the sliding contact by the electrodes 91*c* of the liquid consuming apparatus.

In the circuit board according to the present embodiment, each of the first electrodes 501A has an inner edge and an outer edge. That is, as shown in FIG. 3, the right-side first electrode 501AR has an inner edge 501ARIE and an outer edge 501AROE. The left-side first electrode 501AL has an inner edge 501ALIE and an outer edge 501ALOE.

Each of the second electrodes 501B has an inner edge and an outer edge. That is, as shown in FIG. 4, the right-side second electrode 501BR, as viewed from the front surface, has an inner edge 501BRIE and an outer edge 501BROE. The left-side second electrode 501BL has an inner edge 501BLIE and an outer edge 501BLOE.

Figure 23:
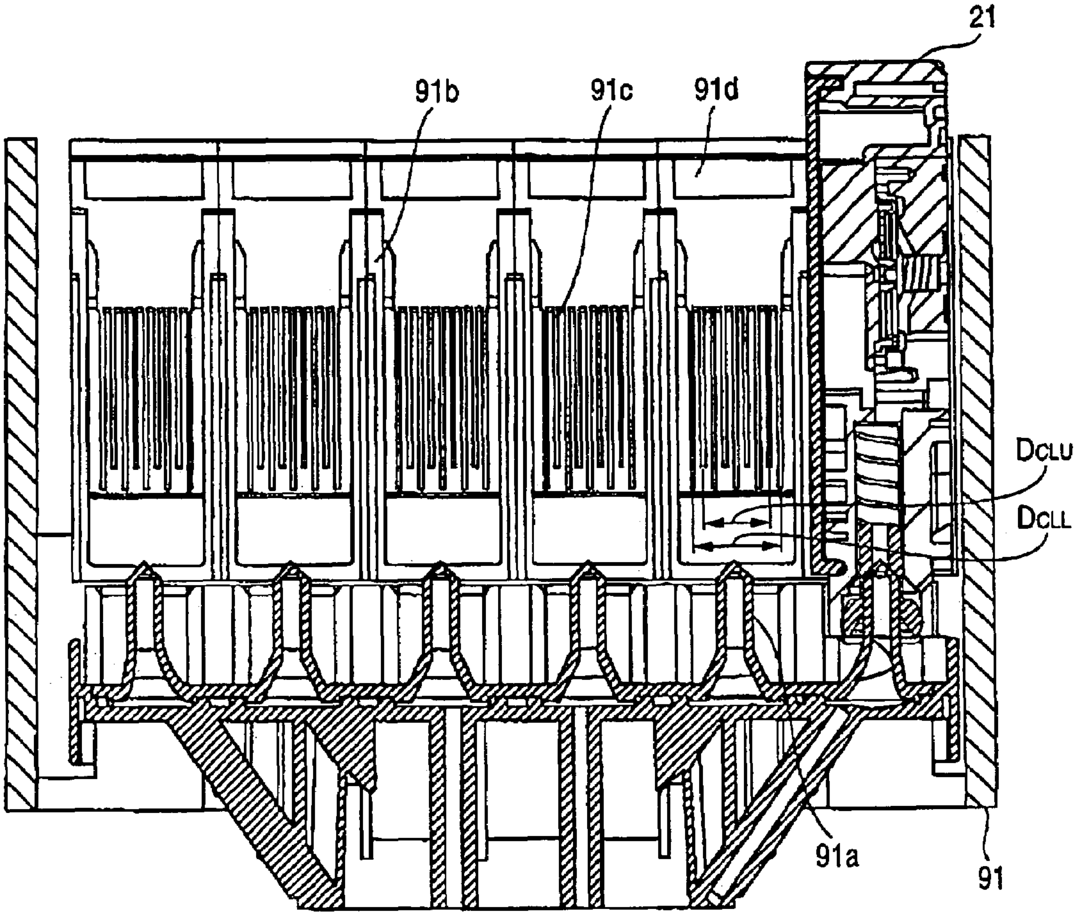
FIG. 23 is a sectional view taken along a plane B-B of FIG. 22A.

A distance DAIE between the inner edge 501ARIE of the right side first electrode 501AR and the inner edge 501ALIE of the left side first electrode 501AL is smaller than the first center-to-center distance DCLU (shown in FIG. 23). As shown in FIG. 23, the first center-to-center distance DCLU is the distance between center lines of the liquid consuming apparatus electrodes 91*c* respectively contacted by the electrodes 501AR and 501AL. In the present embodiment, the electrodes 501AR and 501AL respectively contact the liquid consuming apparatus electrodes 91*c* in an upper electrode row.

The distance DAOE between the outer edge 501AROE of one of the first electrodes 501AR and the outer edge 501ALOE of the other of the first electrodes 501AL is greater than the first center-to-center distance DCLU.

A distance DBIE between the inner edge 501BRIE of one of the second electrodes 501BR and the inner edge 501BLIE of the other of the second electrodes 501BL is smaller than the second center-to-center distance DCLT. The second center-to-center distance DCLT (see FIG. 5) is a distance between center lines of the sensor unit terminal plates 250 respectively contacted by the second electrodes 501BR and 501BL.

A distance DBOE between the outer edge 501BROE of one of the second electrodes 501BR, and the outer edge 501BLOE of the other of the second electrodes 501BL is greater than the second center-to-center distance DCLT.

By this arrangement, the contact between the first electrodes 501A and the liquid consuming apparatus electrodes 91*c*, and thus the electrical connection therebetween, can be made more reliable even if the relative positions of the first electrodes 501A to the liquid consuming apparatus electrodes 91*c* are shifted. By this arrangement, the contact between the second electrodes 501B and the terminal plates 250, and thus the electrical connection therebetween, can be made reliable even if the relative positions of the second electrodes 501B and the terminal plates 250 are more or less shifted.

In the circuit board according to the present embodiment, the board main body 501 has a center line CL500, and the first electrodes 501AR, 501AL are located symmetrically to each other with respect to the center line CL500.

In general, when the liquid container 100 is mounted to the liquid consuming apparatus, the location of the center line CLsp of the liquid supply port is an important factor in properly positioning the liquid container relative to the liquid consuming apparatus. For this reason, in a case in which the circuit board 500 is provided to the liquid container 100, the circuit board 500 is fixed to the liquid container 100 such that the center line CL500 of the board main body 501 is coincident with the center line CLsp of the liquid supply port as viewed in a direction perpendicular to the surface (front surface, back surface) of the circuit board 500. Accordingly, by symmetrically arranging the first electrodes 501AR, 501AL about the center line CL500 of the board main body 501, it is possible to properly and accurately position the first electrodes 501AR, 501AL relative to the liquid consuming apparatus electrodes 91*c*.

The circuit board according to the present embodiment has a first positioning through-hole 506 or notch 507 located on the center line CL500, and a second positioning through-hole 506 or notch 507 located on the center line CL500.

By this arrangement, the circuit board 500 can be accurately positioned relative to the liquid container 100.

In the circuit board according to the present embodiment, the second electrodes 501BR, 501BL are arranged asymmetrically about the center line CL500, and the distance DBR (DBL) between the inner and outer edges 501BRIE, 501BROE (501BLIE, 501BLOE) of each of the second electrodes 501BR (501BL) is greater than a distance DAR (DAL) between the inner and outer edges 501ARIE, 501AROE (501ALIE, 501ARIE) of each of the first electrodes 501AR (501AL).

Although it is also preferable to arrange the terminal plates 250 of the sensor unit 200 symmetrically about the center line CL500 of the board main body 501 as viewed in a direction perpendicular to the surface (front surface, back surface) of the circuit board 500, it may not always be possible to arrange the terminal plates 250 symmetrically about the center line CL500 due to space limitations caused by the shape of the liquid container 100, the shape of another member (a side cover 102 in the present embodiment) of the liquid container 100, or the like. In such a case, the second electrodes 501BR, 501BL can be disposed asymmetrically about the center line CL500 to conform to the locations of the terminal plates 250. In such a case, it is preferable to increase the width of the second electrodes 501BR, 501BL, i.e. the distance DBR, DBL, to provide a more reliable electric connection between the second electrodes 501BR, 501BL and the terminal plate 250.

In the circuit board according to the present embodiment, the first electrodes 501A are electrically connected to the second electrodes 501B though printed conductors PC formed on the first surface, an inner circumferential wall of a through-hole TH of the board main body and the second surface (see FIGS. 17A and 17B).

The electrical connection between the first electrode 501A and the second electrode 501B can be readily achieved using conductor printing technology. Using the inner circumferential wall of the through hole TH of the board main body 501 can reduce the length of the printed conductor PC required for electrical connection between the first electrode 501A and the second electrode 501B. In particular, since the first electrode 501A and the second electrode 501B are electrically connected to the terminal plate 250 of the piezoelectric sensor unit 200, signals transmitted between the piezoelectric sensor unit 200 and the liquid consuming apparatus through the first electrode 501A and the second electrode 501B are analog signals. Therefore, by shortening the length of the printed conductor PC, it is possible to prevent noise from being superimposed on the analog signals.

In the circuit board according to the present embodiment, one 501AR (501AL) of the first electrodes 501A, which is electrically connected to a corresponding one 501BR (501BL) of the second electrodes 501B, is at least in part overlapped with the corresponding one 501BR (501BL) of the second electrodes 501B as viewed in a direction perpendicular to the first and second surfaces.

By this arrangement, it is possible to shorten the connection length between the first electrode 501AR (501AL) and the corresponding second electrode 501BR (501BL).

The circuit board according to the present embodiment has a memory M mounted to the second surface of the board main body, and third electrodes 501M formed on the first surface of the board main body and electrically connected to the memory M. The first electrodes 501A and the third electrodes 501M are arrayed in a first row, and the first electrodes 501A are respectively disposed at the outermost ends of the row.

In a case in which liquid container electrodes contacted by liquid consuming apparatus electrodes when the liquid container is mounted to the liquid consuming apparatus are arrayed in an electrode row (in the present embodiment, the first electrodes 501A and the third electrodes 501M are arrayed in an upper row), the outermost electrodes in the electrode row have the highest possibility of being shifted relative to the liquid consuming apparatus electrodes. In other words, if the outermost electrodes in the electrode row are properly positioned relative to the corresponding liquid consuming apparatus electrodes, then the electrodes inside the outermost electrodes in the electrode row also will be properly positioned relative to the corresponding liquid consuming apparatus electrodes.

When the liquid container is mounted to the liquid consuming apparatus, the liquid consuming apparatus initially detects whether or not the liquid container contains the liquid therein. If the liquid container contains the liquid, the liquid consuming apparatus then accesses the liquid container's memory to obtain various types of information from the memory. Therefore, the liquid consuming apparatus accesses, at first, the first electrode 501A and then the third electrode 501M.

In view of these points, it is advantageous to dispose the first electrodes 501A at the outermost ends of the row, as is explained in greater detail below.

In a case in which the liquid consuming apparatus tries to access the first electrodes 501A but cannot access the first electrodes 501A, the liquid consuming apparatus can conclude that the liquid container is not properly positioned relative to the liquid consuming apparatus. Consequently, the liquid consuming apparatus, without accessing the memory, can inform a user of a fact that the liquid container is not properly positioned and can prompt the user to re-mount the liquid container. It is also possible to prevent damaging the memory which might otherwise be caused by the improper access to the memory due to, say, misaligned contacts.

A case in which the liquid consuming apparatus can access the first electrodes 501A located at the outermost ends of the electrode row means that the third electrodes 501M located between the first electrodes 501A are positioned properly, and therefore if the liquid consuming apparatus is arranged to access the third electrodes 501M after the liquid consuming apparatus has accessed the first electrodes 501A, it is possible to prevent the damage of the memory caused by the improper access to the memory through misaligned contacts. In other words, by disposing the first electrodes 501A at the outermost ends of the electrode row, it is possible not only to detect whether or not liquid exists in the liquid container but also to detect whether or 0 not the liquid container is properly positioned relative to the liquid consuming apparatus.

The voltage applied to the first electrodes 501A electrically connected to the terminal plates 250 of the piezoelectric sensor unit 200 is higher than the voltage applied to the third electrode 501M electrically connected to the memory M.

Therefore, disposing the first electrodes 501AR, 501AL at the outermost ends of the electrode row (i.e. increasing the distance between the first electrodes 501AR, 501AL and the distance between the second electrodes 501BR, 501BL) is also advantageous from the viewpoint of preventing a short-circuit between the first electrodes 501AR, 501AL and between the second electrodes 501BR, 501BL.

In the circuit board according to the present embodiment, each of the second electrodes is larger in area than each of the first electrodes.

The contact between the second electrode 501B and the terminal plate 250 of the sensor unit 200, i.e. the electrical connection therebetween, can be made more reliable by effectively using a space of the second surface (back surface) of the board main body 501.

In the circuit board according to the present embodiment, the first and third electrodes have the same shape and size.

It is possible to increase the positioning accuracy of the first and third electrodes 501A, 501M relative to the electrodes of the liquid consuming apparatus. Since the electrodes of the liquid consuming apparatus, which respectively contact the first and third electrodes 501A, 501M can be made to have the same shape and size, it is possible to decrease manufacturing cost. Similarly, since the electrodes of the liquid consuming apparatus, which respectively contact the first and third electrodes 501A, 501M can be arrayed at the same pitch, it is possible to decrease manufacturing cost.

In the circuit board according to the present embodiment, the first and third electrodes are arrayed at a same pitch.

The circuit board 500 according to the present embodiment has a board main body 501, a pair of first electrodes 501A for electrical connection to the electrodes 91*c* of the liquid consuming apparatus, the first electrodes 501A being formed on a first surface of the board main body, a pair of second electrodes 501B for electrical connection to the terminal plates 250 of the sensor unit 200, the second electrodes 501B being formed on an opposite, second surface of the board main body 501 and electrically connected respectively to the first electrodes 501A, a memory M mounted to the second surface of the board main body 501 and third electrodes 501M formed on the first surface of the board main body 501 and electrically connected to the memory M. The first electrodes 501A and the third electrodes 501M are arrayed in a first row, and the first electrodes 501A are respectively disposed at outermost ends of the row.

The pair of electrodes 501A for electrical connection to the electrodes 91*c* of the liquid consuming apparatus are formed on the first surface (front surface) of the board main body 501, and the pair of electrodes 501B for electrical connection to the terminal plates 250 of the sensor unit 200 are formed on the opposite, second surface (back surface) of the board main body 501. Accordingly, since the side on which the electrodes 91*c* of the liquid consuming apparatus are electrically connected to the first electrodes 501A, and the side on which the terminal plates 250 are electrically connected to the second electrodes 501B can be surely separated from each other by the board main body 501, the electrical connection between the terminal plates 250 and the second electrodes 501B are not adversely affected by the electrical connection between the electrodes 91*c* of the liquid consuming apparatus and the first electrodes 501A.

By disposing the first electrodes 501A at the outermost ends of the electrode row, it is possible not only to detect whether or not the liquid exists in the liquid container but also to detect whether or not the liquid container is properly positioned relative to the liquid consuming apparatus.

It is also advantageous to dispose the first electrodes 501A at the outermost ends of the electrode row to help prevent short-circuiting between the first electrodes 501A and between the second electrodes 501B.

According to the present embodiment, since the sensor accommodating recess portion 110 for accommodating the sensor unit 200 is reliably covered (sealed, if necessary) with the cover member 150, the sensor unit 200 provided therein can be protected so that reliability and safety can be enhanced. In particular, the undesirable movement of ink mist (liquid mist) into the sensor accommodating recess portion 110 can be prevented by the cover member 150. Therefore, it is possible to eliminate the possibility that the ink mist might stick to the piezoelectric unit 234. Moreover, outside air currents will not enter the sensor accommodating recess portion 110. Therefore, it is possible to detect the amount of residual ink without their being any influence due to the turbulence of air currents.

Also, should the ink cartridge 100 be dropped, this arrangement means the sensor unit 200 can be prevented from being directly shocked. Consequently, it is possible to protect the delicate piezoelectric unit 234 and the peripheral structure thereof. Moreover, the contact 501A electrically connected to the terminal plate 250 on the sensor unit 200 side is provided on the external surface of the cover member 150. Therefore, it is possible to easily make an electrical connection between the sensor unit 200 and the apparatus through the contact 501A.

Furthermore, a part of the cover member 150 is constituted by the circuit board 500. By simply providing the contacts 501A and 501B on the circuit board 500, it is easy to make the electrical connections between the sensor unit 200 and the apparatus. In addition, it is also possible to easily mount a proper electronic component, for example, a memory on the circuit board 500. Consequently, it is also possible to record information about the ink cartridge 100 and information about the ink.

Moreover, the circuit board 500 is fabricated separately from the cover 400 and can be freely attached to the cover 400 later. Therefore, only the cover 400 can be a common component and the circuit board 500 can also be provided as an individual component which can be exchanged depending on specifications (this way, different circuit boards could be used in the same cover 400).

Furthermore, it is possible to support the spring 300 by means of the spring support portion 409 and/or the engagement arms 405 which are provided on an internal surface of the cover 400. Consequently, it is possible to prevent the spring 300 from shifting and it is easy to position the spring 300.

In the embodiment, moreover, the spring 300 and the sensor unit 200 are arranged in the direction of the height of the cartridge case 101 in a region having the shape of a rectangular parallelepiped (the height is approximately orthogonal to the top face 101*c* and the bottom face 101*d*) and are thus assembled. Therefore, a reaction force of the spring 300 can be received by a wall surface in the direction of the height of the cartridge case 101 (an upper wall surface of the sensor accommodating recess portion 110). Usually, the cartridge case 101 has a greater dimension in the direction of the height. Also in the case in which the spring force of the spring 300 is increased, therefore, it is possible to receive the force of the spring 300 with a strength having a margin by means of the wall surface in the direction of the height (the upper wall surface of the sensor accommodating recess portion 110).

In addition, an insertion opening 110*h* of the sensor accommodating recess portion 110 is provided on the side surface 101*b* having a small width in the cartridge case 101 and the cover member 150 having the contact 501A on the external surface is disposed thereon. Therefore, it is possible to carry out the electrical connection to the apparatus by the contact 501A present on the narrower side surface 101*b*. When a large number of cartridge cases 101 are arranged to be compact as a whole, the cartridge cases 101 are arrayed such that the wider side surfaces 101*a* of the cartridge cases 101 are adjacent to one another. In this case, all of the contacts 501A on the small width side surfaces 101*b* of the cartridge cases 101 can be arranged to face the apparatus so that the connection to the apparatus can easily be carried out.

According to the embodiment, by simply incorporating the sensor base 220 mounting the sensor chip 230 into the unit base 210 from above and attaching the adhesive film 240 across the upper surfaces of two components which are arranged, that is, both the upper surfaces of the sensor base 220 and the unit base 210, it is possible to join and seal the two components formed from different materials (the sensor base 220 can be formed of metal and the unit base 210 can be formed of resin) at the same time. Accordingly, an assembling workability is very excellent. Moreover, the adhesive film 240 is simply stuck across the two components. Therefore, it is possible to seal the components without the need for high precision in the dimensions of the components. In the case in which the adhesive film 240 is to be welded by heating and pressurizing, for example, it is possible to enhance a sealing performance by simply managing a temperature and a pressure. This can be done using commonly-available equipment. Therefore, it is possible to easily achieve a stabilization in the mass production. Furthermore, the adhesive film 240 used can easily be attached, and furthermore, a space efficiency is high. Therefore, it is possible to reduce the size of the sensor unit 200.

Moreover, there is employed a structure in which the inlet side passages 212 and 222 and the outlet side passages 213 and 223 for the sensor cavity 232 are formed in the unit base 210 and the sensor base 220 respectively and the ink flows into the sensor cavity 232 through the inlet side passages 212 and 222 and is discharged through the outlet side passages 223 and 213. Therefore, the ink flows smoothly to the sensor cavity 232. Consequently, it is possible to prevent an erroneous detection result from being caused by stagnation of the liquid or air bubbles collecting in the sensor cavity 232.

Furthermore, the height of the bonding surface of the adhesive film 240 to the unit base 210 is set to be smaller than that of the bonding surface to the sensor base 220. Therefore, it is possible to press the sensor base 220 with a step by means of the adhesive film 240 and to increase a fixing force of the sensor base 220 to the unit base 210. This can securely attach the parts without looseness.

In addition, the sensor unit 200 is disposed in the vicinity of the termination of the feeding path in the cartridge case 101, and the inlet side passages 212 and 222, the sensor cavity 232 and the outlet side passages 223 and 213 in the sensor unit 200 are provided in series in the feeding passage so as to be arranged from the upstream side in this order. Therefore, it is possible to accurately detect the amount of the residual liquid in the ink cartridge 100.

Figure 10:
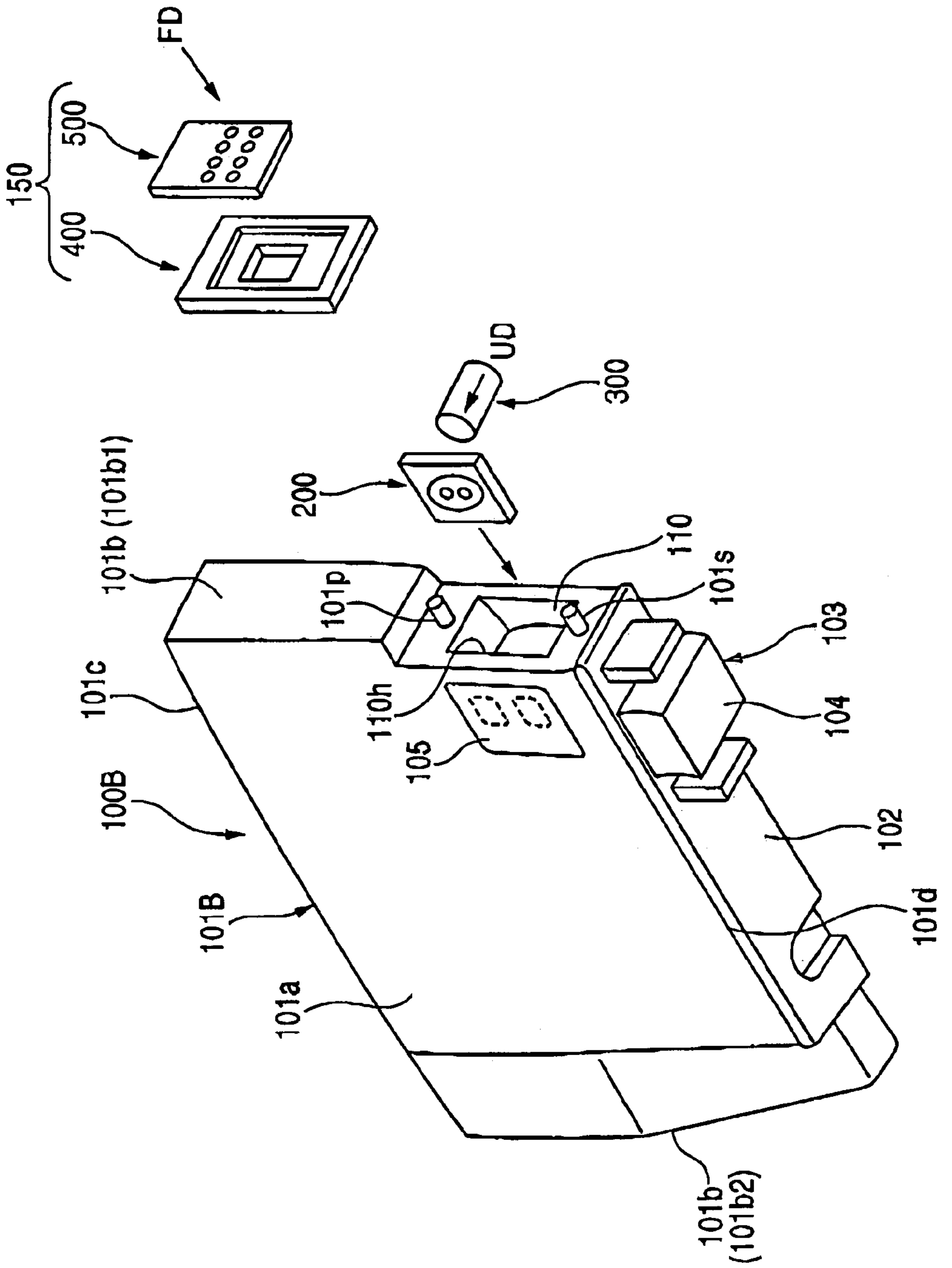
FIG. 10 is an exploded perspective view showing a schematic structure of an ink cartridge according to a second embodiment of the invention.
Figure 11:
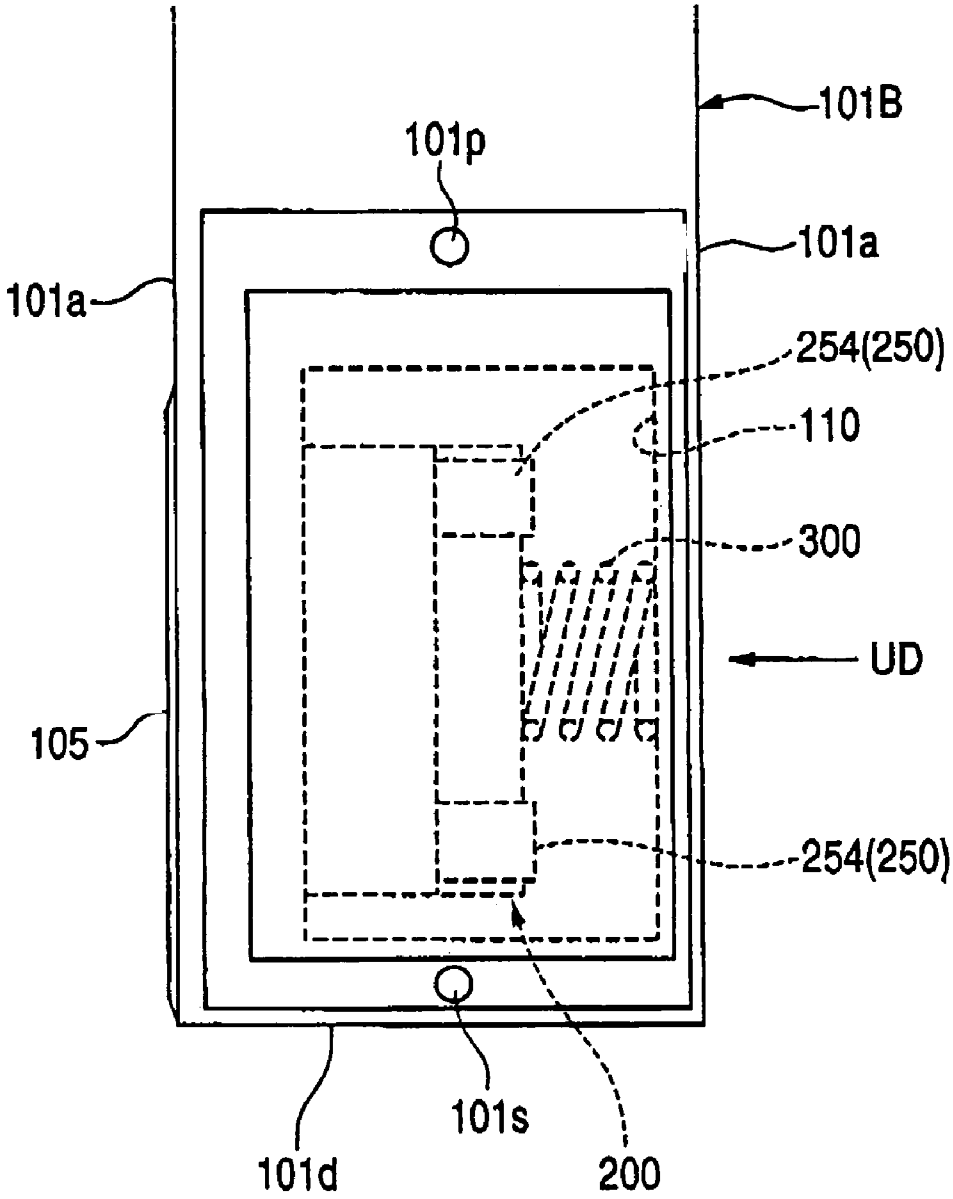
FIG. 11 is a front view showing a portion in which a sensor unit is assembled into the ink cartridge.
Figure 12:
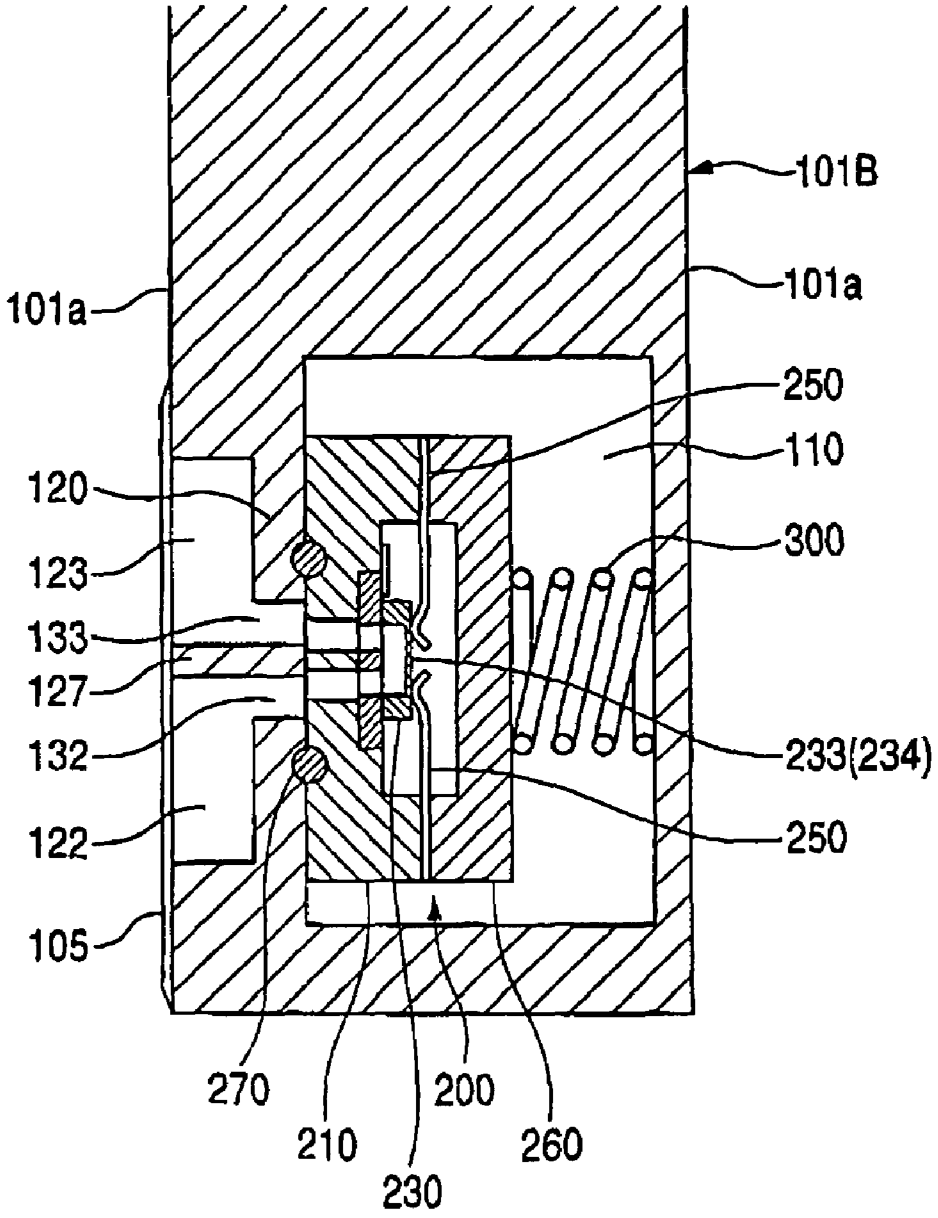
FIG. 12 is a sectional view seen in the same direction as that in FIG. 11.

While the foregoing description has been has been based on the structure having the sensor receiving wall 120 provided on the lower side of the sensor accommodating recess portion 110 and the two sensor buffer chambers 122 and 123 opened on the lower surface of the cartridge case 101 being provided on the lower side thereof, and the spring 300 and the sensor unit 200 being vertically arranged and disposed in the sensor accommodating recess portion 110 in such a manner that the pressurizing direction of the spring 300 acts downward toward the sensor receiving wall 120 in the embodiment, other structures of an ink cartridge 100B such as that shown in FIGS. 10 to 12 may be employed.

SECOND EMBODIMENT

In the ink cartridge 100B according to the second embodiment, a sensor accommodating recess portion 110 is provided at the narrow side surface 101*b*1 of a00 cartridge case 101B having the same external shape as that in the first embodiment. However, as shown in FIGS. 10-12, a sensor receiving wall 120 is provided at a lateral side, that is, a wider side surface 101*a* side and not the lower side, of the sensor accommodating recess portion 110. Two sensor buffer chambers 122 and 123 are provided at the wider side surface 101*a* side of the sensor receiving wall 120, and are opened at the wider side surface 101*a*. A spring 300 and a sensor unit 200 are arranged in a lateral direction which is orthogonal to the wider side surface 101*a*, and are disposed in the sensor accommodating recess portion 110 in such a manner that the force applied by the spring 300 acts laterally and presses toward the sensor receiving wall 120 located at the lateral side.

In other words, the sensor buffer chambers 122 and 123 are oriented in a direction orthogonal to the orientation of such chambers in the first embodiment, and the sensor unit 200 and the spring 300 are correspondingly disposed laterally. Other parts of the sensor unit 200 and cartridge case 101B can have the same structures except that the direction in which they are arranged is different. Therefore, the same components have the same designations and their description will be omitted. In the same manner as the previous embodiment, an insertion opening 110*h* of the sensor accommodating recess portion 110 is closed with a cover member 150 constituted by a cover 400 and a circuit board 500.

By employing a structure having the spring 300 and the sensor unit 200 arranged and incorporated in a direction of a thickness of the cartridge case 101B taking the shape of a rectangular parallelepiped (a direction orthogonal to the wider side surface 101*a*), it is possible to reduce the thickness of the cartridge case 101B corresponding to the dimensions of the sensor unit 200 and the spring 300. Other advantages are the same as those of the first embodiment.

THIRD EMBODIMENT

A third embodiment of the present invention will be discussed with reference to the accompanying drawings.

Figure 13:
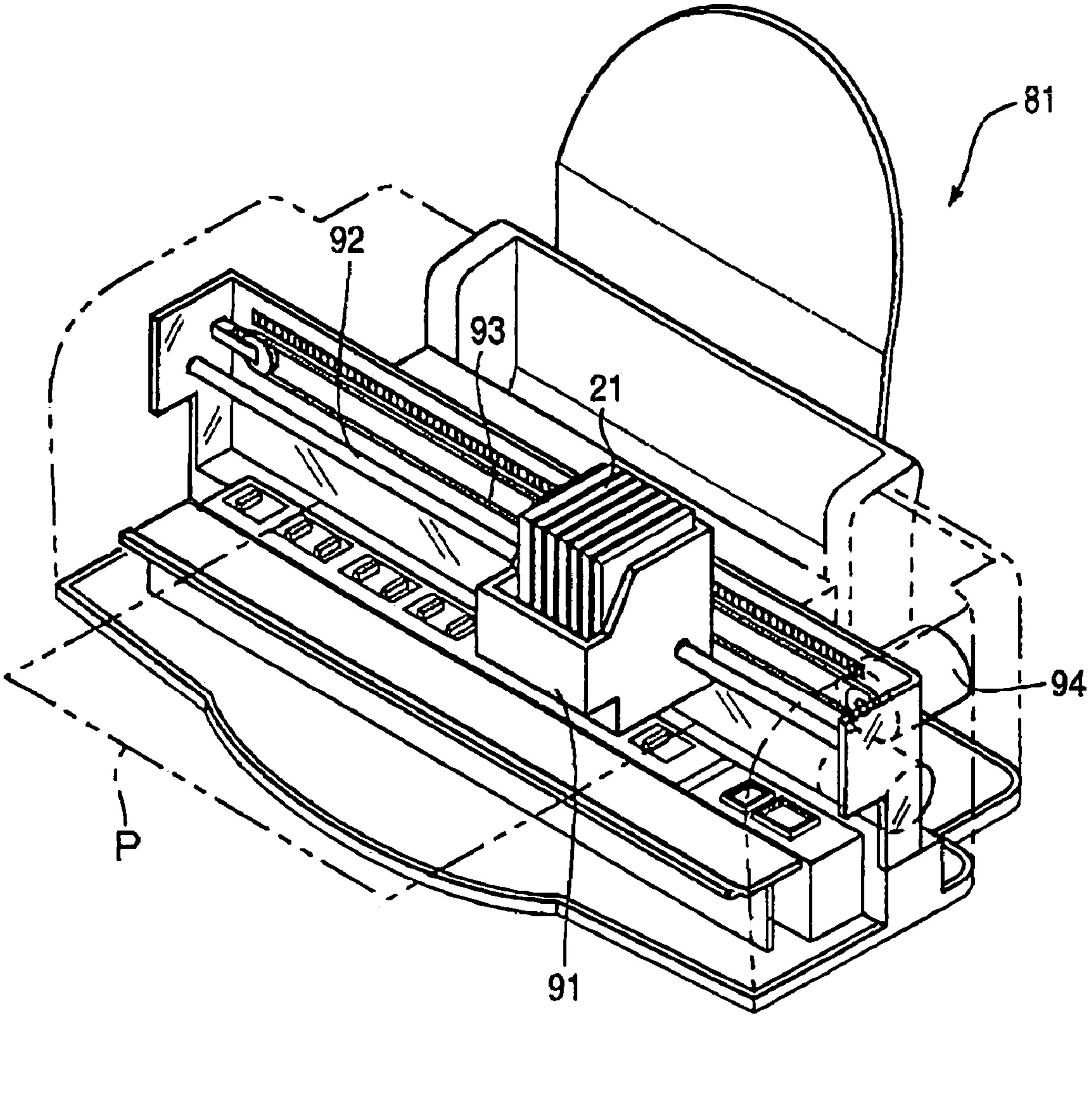
FIG. 13 is a perspective view showing a printer.

FIG. 13 is a perspective view showing an example of a printer 81 (liquid consuming apparatus). The printer 81 shown in FIG. 13 functions as a recording apparatus which records characters, images, etc. by ejecting ink onto a medium, such as paper, P.

The printer 81 has a carriage 91 that is movable along a shaft 92 in a direction perpendicular to a feeding direction of the medium P, and that is driven by a motor 94 via a belt 93.

A carriage 91 removably mounts an ink cartridge (liquid container) 21 thereon, and has a head (not shown) at a position facing the medium P to eject ink supplied from the ink cartridge 21.

Figure 14:
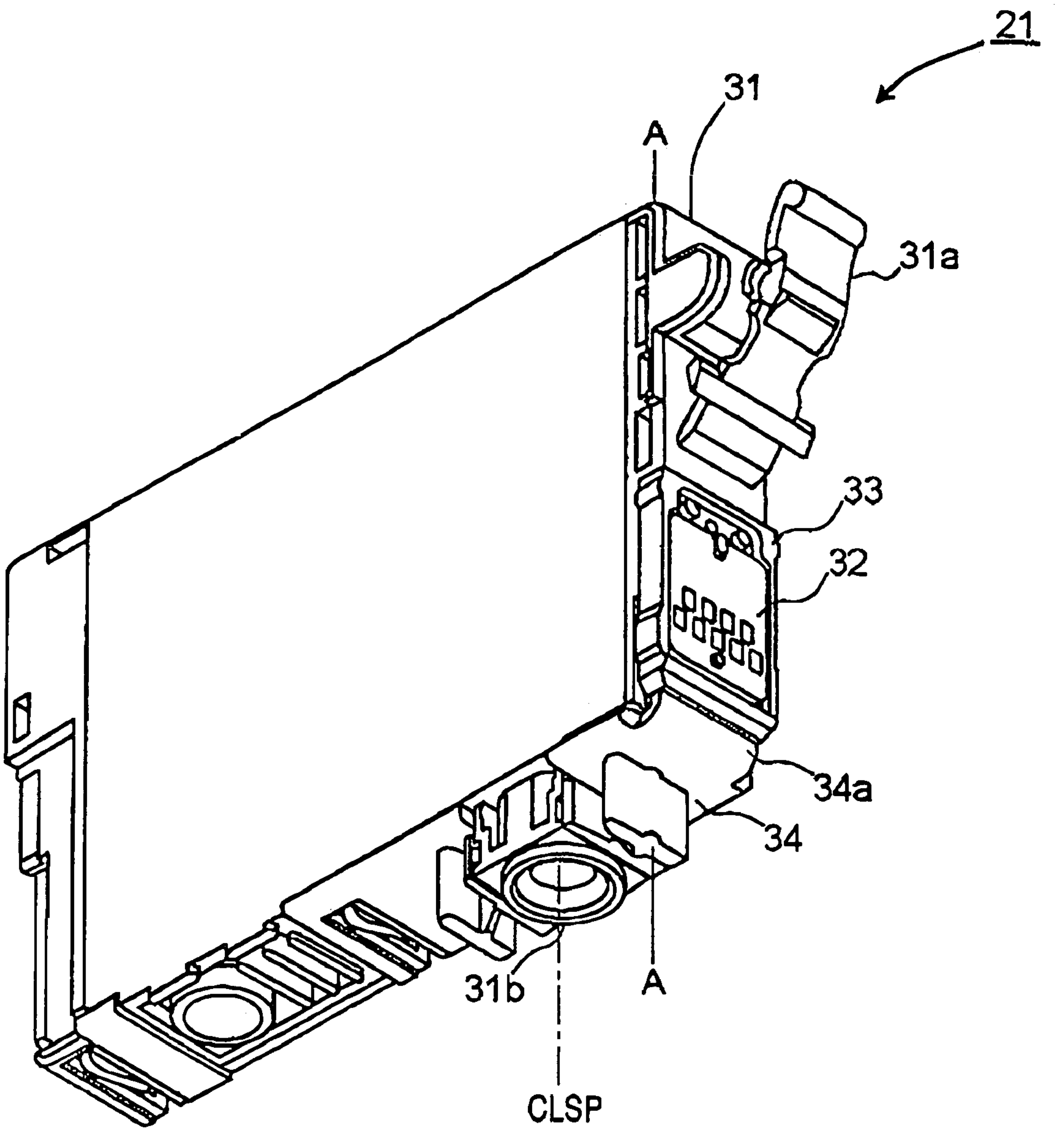
FIG. 14 is a perspective view showing an ink cartridge according to a third embodiment of the present invention.
Figure 15:
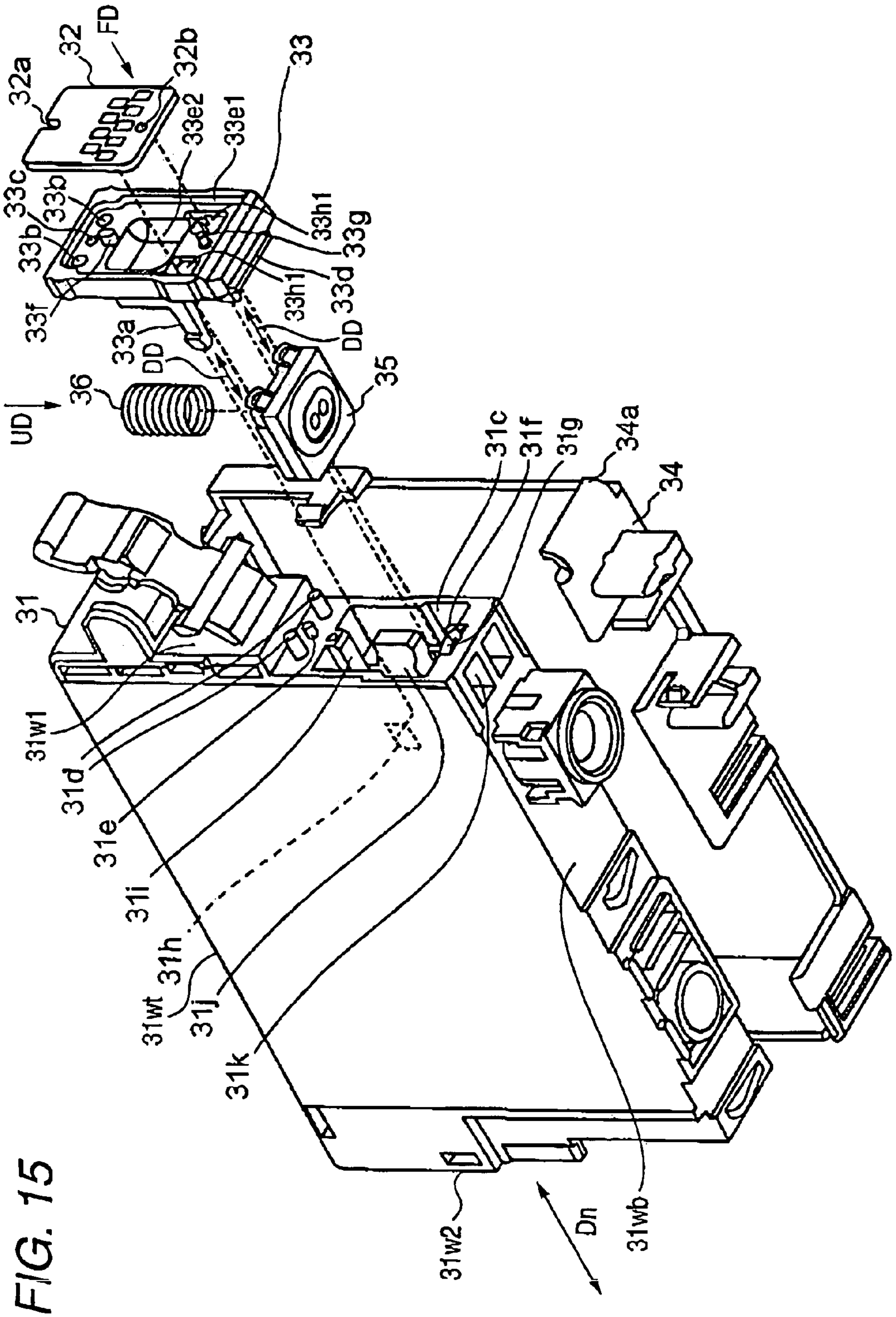
FIG. 15 is an exploded perspective view showing the ink cartridge according to the third embodiment.

FIG. 14 is a perspective view showing the ink cartridge (liquid container) 21 according to the third embodiment of the present invention. FIG. 15 is an exploded perspective view showing the ink cartridge 21 according to the third embodiment.

The ink cartridge 21 includes a cartridge main body (container body) 31, a sensor (sensor unit) 35 for detecting depletion of ink in the cartridge main body 31, a cover member 33 to which a circuit board 32 is fixed, and a side cover 34.

A sensor accommodating recess portion 31*c* is formed in a front surface of the cartridge main body 31, and the sensor 35 is disposed in the sensor accommodating recess portion 31*c*. In the sensor accommodating recess portion 31*c*, the sensor 35 is placed on a wall of the cartridge main body 31 (a bottom wall of the recess portion 31*c*), and is urged toward that wall by a force applied by a spring (urging member) 36. The cover member 33 (board supporting member) having the board (circuit board) 32 fixed thereto is fixed to an open end of the sensor accommodating recess portion 31*c* so as to cover the sensor 35. The cover member 33 and the board 32 constitute an electrode supporting member in the present embodiment. The side cover 34 for covering a side surface and a part of a bottom surface of the cartridge main body 31 is attached to the cartridge main body 31 by engagement such as snap fit.

The detailed structure of these components will be discussed hereinafter.

The cartridge main body 31 will be discussed first.

As shown in FIG. 15, the cartridge main body 31 is in the shape of a substantially rectangular parallelepiped, and includes a lever 31*a* disposed on a front surface (first wall) 31*w*1 and used as an operating portion for mounting and removing the ink cartridge 21 and an ink outlet (liquid supply port) 31*b* formed in a bottom surface (bottom wall 31*wb*). The container main body 31 further includes an ink accommodating portion (liquid accommodating portion) 61 and a check valve 62 inside the container main body 31 (see FIG. 24). The cartridge main body 31 is formed from resin, and its side surfaces opposed to each other are sealed by films so that ink can be filled in the ink accommodating portion.

The sensor accommodating recess portion 31*c* is formed at a location that is in the front surface of the cartridge main body 31 and that is offset to the bottom surface thereof. The front surface of the cartridge main body 31 has shafts 31*d*, 31*e* which are formed just above the sensor accommodating recess portion 31*c*, and a positioning protrusion (shaft portion) 31*f* and a semi-cylindrical protruded portion 31*g* which are formed just below the sensor accommodating recess portion 31*c*. The shafts 31*d*, 31*e*, 31*f* and the protruded portion 31*g* are used for fixing the cover member 33.

Figure 20:
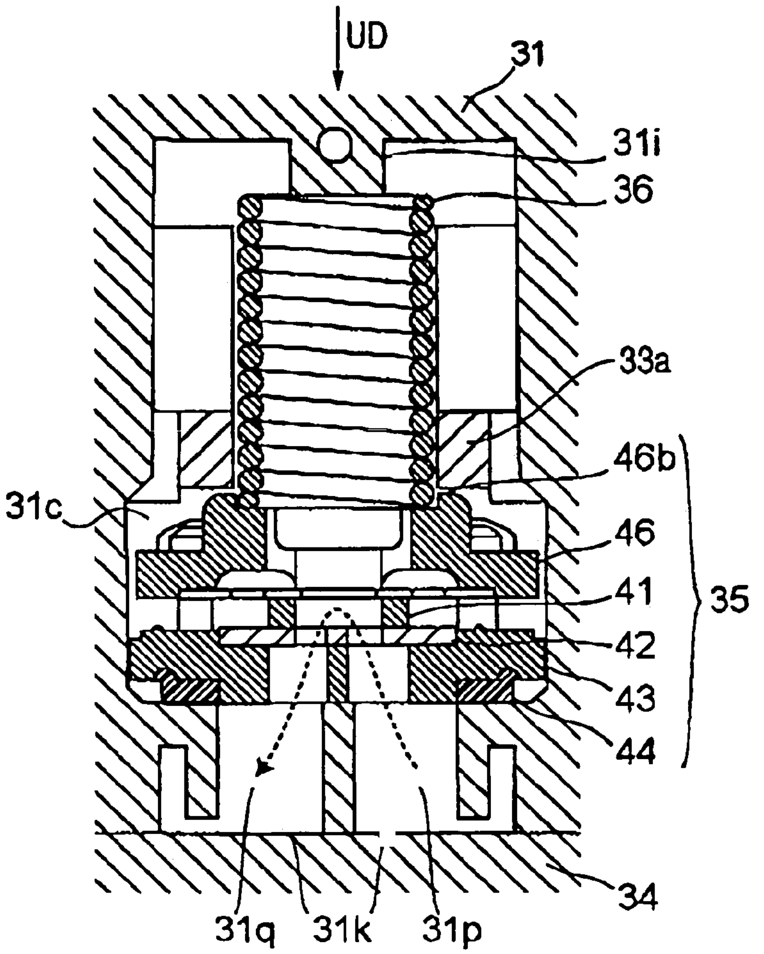
FIG. 20 is a sectional view of the ink cartridge taken along a plane parallel to a front surface at A-A of FIG. 14.

The sensor accommodating recess portion 31*c* defines a substantially parallelepipedal space, and has engagement recess portions 31*h* respectively formed in its side surface inner walls. The upper surface inner wall of the recess portion 31*c* is formed with a protruded portion 31*i* extending in a depth direction of the sensor accommodating recess portion 31*c*. The rear surface inner wall of the recess portion 31*c* is formed with a semi-cylindrical recess portion 31*j* oriented such that the axial direction is coincident with the height direction of the cartridge. The bottom surface inner wall of the sensor accommodating recess portion 31*c* is formed with a part of the ink flow path (liquid supply path) as shown in FIG. 20. When the cover member 33 is fixed to the cartridge, tip ends of pawls (protruded engagement portions) 33*a* of the cover member 33 are fitted into the engagement recess portions 31*h*, respectively. The protruded portion 31*i* and the recess portion 31*j* are used for fixing the spring 36 in position.

Next, the cover member 33 will be discussed.

Figure 16:
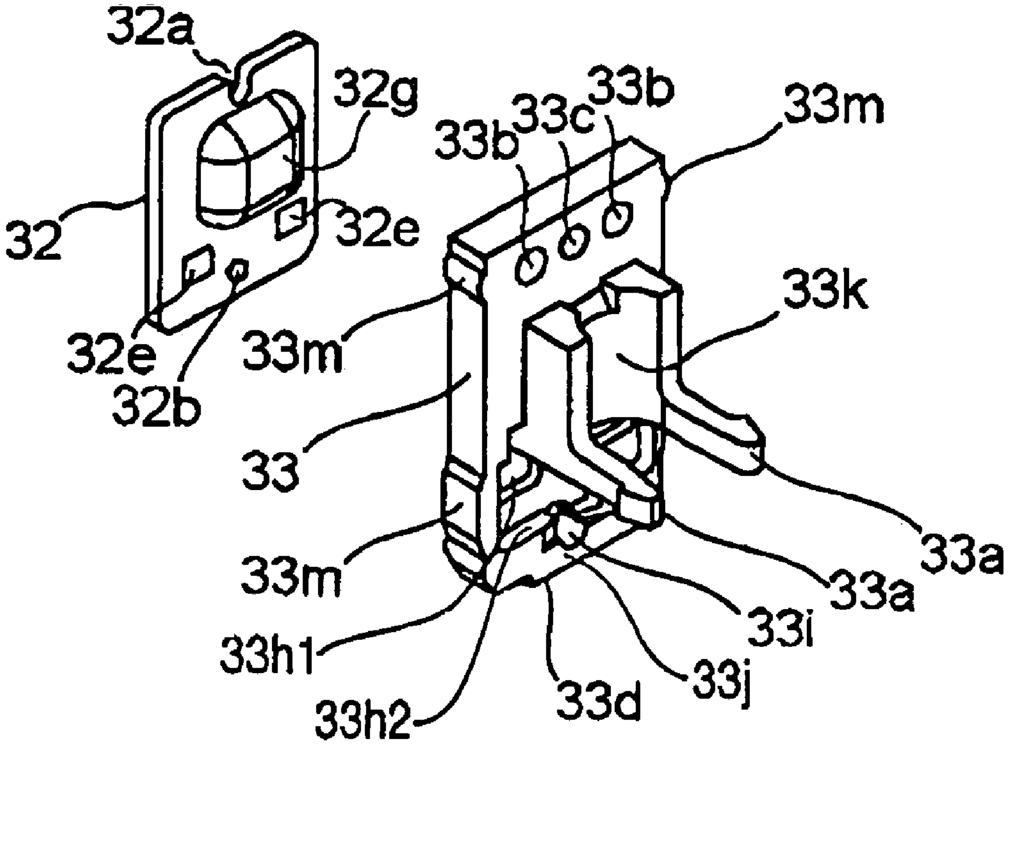
FIG. 16 is a perspective view showing a board and a cover member shown in FIG. 15.

FIG. 16 is a perspective view showing the board 32 and the cover member 33 shown in FIG. 15.

As shown in FIGS. 15 and 16, the cover member 33 is formed from resin, and has such a shape that two pawls 33*a* protrude from a back surface of a substantially rectangular plate portion in a substantially perpendicular direction. The tip end of each of the two pawls 33*a* has a slender tapered shape, and has a hook oriented outward. The pawl 33*a* is disposed at an offset position closer to one end (the lower end surface in FIG. 16) of the cover member 33 than to the other end (the upper end surface in FIG. 16) thereof. Holes 33*b*, 33*c* are formed through the upper end portion of the cover member 33 to extend between the front and back surfaces. A protrusion 33*d* is formed on the lower end of the cover member 33 for engagement with a flange portion 34*a* of the side cover 34. The holes 33*b*, 33*c* are used for fixing the cover member 33 to the cartridge main body 31. Of these holes, the hole 33*c* is used for positioning, and the two holes 33*b* are used for thermal caulking or thermal riveting.

Thermal caulking or thermal riveting refers to the practice of placing two pieces of thermoplastic material together and then heating and deforming at least one of those pieces of material to join the two pieces together. By way of example, and not limitation, one way of doing this is to provide a first piece having a projection and a second piece having a hole dimensioned to receive the projection, the projection extending through and beyond the hole when the pieces are placed together. The pieces are put together so that the exposed end of the projection extends beyond the hole, and then that exposed end is heated. When pliable, the exposed end is deformed (flattened) to be wider than the hole. The projection cools and becomes inflexible, and cannot be withdrawn back through the hole, so the projection holds the two parts together.

The front surface of the cover member 33 has a recess portion 33*e*1 for accommodating therein the board 32, and a recess portion 33*e*2 for accommodating therein a protruded portion on the back surface of the board 32. The front surface of the cover member 33 is formed with a protruded portion 33*f* closer to the upper end and a protruded portion 33*g* closer to the lower end. The protruded portions 33*f*, 33*g* are used for fixing the board 32 to the cover member 33. The protruded portions 33*f*, 33*g* are shafts for positioning and thermal caulking, respectively (these functions could be reversed or mixed, if desired).

Insertion holes (through holes) 33*h*1 pass through the cover member 33 and extend between the front and back surfaces. A recess portion 33*h*2 is formed at the back surface side open ends of the two insertion holes 33*h*1, and an end portion of the sensor 35 is placed at the recess portion 33*h*2.

A hole 33*i* and a recess portion 33*j* are formed in the back surface lower end portion of the cover member 33. A semi-cylindrical recess portion 33*k* is formed between the two pawls 33*a* and is oriented such that its axial direction is coincident with the height direction of the cartridge. The holes 33*i* and the recess portion 33*j* are used for positioning and fixing the cover member 33 to the cartridge main body 31. The recess portion 33*k* is used as a guide when the spring 33 is fixed. The hole 33*i* and the recess portion 33*j* are used for positioning, and the hole 33*i* is not necessarily used for thermal caulking.

Protruded portion 33*m* are formed at two locations on each side surface of the cover member 33. In other words, four protruded portions 33*m* in total are formed on the side surfaces of the cover member 33. Accordingly, when the ink cartridge 21 is mounted to the carriage 91, these protruded portions 33*m* contact the carriage 91 to enhance the positioning accuracy of terminals (terminals 32*c*, 32*d* in FIG. 17(A)) on the board 32 fixed to the cover member 33 relative to terminals (contact terminals 91*c* in FIG. 24) of the carriage 91. Further, since the protruded portions 33*m* are integrally molded on the cover 33 which is smaller than the cartridge main body 31, it is possible to prevent the positioning accuracy from being reduced due to shrinkage during molding.

As described above, the recess portion 33*e*1 and the protruded portions 33*f*, 33*g* are formed on the front surface of the cover member 33 as fixing portions for fixing the board 32, and the two pawls 33*a* are formed on the opposite, back surface thereof for fitting cover member 33 to the cartridge main body 31. Accordingly, the board 32 is fixed to the cover member 33 so as not to be separated therefrom, and the cover member 33 is fixed to the cartridge main body 31 so as not to be separated therefrom. That is, the cover member 33 serves as a board attaching member for securing the board 32 to the cartridge main body 31.

Next, the board (circuit board) 32 will be discussed. FIGS. 17A to 17C show the board 32 depicted in FIG. 15. FIG. 17A is a front view of the front surface of the board 32. FIG. 17B is a back view showing the back surface of the board 32. FIG. 17C is a side view of the board 32.

A board main body 32M is a hard board made of glass epoxy or the like, which has circuit patterns formed on both surfaces thereof. The upper end of the board main body 32M is formed with a notch 32*a*, and the lower end thereof is formed with a hole 32*b*. The notch 32*a* and the hole 32*b* are used for fixing the board 32 to the cover member 33. The notch 32*a* is used for thermal caulking.

Seven memory terminals (memory electrodes) 32*c* for electric power supply to the memory 32*f* and data input/output with the memory 32*f* and two output terminals (outer electrodes) 32*d* for electrical signal output from the sensor 35 are formed on the front surface of the board main body 32M. These terminals 32*c*, 32*d* are constructed by lands on the printed board, and are contacted by contact terminals (electrodes, see FIG. 24) 91*c* of the carriage 91 when the ink cartridge 21 is mounted to the carriage 91. The memory 32*f* can be a non-volatile semiconductor memory accessed by the printer 81 to read therefrom and write therein data on an ink consuming amount or an ink remaining amount or any other type of data of interest.

Figure 18:
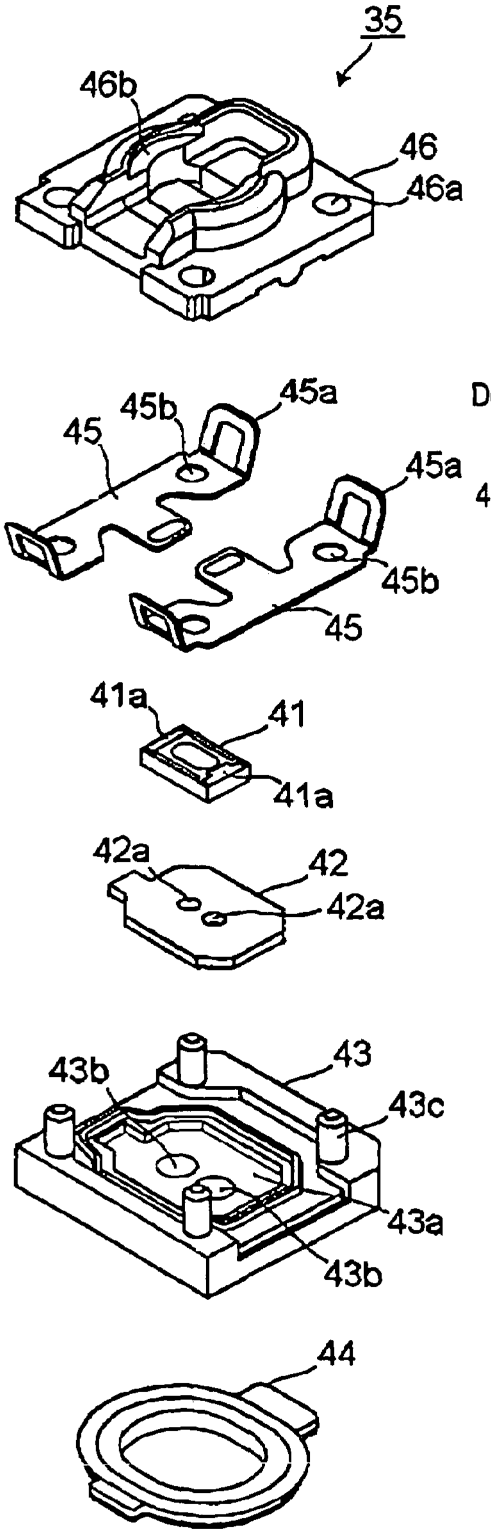
FIGS. 18A and 18B are exploded perspective views showing a sensor shown in FIG. 15.
Figure 18:
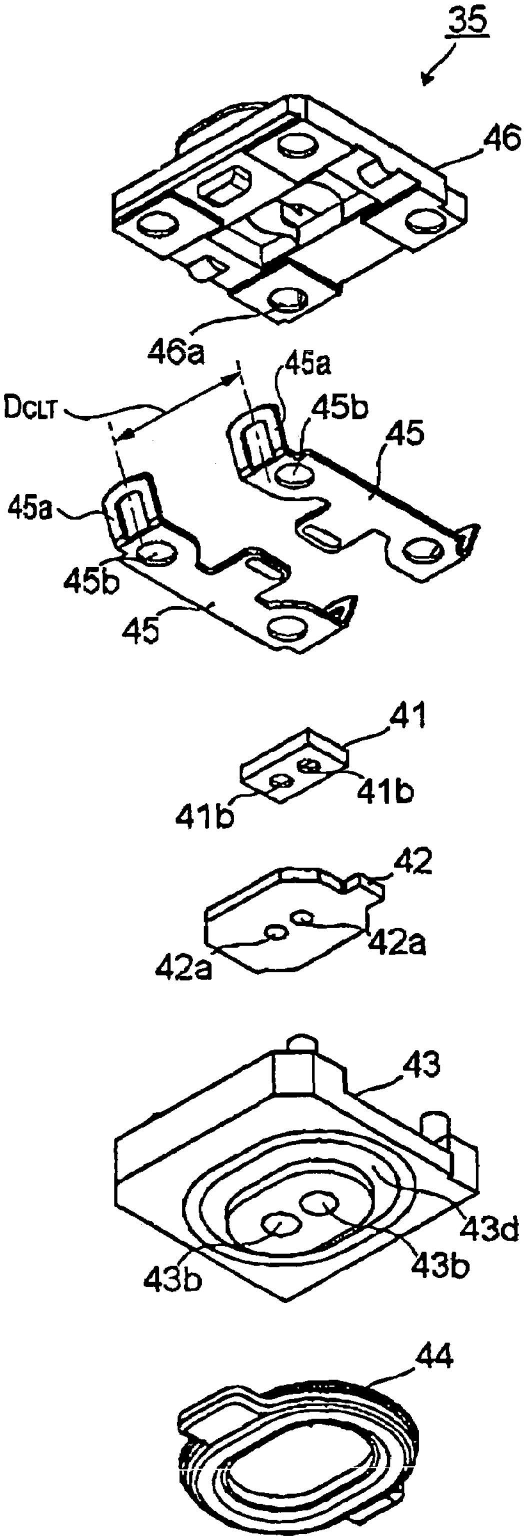

Two terminals (inner electrodes) 32*e* are formed on the back surface of the board main body 32M, which are contacted by elastically deformable terminal plates (electrodes terminals 45 in FIG. 18) of the sensor 35 and to which electric signals are input from the sensor 35. These terminals 32*e* are also constructed by lands on the printed board.

The input terminal 32*e* is larger in area than each of the two output terminals 35*d* used for electric signal output from the sensor 35. The input terminal 32*e* is disposed at such a location as to at least in part overlap with the output terminal 32*d* when viewed in a direction in which the input terminal 32*e* is opposed to the terminal 32*d* with the board main body 32M interposed therebetween, i.e. in a direction perpendicular to the front and back surfaces of the board main body 32M. A center point between the two input terminals 32*e* is disposed at a location that is offset from a widthwise center (center line CL32M) of the board main body 32M by an amount corresponding to a thickness of the side cover 34.

The back surface of the board main body 32M has the protruded portion 32*g* that is formed as a consequence of sealing the memory 32*f* by a molding process after the memory 32*f* is connected to the circuit pattern to be fixed to the board main body 32M.

The memory 32*f* on the back surface of the board main body 32M and the memory terminals 32*c* on the front surface thereof are electrically connected by the circuit pattern (not shown) present on the front and back surfaces of the board main body 32M and passing into through holes (not shown) extending between the front and back surfaces of the board main body 32M. Similarly, the terminals 32*e* on the back surface of the board main body 32M and the output terminals 32*d* on the front surface thereof are electrically connected by a similar circuit pattern passing into through holes (see printed conductors PC formed on the front surface, an inner circumferential wall of a through-hole TH of the board main body 32M and the back surface in FIGS. 17A and 17B).

Next, the sensor 35 will be discussed. FIGS. 18A and 18B are exploded perspective views showing the sensor 35 depicted in FIG. 15. FIG. 18A is an exploded perspective view showing the sensor 35 as viewed from the upper surface side, and FIG. 18B is an exploded perspective view showing the sensor 35 as viewed from the bottom surface side.

As shown in FIGS. 18A and 18B, the sensor 35 includes a sensor element 41, a plate 42, a lower housing 43 made of resin, a seal 44, two electrode terminals (connectors) 45 made of metal, and an upper housing 46 made of resin.

The sensor element 41 is an element for detecting the presence or absence of ink in a part of the ink flow path within the sensor 35. In the present embodiment, the sensor element 41 uses a piezoelectric element to employ a piezoelectric transducer effect. The sensor element 41 receives electric power to generate vibrations for a predetermined duration, and thereafter detects resulting vibrations to output a corresponding electric signal as a signal indicative of the presence or absence of ink. That is to say, the waveform of the electric signal output from the sensor element 41 changes depending on whether or not the ink exists in the ink flow path. The drive voltage applied to the sensor element 41 is higher than the power source voltage applied to the memory 32*f* of the board 32.

Two electrodes 41*a* are formed on the upper surface of the sensor element 41, and two ink flow ports 41*b* are formed through the lower surface of the sensor element 41. The ink flow ports 41*b* are provided so that the interior of the sensor element 41 defines a part of the ink flow path.

The sensor element 41 is adhered and fixed to the plate 42, which can be metal, and the plate 42 to which the sensor element 41 is fixed is disposed in a recess 43*a* of the lower housing 43.

Accordingly, the ink flow ports 41*b* of the sensor element 41, ink flow passage holes 42*a* of the plate 42 and ink flow passage holes 43*b* of the lower housing 43 are made continuous so that the interior space and ink flow ports 41*b* of the sensor element 41, the ink flow passage holes 42*a* of the plate 42 and the ink flow passage holes 43*b* of the lower housing 43 together form a part of the ink flow path, which is located within the sensor 35.

Two electrode terminals 45 are disposed on the upper surface of the sensor element 41. Each of the electrode terminals 45 is positioned in such a manner that support columns 43*c* of the lower housing 43 pass through respective holes 45*b*. The electrode terminals 45 respectively contact the electrodes 41*a* of the sensor element 41. Each of the electrode terminals 45 has such a shape that a flat plate made of metal is bent at both ends. Bent portions 45*a* at both ends are exposed from the sensor 35 to the outside. The inner portion of the bent portion 45*a* preferably is perforated to provide the desired elasticity at the bend site. By providing the desired elasticity in the bending direction at the bend site, an excellent contact pressure can be generated when the electrode terminal 45 contacts the board 32, and a load applied to the electrode terminal 45 does not directly affect the inner portion (in particular, the sensor element 41) of the sensor 35.

The upper housing 46 is disposed on the two electrode terminals 45. The upper housing 46 is positioned in such a manner that the support columns 43*c* of the lower housing 43 are inserted into holes 46*a*. After the support columns 43*c* of the lower housing 43 are inserted into the holes 46*a* of the upper housing 46, the upper end portions of the support columns 43*c* of the lower housing 43 are thermally fused so that the upper housing 46 is fixed to the lower housing 43 by thermal caulking. Accordingly, the electrode terminals 45, the sensor element 41 and the plate 42 are also fixed together within the sensor 35, so that the electrode terminals 45 are electrically connected to the electrodes 41*a* of the sensor element 41 in a stable manner.

The seal (seal member) 44 is fitted to a bottom surface recess portion 43*d* of the lower housing 43. The seal 44 is more elastic than the lower housing 43 and the upper housing 46. The upper surface of the upper housing 46 is formed with a seat 46*b* for receiving the spring (urging member) 36.

Figure 19:
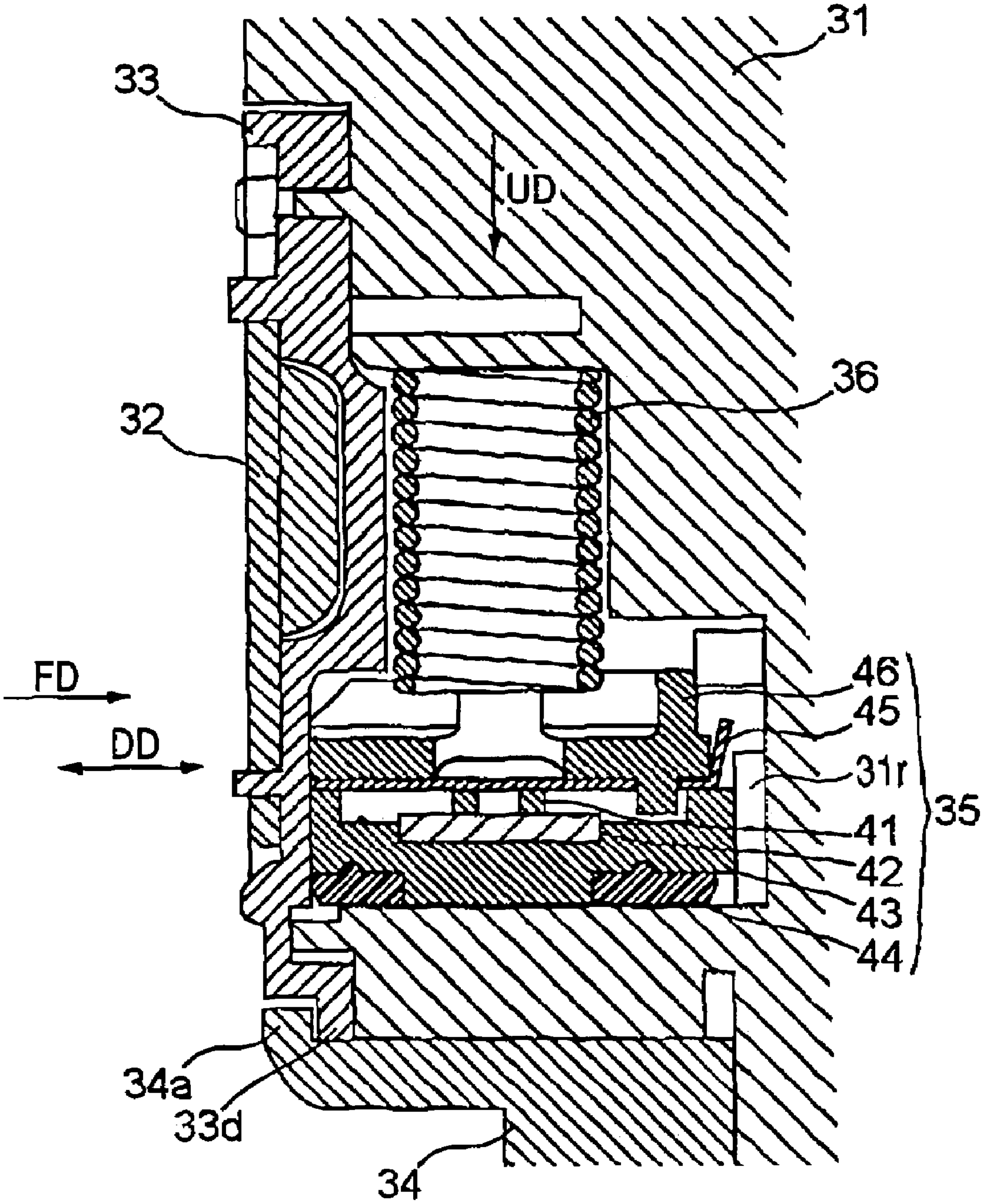
FIG. 19 is a sectional view of the ink cartridge taken along a plane parallel to side surfaces at A-A of FIG. 14.
Figure 21:
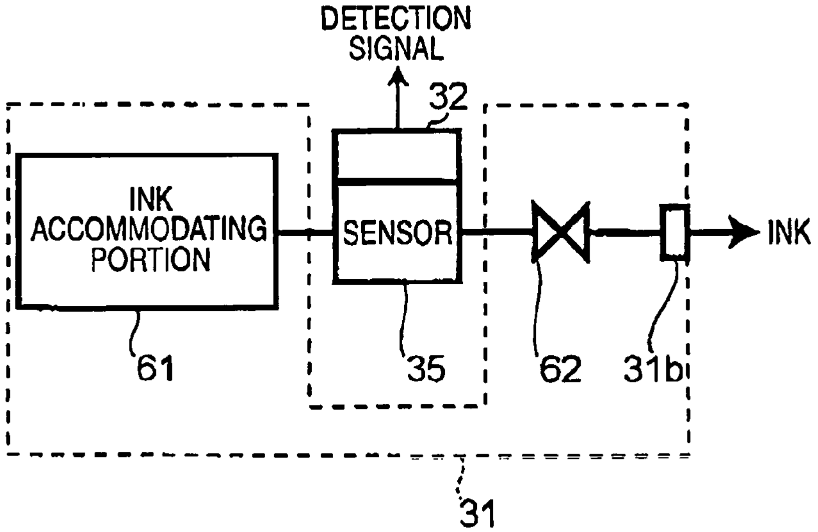
FIG. 21 is a block diagram showing an ink flow path of the ink cartridge shown in FIG. 14.

Next, the mounting of the above-described components in the cartridge main body 31, and the structure resulting from that assembly will be discussed. FIG. 19 is a sectional view of the ink cartridge 21 in a plane taken along a line A-A of FIGS. 14 and 15 parallel to the side surfaces. FIG. 20 is a sectional view of the ink cartridge 21 in a plane taken along the line A-A of FIG. 14 and parallel to the front surface. FIG. 21 is a block diagram showing an ink flow path of the ink cartridge 21.

First of all, the sensor 35 is disposed in the sensor accommodating recess portion 31*c* of the cartridge main body 31 such that the bottom surface (seal 44) of the sensor 35 contacts the inner wall at the lower side of the sensor accommodating recess portion 31*c*, i.e. at the ink outlet 31*b* side thereof.

Next, the spring 36 is disposed in a compressed state between the seat 46*b* of the sensor 35 and the protruded portion 31*i* of the cartridge main body 31, and then is released. Due to the restoring force of the spring 36, the bottom surface of the sensor 35 is pressed against the inner wall of the sensor accommodating recess portion 31*c* to elastically deform the seal 44 of the sensor 35, placing the sensor 35 in tight contact with the cartridge main body 31. Consequently, the sensor 35 is not rigidly fixed to the cartridge main body 31 but is elastically fixed to the cartridge main body 31 by the action of the spring 36 and the seal 44 exerted in a vibration direction (amplitude 30 direction) of the sensor element 41, i.e. in the height direction.

As shown in FIG. 20, a part (an upstream side buffer 31*p* and a downstream side buffer 31*p*) of the ink flow path in the cartridge main body 31 is connected to the ink flow path in the sensor 35 (see the broken line in FIG. 20). As shown in FIG. 21, the sensor 35 is disposed at the part of the ink flow path is located between the ink accommodating portion 61 and the check valve (reverse flow preventing valve) 62 disposed in the cartridge main body 31. Accordingly, when ink is present in the ink accommodating portion 61, ink exists in the ink flow path between the ink accommodating portion 61 and the check valve 62, and when the ink in the ink accommodating portion 61 is depleted completely, then the ink in the ink flow path between the ink accommodating portion 61 and the check valve 62 will be absent. Therefore, the sensor 35 can detect whether or not ink is present in the ink cartridge 21. In other words, the sensor 35 can detect the ink amount in the ink cartridge 21.

The board 32 is fixed to the cover member 33 in the following fashion. The protruded portion 33*f* of the cover member 33 is disposed in the notch 32*a* of the board 32, the protruded portion 33*g* of the cover member 33 is disposed in the hole 32*b* of the board 32, and thereafter the leading end of the protruded portion 33*f* is fused so as to fix the board to the cover member 33 by thermal caulking. As a result, the terminals 32*e* on the back surface of the board main body 32M are disposed at locations facing the insertion holes 33*h*1 of the cover member 33.

Thereafter, the cover member 33 is fixed to the cartridge main body 31 in the following manner. First, the pawls 33*a* of the cover member 33 are engaged with and retained to the engagement recess portions 31*h* of the cartridge main body 31. The shafts 31*d* of the cartridge main body 31 are inserted into the holes 33*b* of the cover member 33, the shaft 31*e* is inserted into the hole 33*c*, the shaft 31*f* is inserted into the hole 33*i*, and the protruded portion 31*g* is disposed in the recess portion 33*j*. At this time, the electrodes 45 of the sensor 35 contact the board 32, and the elastic force applied by the electrode terminals 45 presses the board 32, and in turn the cover member 33, in the direction away from the cartridge main body 31. Thereafter, the cover member 33 is pressed to contact the cartridge main body 31 against the elastic force of the electrode terminals 45, and the shafts 31*d* are fused, while maintaining the press-contact state, so that the cover member 33 is fixed to the cartridge main body 31 by thermal caulking. The thermal caulking is performed on the shafts 31*d* at the lever 31*a* side of the board 32, but is not conducted onto the shaft and the protruded portion at the opposite side, i.e. the cartridge main body bottom surface side, of the board 32.

As shown in FIG. 19, one end surface of the sensor 35 in this state abuts a slender rib 31*r* at the rear surface of the sensor accommodating recess portion 31*c*, and the bent portions 45*a* of the electrode terminals 45, which protrude from the other, opposite end surface of the sensor 35, pass through the insertion holes 33*h*1 of the cover member 33 to abut the terminals 32*e* on the back surface of the board main body 32M. Accordingly, the electrical connections between the sensor element 41 of the sensor 35 and the output terminals 35*d* of the board 32 are established.

Since the spring 36 is guided by a cylindrical space defined by the combination of the facing semi-cylindrical recess portions 31*i* and 31*j*, the spring 36 is prevented from being removed from between the protruded portion 31*i* and the seat 46*b* within the sensor accommodating recess portion 31*c* of the cartridge main body 31. Further, the front surface of the cartridge main body 31 has a step between the proximal portions of the lever 31*a* and the proximal portions of the shafts 31*d*, 31*e*, and therefore, when the cover member 33 is attached to the cartridge main body 31, the front side leading end surface of the cover member 33, as shown in FIG. 14, is substantially flush with the surface of the cartridge main body 31 where the proximal portion of the lever 31*a* is provided.

This way, the board 32, the cover member 33, sensor 35 and the spring 36 are assembled to the cartridge main body 31. Further, the side cover 34 is attached to the cartridge main body 31 so that the flange portion 34*a* of the side cover 34 restricts the movement of the protruded portion 33*d* of the cover member 33. The side cover 34 seals holes 31*k* at the bottom surface of the cartridge main body 31.

Figure 24:
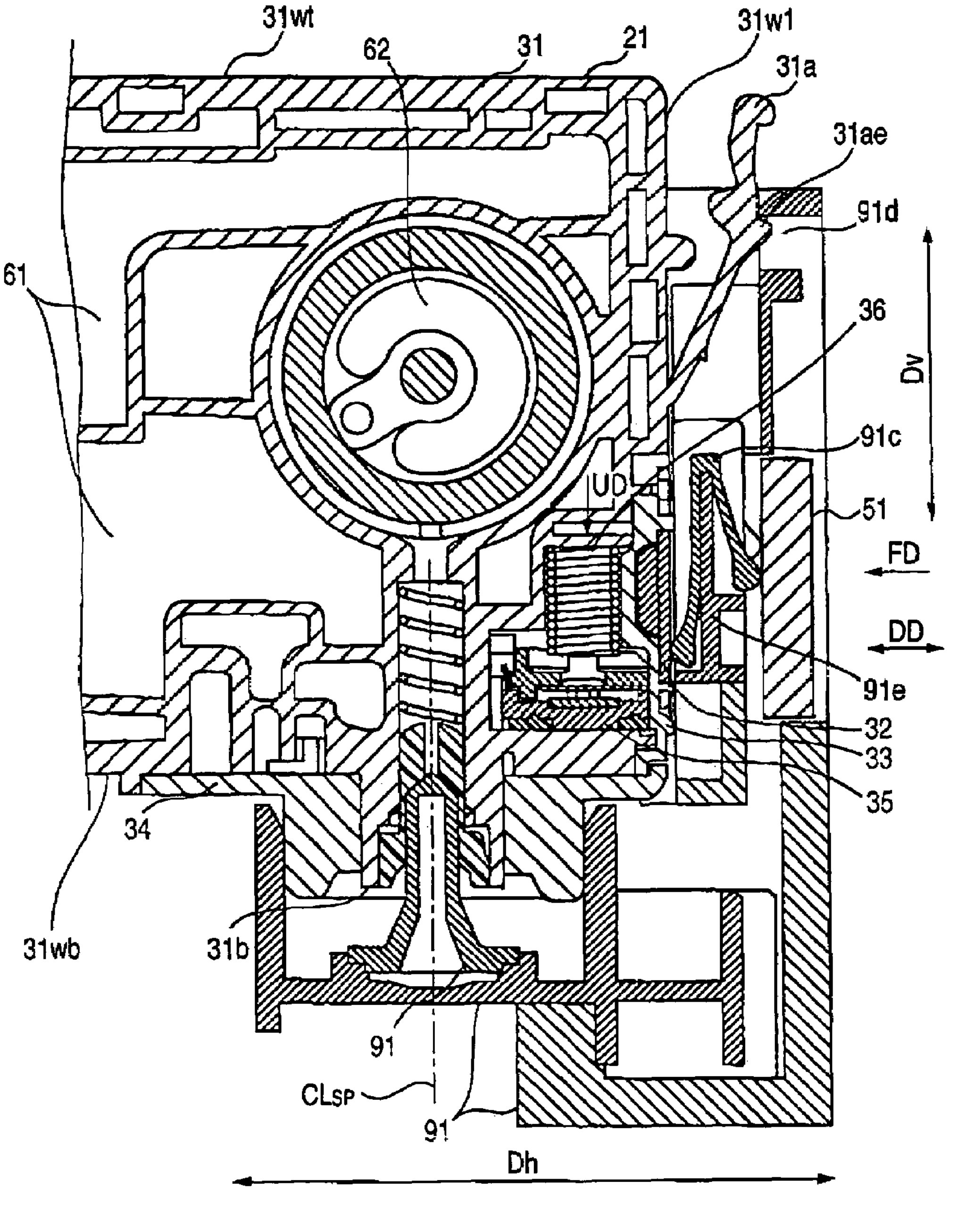
FIG. 24 is a sectional view taken along a plane C-C of FIG. 22A.

Next, the description will be made as to how to mount the ink cartridge 21 to the carriage 91. FIGS. 22A and 22B are top and back views showing a state in which the ink cartridge 21 is mounted to the carriage 91. FIG. 23 is a sectional view showing a plane B-B of FIG. 22A, and FIG. 24 is a sectional view showing a plane C-C of FIG. 22A.

Figure 22:
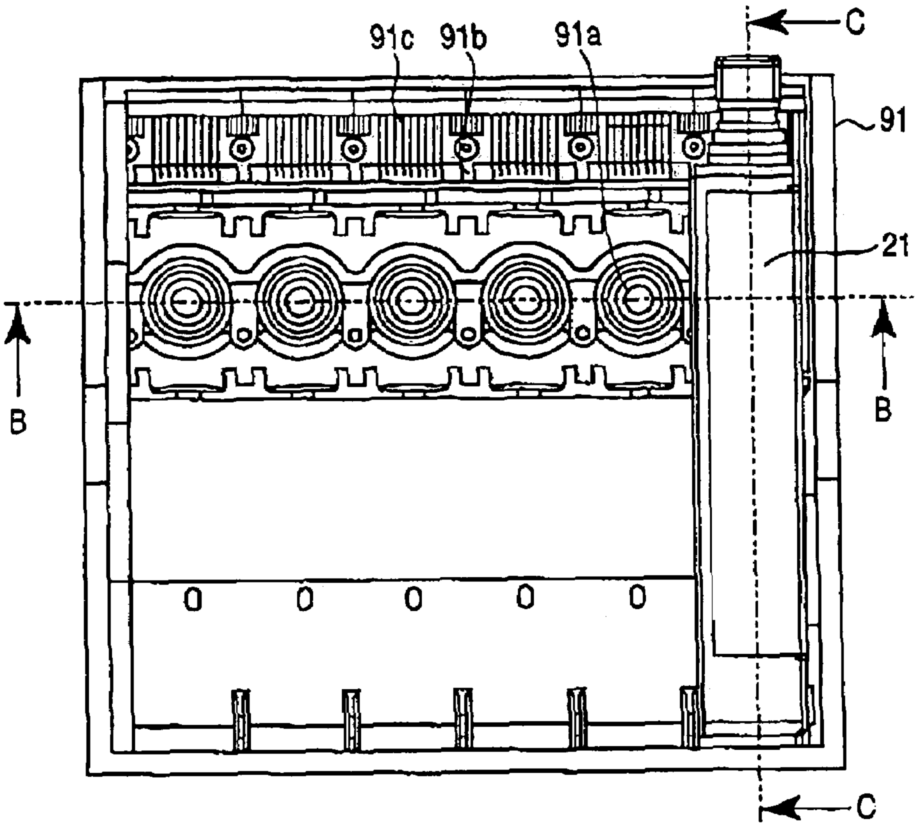
FIGS. 22A and 22B are a top plan view and a back rear elevational showing a state in which the ink cartridge is mounted to a carriage.
Figure 22:
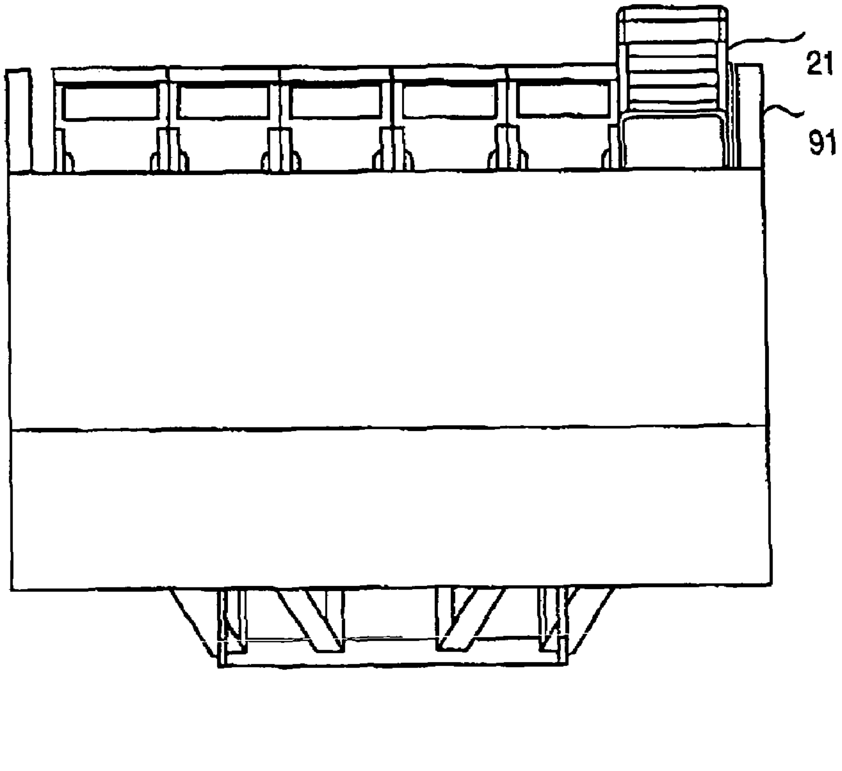

The carriage 91 shown in FIGS. 22A to 24 is designed to mount thereon six ink cartridges, each storing ink of a particular color. FIGS. 22A to 23 show a state in which only one ink cartridge 21 of one color is mounted on the carriage 91.

As shown in FIGS. 22A to 23, the carriage 91 in the present embodiment has a shaft 91*a*, guides 91*b*, contact terminals (electrodes) 91*c* and an engagement hole 91*d* for each of the ink cartridges 21. The shaft 91*a* is hollow, and has an ink take-in port at the leading end thereof. When the ink cartridge 21 is mounted to the carriage 91, the shaft 91*a* is inserted into the ink outlet 31*b* of the ink cartridge 21. The ink is drawn through the interior of the shaft 91*a* to be supplied to a head (not shown). The guide 91*b* is a protruded portion extending in the height direction of the carriage 11, and during a process of mounting the ink cartridge 21 to the carriage 91 and also after the ink cartridge is completely mounted to the carriage 91, a pair of the guides 91*b* contact the protruded portions 33*m* of the cover member 33 to restrict the movement of the ink cartridge 21 and position the ink cartridge 21 in the widthwise direction (in a direction in which the ink cartridges 21 are arrayed).

The contact terminal 91*c* is a metal terminal for electrical contact with the terminal 32*c*, 32*d* on the front surface of the board 32. The number of contact terminals 91*c* is the same as the number of contact terminals 32*c*, 32*d*. In the present embodiment, nine contact terminals 91*c* are provided for each ink cartridge 21. As shown in FIG. 24, each of the contact terminals 91*c* is bent by approximately 180 degrees at a central portion, and each of the leading ends of the contact terminal 91*c* is thick and curves outward. Each of the contact terminals 91*c* is attached such that its central bent portion clamps onto a leading end portion of a fixing plate 91*e* of the carriage 91. When the ink cartridge 21 is mounted to the carriage 91, each contact terminal 91*c* generates an elastic force like a plate spring so that one leading end of each contact terminal 91*c* is brought into pressure-contact with the corresponding terminals 32*c*, 32*e* of the board 32, and the other leading end thereof is brought into pressure-contact with a corresponding terminal (not shown) of an encoder board 51 fixed to the carriage 91.

When the ink cartridge 21 is mounted to the carriage 91, the protruded portion (engagement portion) 31*ae* of the lever 31*a* of the ink cartridge 21 is fitted to the engagement hole 91*d*, thereby restricting the movement of the ink cartridge 21 in the height direction.

This way, when the ink cartridge 21 is mounted to the carriage 91, the electric system of the ink cartridge 21 is detachably connected to the electric system of the carriage 91, and the ink flow path (liquid supply path) of the ink cartridge 21 is detachably connected to the ink flow path of the carriage 91.

As shown in FIG. 24, the ink flow path extends continuously from the ink accommodating portion 61 through the sensor 35 and the check valve 62 to the ink outlet and further to the shaft 91*a* of the carriage 91. The ink accommodating portion 61 is divided by partitions into plural sections communicating with one another via flow passage holes (not shown). The ink outlet 31*b*, the check valve 62, the sensor 35 and the board 32 are disposed closer to one surface of the cartridge main body 31 (here, the front surface), and therefore the ink flow path from the ink accommodating portion 61 to the ink outlet 31*b* is shortened even though the sensor 35 and the check valve 62 are disposed at intermediate portions of the ink flow path.

By virtue of this arrangement, substantially all of the ink in the cartridge 21 can be consumed without damage to the print head, since at the time when the sensor 35 determines the ink has been consumed ink still will remain downstream of the sensor in the ink path extending from the check valve 62 to the print head. Because the amount of ink remaining in the ink path is fairly small, substantially all of the ink in the ink accommodating portion 61 can be consumed before the exhaustion of ink is detected, improving the use efficiency of the ink cartridge 21.

During the process of mounting the ink cartridge 21 to the carriage 91, the cartridge 21 is pressed toward and inserted into the carriage 91 downwardly in the vertical direction DV in FIG. 24 so that the shaft 91*a* is inserted into the ink outlet 31*b* and the lever 31*a* is fitted to the engagement hole 91*d*. Similarly, the contact terminals 91*c* approach the ink cartridge 21 from the bottom surface side of the ink cartridge 21 and then contact the ink cartridge 21. Therefore, the contact terminals 91*c* contact portions of the side cover 34 and cover member 33 at the front surface of the ink cartridge 21, and slide thereon, and finally contact the terminals 32*c*, 32*d* of the board 32 when the mounting is complete.

In the present embodiment, as shown in FIGS. 14 and 15, the front surface of the ink cartridge 21 does not use the thermal caulking in an area extending from the bottom surface to the terminals 32*c*, 32*d* of the board 32, and therefore the contact terminals 91*c* of the carriage 91 will not contact any thermal caulking portions. Since the cover 33 and the side cover 34 are made of resin and are molded to have smooth surfaces, debris or loose pieces are unlikely to separate from the cover 33 and the side cover 34 even if the cover 33 and the side cover 34 are contacted by the contact terminals 91*c* of the carriage 91.

The liquid container 21 according to the present embodiment has the outer electrode 32*d* contactable with the electrode 91*c* of the liquid consuming apparatus, the electrode supporting member 32,33 which supports the outer electrode 32*d* and is fixed to the container body 31, the piezoelectric sensor unit 35 which is discrete from the electrode supporting member 32, 33, which is attached to the container body 31 for detecting the liquid existing in a part of the liquid supply path and which includes the piezoelectric element 41 having the electrode 41*a*, and the elastic connector 45 which electrically connects the outer electrode 32*d* to the electrode 41*a* of the piezoelectric element 41.

The electrode supporting member 32, 33 supporting the outer electrode 32*d* is separate from the piezoelectric sensor unit 35. The outer electrodes 32*d* and the electrode 41*a* of the piezoelectric element 41 of the piezoelectric sensor unit 35 are electrically connected to each other by the elastic connector 45. Since the electrode supporting member 32, 33 is separate from the piezoelectric sensor unit 35, any external force received by the outer electrode 32*d* from the electrode 91*c* of the liquid consuming apparatus will not be transmitted directly to the piezoelectric sensor unit 35, and therefore it is possible to protect the piezoelectric sensor unit 35, especially the piezoelectric element 41, which is a precision device, from such external force. Further, an output signal of the piezoelectric element 41 is significantly influenced by a fixing state of the piezoelectric element 41. By adopting such a structure that the external force cannot be directly transmitted to the piezoelectric element 41, the output characteristics of the piezoelectric element 41 can be maintained. Although the circuit board 32 and the cover 33 together form the electrode supporting member in the present embodiment, the electrode supporting member should not be restricted to this arrangement. For example, the circuit board 32 alone may serve as the electrode supporting member, say, when the circuit board 32 is directly fixed to the container body 31. Alternatively, the outer electrode 32*d* may be provided on the cover 33 (in this case, the electrode supporting member can be constructed from the cover 33 alone).

Since the outer electrode 32*d* and the electrode 41*a* of the piezoelectric element 41 are electrically connected to each other by elastic connector 45, the elasticity of the connector 45 can absorb the external force received by the outer electrode 32*d*. Further, even if external force is applied to the outer electrode 32*d*, the elasticity of connector 45 can maintain the electrical connection between the outer electrode 32*d* and the electrode 41*a* of the piezoelectric element 41. Although the elastic connector 45 is used as the connector in the present embodiment, the connector should not be restricted thereto. For example, the outer electrode 32*d* may be electrically connected to the electrode 41*a* of the piezoelectric element 41 by an electric wire having an elasticity, an FPC, or the like.

The outer electrode 32*d* and the electrode supporting member 32, 33 supporting the outer electrode 32*d* are directly contacted by the liquid consuming apparatus when the liquid container is mounted to and removed from the liquid consuming apparatus. In contrast, the piezoelectric sensor unit 35 is not directly contacted by the liquid consuming apparatus or has a low possibility of being directly contacted by the liquid consuming apparatus depending upon the location where the piezoelectric sensor unit 35 is attached to the container body 31. Further, the electrode supporting member 32, 33 including the outer electrode 32*d* and the piezoelectric sensor unit 35 including the piezoelectric element 41 are at least in part formed of different material. Furthermore, the process for checking the performance of the electrode supporting member 32, 33 including the outer electrode 32*d* is different from the process for checking the performance of the piezoelectric sensor unit 35 including the piezoelectric element 41. Since the electrode supporting member 32, 33 including the outer electrode 32*d* is separate from the piezoelectric sensor unit 35 including the piezoelectric element 41, the liquid container used by a user and collected from the user can be efficiently recycled.

The piezoelectric sensor unit 35 is discrete from the electrode supporting member 32, 33. The position where the electrode supporting member 32, 33 is disposed on the container body 31 is restricted in relation to the position of the electrode 91*c* of the liquid consuming apparatus, but the piezoelectric sensor unit 35 can be attached to any desired portion of the container body 31 as long as the piezoelectric element 41 of the piezoelectric sensor unit 35 is electrically connected to the outer electrode 32*d* supported by the electrode supporting member 32, 33. That is to say, the piezoelectric sensor unit 35 can be disposed at any suitable position where it can be protected from ink mist and dust.

The liquid container 21 according to the present embodiment has the deformable seal member 44 disposed between the piezoelectric sensor unit 35 and the wall of the container body 35, and the urging member 36 that urges the piezoelectric sensor unit 35 toward the wall of the container body 31. The piezoelectric sensor unit 35 is attached to the container body 31 by the seal member 44 and the urging member 36.

Since the piezoelectric sensor unit 35 is attached to the container body 31 by the seal member 44 and the urging member 36, any external force or impact applied to the container body 31 are absorbed by the seal member 44 and the urging member 36 and therefore are not directly transmitted to the piezoelectric sensor unit 35. Accordingly, it is possible to protect the piezoelectric sensor unit 35, in particular, the piezoelectric element 41.

Since it is possible to finely adjust the position of the piezoelectric sensor unit 35 using the elastic force of the seal member 44 and the urging force of the urging member 36, the piezoelectric sensor unit 35 can be disposed at a position where the piezoelectric sensor unit 35 can perform as is desired, thereby compensating for any differences in performance of individual piezoelectric sensor units 35. Further, in recycling, it is possible to easily remove the piezoelectric sensor unit 35 from the container body 31. Moreover, it is possible to elastically support the piezoelectric sensor unit 35 to the container body 31 using the seal member 44 disposed between the piezoelectric sensor unit 35 and the wall of the container body 31 for fluid communication with the liquid supply path.

Although a compression coil spring 36 is used as the urging member in the present embodiment, the urging member is not limited thereto. Any suitable element such as a plate spring, a rubber member, a tensile spring or the like can be used as the urging member. Likewise, the seal member 44 should not be restricted to the illustrated structure, configuration or the like.

In the liquid container according to the present embodiment, the connector 45 is at least in part elastically deformable in a direction DD (see FIGS. 15, 19 and 24) substantially perpendicular to a direction UD (see FIGS. 15, 19, 20 and 24) along which the urging member 36 urges the piezoelectric sensor unit 35.

Since the urging direction UD in which the urging member 36 and the seal member 44 elastically supporting the piezoelectric sensor unit 35 to the container body 31 is substantially perpendicular to the deformable direction DD of the connector 45, the piezoelectric sensor unit 35 can be elastically supported to the container body 31 in a stable manner.

In the liquid container according to the present embodiment, the outer electrode 32*d* receives a force from the electrode 91*c* of the liquid consuming apparatus applied in a first direction FD (see FIGS. 15, 19 and 24) when the outer electrode 32*d* contacts the electrode 91*c* of the liquid consuming apparatus, the connector 45 being at least in part elastically deformable in a second direction DD, and the first direction FD being substantially parallel to the second direction DD.

Since the deformable direction DD of the connector 45 and the force direction FD in which the outer electrode 32*d* receives the external force are substantially parallel to each other, it is possible to absorb efficiently the external force applied to the connector 45. Accordingly, the external force does not directly act on the piezoelectric sensor unit 35. The electrical connection between the connector 45 and the outer electrode 32*d* is not affected by the presence or absence of the external force and can be maintained reliably.

The liquid container according to the present embodiment has the deformable seal member 44 disposed between the piezoelectric sensor unit 35 and the wall of the container body 31 and the urging member 36 that urges the piezoelectric sensor unit 35 toward the wall of the container body 31 in a third direction UD substantially perpendicular to the second direction DD. The piezoelectric sensor unit 35 is attached to the container body through the seal member 44 and the urging member 36.

Since the piezoelectric sensor unit 35 is attached to the container body through the seal member 44 and the urging member 36, any external force or impact applied to the container body 31 can be absorbed by the seal member 44 and the urging member 36 and therefore will not be directly transmitted to the piezoelectric sensor unit 35. Accordingly, it is possible to protect the piezoelectric sensor unit 35, in particular, the piezoelectric element 41.

Since it is possible to adjust finely the position of the piezoelectric sensor unit 35 relative to the wall of the container body 31 using the elastic force of the seal member 44 and the urging force of the urging member 36, the piezoelectric sensor unit 35 can be disposed at a position where the piezoelectric sensor unit 35 can exhibit perform as is desired, thereby compensating for any differences in performance of individual piezoelectric sensor units 35. Further, in recycling, it is possible to easily remove the piezoelectric sensor unit 35 from the container body 31. Moreover, it is possible to elastically support the piezoelectric sensor unit 35 to the container body 31 using the seal member 44 disposed between the piezoelectric sensor unit 35 and the wall of the container body 31 for fluid communication with the liquid supply path.

Since the urging direction UD in which the urging member 36 and the seal member 44 elastically support the piezoelectric sensor unit 35 to the container body 31 is substantially perpendicular to the deformable direction DD of the connector 45, the piezoelectric sensor unit 35 can be elastically supported to the container body 31 in a stable manner.

In the liquid container according to the present embodiment, the container body 31 has a recess 31*c* for accommodating the piezoelectric sensor unit 35 therein, and the electrode supporting member 32, 33 closes an opening of the recess 31*c*.

Since the piezoelectric sensor unit 35 is disposed in a closed space formed by the recess 31*c* of the container body 31 and the electrode supporting member 32, 33, the piezoelectric sensor unit 35 can be protected from ink mist, dust and external force.

In the liquid container according to the present embodiment, the container body 31 includes a first wall 31*w*1 and an opposing second wall 31*w*2, the liquid supply port 31*b* is disposed at an offset position closer to the first wall 31*w*1 than to the second wall 31*w*2, and the piezoelectric sensor unit 35 is disposed at an offset portion closer to the first wall 31*w*1 than to the second wall 31*w*2.

The piezoelectric sensor unit 35 can be disposed close to the liquid supply port 31*b*. In general, a portion of the container body 31 which is close to the liquid supply port 31*b* has high rigidity. Accordingly, by disposing the piezoelectric sensor unit 35 at such a highly rigid portion of the container body 31, it is possible to protect the piezoelectric sensor unit 35 and to install the piezoelectric sensor unit 35 in a stable fashion.

In the liquid container according to the present embodiment, the piezoelectric sensor unit 35 is disposed between the liquid supply port 31*b* and the first wall 31*w*1 in a horizontal direction Dh (see FIGS. 15 and 24) in which the first wall 31*w*1 and the second wall 31*w*2 are opposed to each other.

In the liquid container according to the present embodiment, the container body 31 includes a top wall 31*wt* and a bottom wall 31*wb* having the ink supply port 31*b*, and the piezoelectric sensor unit 35 is disposed at an offset position closer to the bottom wall 31*wb* than to the top wall 31*wt*.

The piezoelectric sensor unit 35 can be disposed at the more highly rigid portion of the container body 31.

Since the location where the piezoelectric sensor 35 is disposed is the more rigid portion of the container body 31, the required rigidity of that portion of the container body 31 can be assured even if the recess 31*c*, which otherwise might lower the rigidity, is formed in the container body 31. Therefore, the recess 31*c* is formed in the container body 31 and the piezoelectric sensor unit 35 is accommodated in the recess 31*c*. Again, since the piezoelectric sensor unit 35 can be disposed inside the container body 31, it is possible to protect the piezoelectric sensor unit 35 from ink mist, dust and external force.

In the liquid container according to the present embodiment, an opening of the recess 31*c* is closed by the electrode supporting member 32,33 fixed to the first wall 31*w*1.

Since the electrode supporting member 32,33 serves as a reinforcing member for the portion of the container body 31 where the recess 31*c* is formed, this increases the rigidity of the container body where the piezoelectric sensor unit 35 is disposed.

In the liquid container according to the present embodiment, the container body 31 includes a first wall 31*w*1, an opposite, second wall 31*w*2 and a lever 31*a* having an engagement portion 31*ae* located closer to the first wall 31*w*1 than to the second wall 31*w*2 and displaceable toward and away from the first wall 31*w*1 for engagement with the liquid consuming apparatus. The liquid supply port 31*b* is disposed at an offset position closer to the first wall 31*w*1 than to the second wall 31*w*2, and the piezoelectric sensor unit 35 is disposed at an offset portion closer to the first wall 31*w*1 than to the second wall 31*w*2.

The piezoelectric sensor unit 35 can be disposed close to the liquid supply port 31*b*, i.e. at a high rigidity portion of the container body, to protect and install the piezoelectric sensor unit 35 in a stable manner.

The liquid supply port 31*b* and the engagement portion 31*ae* of the lever 31*a* are reference points for positioning the liquid container with respect to the liquid consuming apparatus. Therefore, a portion of the container body 31, which is close to the liquid supply port 31*b* and the engagement portion 31*ae* can be positioned with high precision with respect to the liquid consuming apparatus. For this reason, in general, the electrode 32*d* to be contacted by the electrode 91*c* of the liquid consuming apparatus is disposed at the portion of the container body 31, which is close to the liquid supply port 31*b* and the engagement portion 31*ae*. By disposing the piezoelectric sensor unit 35 close to the liquid supply port 31*b* and the engagement portion 31*ae*, it is possible to shorten the length of an electric path between the electrode 41*a* of the piezoelectric sensor unit 35 and the electrode 32*d*, and therefore to increase the reliability of signal transmission between the liquid consuming apparatus and the piezoelectric element 41 through the electrode 91*c*, the electrode 32*d*, the electrode 41*a*, etc.

In the liquid container according to the present embodiment, the piezoelectric sensor unit 35 is disposed between the liquid supply port 31*b* and the engagement portion 31*ae* in the horizontal direction Dh in which the first wall 31*w*1 and the second wall 31*w*2 are opposed to each other.

In the liquid container according to the present embodiment, the piezoelectric sensor unit 35 is disposed between the liquid supply port 31*b* and the engagement portion 31*ae* in a vertical direction Dv (see FIG. 24) perpendicular to the horizontal direction Dh.

The liquid container according to the present embodiment has an inner electrode 32*e* which is electrically connected to the outer electrode 32*d* and which is supported by the electrode supporting member 32,33. The connector 45 contacts the inner electrode 32*e* for electrical connection to the outer electrode 32*d*.

When the liquid container 21 is mounted to or removed from the liquid consuming apparatus, the outer electrode 32*d* is subjected to sliding contact by the electrode 91*c* of the liquid consuming apparatus. Since the connector 45 contacts the inner electrode 32*e*, which is different from the outer electrode 32*d*, to be electrically connected to the outer electrode 32*d*, the contact portion of the connector 45 is not subjected to the sliding contact by the electrode 91*c* of the liquid consuming apparatus. Accordingly, the electrical connection between the connector 45 and the outer electrode 32*d* avoids making sliding contact with the electrode 91*c* of the liquid consuming apparatus, and so thereby establishes a reliable electrical connection.

In the liquid container according to the present embodiment, the connector 45, which also can be referred to as an elastic terminal plate 45, is attached to the piezoelectric sensor unit 35 and electrically connected to the electrode 41*a* of the piezoelectric element 41, and the elastic terminal plate 45 contacts the inner electrode 32*e* for electrical connection between the outer electrode 32*d* and the electrode 41*a* of the piezoelectric element 41.

Since the elastic terminal plate 45 is attached to the piezoelectric sensor unit 35, the elastic terminal plate can also be handled as a component of the piezoelectric sensor unit 35. That is, the piezoelectric sensor unit 35 including the elastic terminal plate 45 can be attached to and removed from the container body 31 as one unit. Accordingly, it is possible to enhance the manufacturing process efficiency and the recycling process efficiency.

The contact of the elastic terminal plate 45 with the inner electrode 32*e* can establish electrical connection between the outer electrode 32*d* and the electrode 41*a* of the piezoelectric element 41. Therefore, since the electrode supporting member 32 having the outer electrode 32*d* and the inner electrode 32*e* can be separate from the piezoelectric sensor unit 35 having the piezoelectric element 41 and the elastic terminal plate 45, it is possible to enhance the manufacturing process efficiency and the recycling process efficiency.

Since the elastic terminal plate 45 can be positively contacted to the inner electrode 32*e* using the elasticity of the elastic terminal plate 45, the elastic terminal plate 45 can be electrically connected to the inner electrode 32*e* with high reliability.

In the liquid container according to the present embodiment, the elastic terminal plate 45 is displaceable relative to the inner electrode 32*e* while still maintaining contact with the inner electrode 32*e*.

Contact between the elastic terminal plate 45 with the inner electrode 32*e*, i.e. the electrical connection, can be reliably secured even if the relative position of the elastic terminal plate 45 to the inner electrode 32*e* shifts somewhat. By connecting the components this way it is easy to manage the dimensional precision of component parts and assembly precision of the component parts during manufacture and recycle.

This arrangement is advantageous also in the case where the piezoelectric sensor unit 35 is elastically supported by the container body 31. That is, even if the piezoelectric sensor unit 35 is shifted relative to the electrode supporting member 32, 33 in the direction DD, the direction UD and a direction perpendicular to these directions DD and UD, it is possible to maintain contact between the elastic terminal plate 45 and the inner electrode 31*e* by simply changing the contact position of the elastic terminal plate 45 with the inner electrode 31*e* correspondingly.

In the liquid container according to the present embodiment, the electrode supporting member 32, 33 includes a circuit board 32 that has a first surface on which the outer electrode 32*d* is formed and an opposite, second surface on which the inner electrode 32*e* is formed, and the circuit board 32 is fixed to the container body 31 so that the second surface is located between the first surface and the piezoelectric sensor unit 35.

Since the electrode supporting member includes the circuit board 32, the outer electrode 32*d* and the inner electrode 32*e* can be formed easily, for example, using a conductor printing technology.

The outer electrode 32*d* is formed on the first surface (front surface) of the circuit board 32 and the inner electrode 32*e* is formed on the second surface (back surface) of the circuit board 32*e*. Therefore, the side where the electrode 91*c* of the liquid consuming apparatus contacts the outer electrode 32*d* and the side where the terminal plate 45 contacts the inner electrode 32*e* are assuredly separated by the circuit board 32, and so the contact portion between the terminal plate 45 and the inner electrode 32*e* is not subjected to sliding contact with the electrode 91*c* of the liquid consuming apparatus.

Since the piezoelectric sensor unit 35 is also disposed at the side where the terminal plate 45 contacts the inner electrode 32*e*, the piezoelectric sensor unit 35 is also free from sliding contact with the electrode 91*c* of the liquid consuming apparatus.

By fixing the circuit board 32 to the container body 31 such that the terminal plate 45 press-contacts the inner electrode 32*e* of the second surface due to the elasticity of the terminal plate 45, it is possible to easily establish the electrical connection between the outer electrode 32*d* and the electrode 41*a* of the piezoelectric element 41.

In the liquid container according to the present embodiment, the electrode supporting member further includes a circuit board supporting member 33 that supports the circuit board 32, and the circuit board 32 is fixed to the container body 31 through the circuit board supporting member 33.

For example, it is possible to fix the circuit board 32 to the circuit board supporting member 33 before the circuit board supporting member 33 is joined to the container body 31. In this case, since the circuit board 32 is fixed to the circuit board supporting member 33, it is possible to easily handle the circuit board 32 and protect the circuit board 32.

In the liquid container according to the present embodiment, the circuit board supporting member 33 has a through-hole 33*h*1 into which a protruded portion 45*a* of the elastic terminal plate 45 projects to make contact with the inner electrode 32*e* of the circuit board 32.

Even where the circuit board supporting member 33 is interposed between the circuit board 32 and the sensor unit 35, the terminal plate 45 can be easily brought into contact with the inner electrode 32*e* using the through hole 33*h*1.

In the liquid container according to the present embodiment, a clearance is provided between the through-hole 33*h*1 and the protruded portion 45*a* so that the protruded portion 45*a* can shift in position relative to the through-hole 33*h*1 without contacting the perimeter of through-hole 33*h*1.

The through-hole 33*h*1 allows the contact position of the elastic terminal plate 45 with the inner electrode 32*e* to change.

In the liquid container according to the present embodiment, the through-hole 33*h*1 is covered by the circuit board 32.

It is possible to prevent ink mist and dust from passing through the through hole 33*h*1 to reach the contact portion between the inner electrode 33*e* and the elastic terminal plate 45 and the piezoelectric sensor unit 35.

In the liquid container according to the present embodiment, the circuit board supporting member 33 has a protruded engagement portion 33*a*, and the container body 31 has a mating engagement recess portion 31*h* for engagement with the protruded engagement portion 33*a* when the circuit board supporting member 33 is disposed in place with respect to the container body 31.

The circuit board supporting member 33 can be fixed to the container body 31 by engagement between the protruded engagement portion 33*a* and the engagement recess portion 31*h*. In particular, when the circuit board 32 is fixed to the circuit board supporting member 33 before the circuit board supporting member 33 is fixed to the container body 31, the circuit board supporting member 33 having the circuit board 32 can be fixed to the container body 31 by engagement between the protruded engagement portion 33*a* and the engagement recess portion 31*h*. The circuit board supporting member 33 having the circuit board 32 can be removed from the container body 31 by disengaging the protruded engagement portion 33*a* from the engagement recess portion 31*h*. Accordingly, this arrangement can enhance the workability, for example, when it is necessary to make a fine adjustment for the piezoelectric sensor unit 35 (such as a fine adjustment for the position of the piezoelectric sensor unit 35 relative to the container body 31) or an exchange of the piezoelectric sensor unit 35 is needed after the circuit board 32 is fixed to the container body 31.

The liquid container according to the present embodiment has a memory 32*f* mounted to the second surface (back surface) of the circuit board 32 and at least one memory electrode 32*c* electrically connected to the memory 32*f* and formed on the first surface (front surface) of the circuit board 32.

Various types of information involving the liquid consuming apparatus and/or the liquid container can be stored in the circuit board 32 having the memory 32*f*.

Since the memory 32*f* is mounted to the second surface (back surface) of the circuit board 32 similarly to the inner electrode 32*e*, it is possible to protect the memory 32*f*.

Since the memory electrode 32*c* is slidingly contacted by the electrode of the liquid consuming apparatus and is formed on the first surface (front surface), the contact portion between the terminal plate 45 and the inner electrode 32*e* is not subjected to the sliding contact by the electrode of the liquid consuming apparatus.

The circuit board 32 according to the present embodiment has a board main body 32M, a pair of first electrodes 32*d* for contact with and electrical connection to the electrodes 91*c* of the liquid consuming apparatus, the first electrodes 32*d* being formed on a first surface (front surface) of the board main body 32M, and a pair of second electrodes 32*e* for contact with and electrical connection to the terminal plates 45 of the sensor unit 35, the second electrodes 32*e* being formed on an opposite, second surface (back surface) of the board main body 32M and being electrically connected respectively to the first electrodes 32*d*.

Accordingly, since a side in which the electrodes 91*c* of the liquid consuming apparatus contact the first electrodes 32*d*, and a side in which the terminal plates 45 contact the second electrodes 32*e* can be surely separated one from the other by the board main body 32M, the contact portions between the terminal plates 45 and the second electrodes 32*e* are not subjected to the sliding contact by the electrodes 91*c* of the liquid consuming apparatus.

In the circuit board according to the present embodiment, each of the first electrodes 32*d* has an inner edge and an outer edge. That is, as shown in FIG. 17(A), the right-side first electrode 32*d*R has an inner edge 32*d*RIE and an outer edge 32*d*ROE. The left-side first electrode 32*d*L has an inner edge 32*d*LIE and an outer edge 32*d*LOE.

Each of the second electrodes 32*e* has an inner edge and an outer edge. That is, as shown in FIG. 17(B), the right-side second electrode 32*e*R, as viewed from the front surface, has an inner edge 32*e*RIE and an outer edge 32*e*ROE. The left-side second electrode 32*e*L has an inner edge 32*e*LIE and an outer edge 32*e*LOE.

A distance DdIE between the inner edge 32*d*RIE of one 32*d*R of the first electrodes and the inner edge 32*d*LIE of the other 32*d*L of the first electrodes is smaller than the first center-to-center distance DCLL (see FIG. 23). The first center-to-center distance DCLL is a distance between center lines of the liquid consuming apparatus electrodes 91*c* respectively contacted by the electrodes 32*d*R and 32*d*L. In the present embodiment, the electrodes 32*d*R and 32*d*L respectively contact the liquid consuming apparatus electrodes 91*c* in a lower electrode row.

A distance DdOE between the outer edge 32*d*ROE of one 32*d*R of the first electrodes and the outer edge 32*d*LOE of the other 32*d*L of the first electrodes is larger than the first center-to-center distance DCLL.

A distance DeIE between the inner edge 32*e*RIE of one 32*e*R of the second electrodes and the inner edge 32*e*LIE of the other 32*e*L of the second electrodes is smaller than the second center-to-center distance DCLT. The second center-to-center distance DCLT (see FIG. 18B) is a distance between center lines of the sensor unit terminal plates 45 respectively contacted by the electrodes 32*e*R and 32*e*L.

A distance DeOE between the outer edge 32*e*ROE of one 32*e*R of the second electrodes and the outer edge 32*e*LOE of the other 32*e*L of the second electrodes is larger than the second center-to-center distance DCLT.

By this arrangement, the contact between the first electrodes 31*d* and the liquid consuming apparatus electrodes 91*c*, and thus the electrical connection therebetween, can be made more reliable even if the relative positions of the first electrodes 31*d* to the liquid consuming apparatus electrodes 91*c* are more or less shifted. By this arrangement, the contact between the second electrodes 32*e* and the terminal plates 45, and thus the electrical connection therebetween, can be made reliable even if the relative positions of the second electrodes 32*e* and the terminal plates 45 are shifted.

In the circuit board according to the present embodiment, the board main body 32M has a center line CL32M, and the first electrodes 32*d*R, 32*d*L are located symmetrically to each other with respect to the center line CL32M.

In general, when the liquid container 21 is mounted to the liquid consuming apparatus, the location of the center line CLsp of the liquid supply port is an important factor in properly positioning the liquid container relative to the liquid consuming apparatus. For this reason, in a case in which the circuit board 32 is provided to the liquid container 21, the circuit board 32 is fixed to the liquid container 21 such that the center line CL32M of the board main body 32M is coincident with the center line CLsp of the liquid supply port as viewed in a direction perpendicular to the surface (front surface, back surface) of the circuit board 32. Accordingly, by symmetrically arranging the first electrodes 32*d*R, 32*d*L about the center line CL32M of the board main body 32M, it is possible to properly and accurately position the first electrodes 32*d*R, 32*d*L relative to the liquid consuming apparatus electrodes 91*c*.

The circuit board according to the present embodiment has a first positioning through-hole 32*a* or notch 32*b* located on the center line CL32M, and a second positioning through-hole 32*a* or notch 32*b* located on the center line CL32M.

By this arrangement, the circuit board 32 can be accurately positioned relative to the liquid container 21.

In the circuit board according to the present embodiment: the second electrodes 32*e*R, 32*e*L are arranged asymmetrically about the center line CL32M; and the distance DeR (DeL) between the inner and outer edges 32eRIE, 32eROE (32eLIE, 32eLOE) of each of the second electrodes 32eR (32eL) is greater than a distance DdR (DdL) between the inner and outer edges 32dRIE, 32dROE (32dLIE, 32dRIE) of each of the first electrodes 32dR (32dL).

Although it is also preferable to arrange the terminal plates 45 of the sensor unit 35 symmetrically about the center line CL32M of the board main body 32M as 0 viewed in a direction perpendicular to the surface (front surface, back surface) of the circuit board 32, it may not always be possible to arrange the terminal plates 45 symmetrically about the center line CL32M due to space limitations caused by the shape of the liquid container 21, the shape of another member (a side cover 34 in the present embodiment) of the liquid container 21, or the like. In such a case, the second electrodes 32eR, 32eL can be disposed asymmetrically about the center line CL32M to conform to the locations of the terminal plates 45. In such a case, it is preferable to increase the width of the second electrodes 32eR, 32eL, i.e. the distance DeR, DeL, to provide a more reliable electric connection between the second electrodes 32eR, 32eL and the terminal plate 45.

In the circuit board according to the present embodiment, the first electrodes 32d are electrically connected to the second electrodes 32e though printed conductors PC formed on the first surface, an inner circumferential wall of a through-hole TH of the board main body and the second surface (see FIGS. 17A and 17B).

The electrical connection between the first electrode 32d and the second electrode 32e can be readily achieved using conductor printing technology. Using the inner circumferential wall of the through hole TH of the board main body 32M can reduce the length of the printed conductor PC required for electrical connection between the first electrode 32d and the second electrode 32e. In particular, since the first electrode 32d and the second electrode 32e are electrically connected to the terminal plate 45 of the piezoelectric sensor unit 35, signals transmitted between the piezoelectric sensor unit 35 and the liquid consuming apparatus through the first electrode 32d and the second electrode 32e are analog signals. Therefore, by shortening the length of the printed conductor PC, it is possible to prevent noise from being superimposed on the analog signals.

In the circuit board according to the present embodiment, one 32dR (32dL) of the first electrodes 32d, which is electrically connected to a corresponding one 32eR (32eL) of the second electrodes 32e, is at least in part overlapped with the corresponding one 32eR (32eL) of the second electrodes 32e as viewed in a direction perpendicular to the first and second surfaces.

By this arrangement, it is possible to shorten the connection length between the first electrode 32dR (32dL) and the corresponding second electrode 32eR (32eL).

The circuit board according to the present embodiment has a memory 32f mounted to the second surface of the board main body, and third electrodes 32c formed on the first surface of the board main body and electrically connected to the memory 32f. The first electrodes 32d and the third electrodes 32c are arrayed in a first row, and the first electrodes 32d are respectively disposed at the outermost ends of the row.

In a case in which liquid container electrodes contacted by liquid consuming apparatus electrodes when the liquid container is mounted to the liquid consuming apparatus are arrayed in an electrode row (in the present embodiment, the first electrodes 32d and the third electrodes 32c are arrayed in a lower row), the outermost electrodes in the electrode row have the highest possibility of being shifted relative to the liquid consuming apparatus electrodes. In other words, if the outermost electrodes in the electrode row are properly positioned relative to the corresponding liquid consuming apparatus electrodes, then the electrodes inside the outermost electrodes in the electrode row also will be properly positioned relative to the corresponding liquid consuming apparatus electrodes.

When the liquid container is mounted to the liquid consuming apparatus, the liquid consuming apparatus initially detects whether or not the liquid container contains the liquid therein. If the liquid container contains the liquid, the liquid consuming apparatus then accesses the liquid container's memory to obtain various types of information from the memory. Therefore, the liquid consuming apparatus accesses, at first, the first electrode 32d and then the third electrode 32c.

In view of these points, it is advantageous to dispose the first electrodes 32d at the outermost ends of the row, as is explained in greater detail below.

In a case in which the liquid consuming apparatus tries to access the first electrodes 32d but cannot access the first electrodes 32d, the liquid consuming apparatus can conclude that the liquid container is not properly positioned relative to the liquid consuming apparatus. Consequently, the liquid consuming apparatus, without accessing the memory, can inform a user of a fact that the liquid container is not properly positioned and can prompt the user to re-mount the liquid container. It is also possible to prevent damaging the memory which might otherwise be caused by the improper access to the memory due to, say, misaligned contacts.

A case in which the liquid consuming apparatus can access the first electrodes 32d located at the outermost ends of the electrode row means that the third electrodes 32c located between the first electrodes 32d are positioned properly, and therefore if the liquid consuming apparatus is arranged to access the third electrodes 32c after the liquid consuming apparatus has accessed the first electrodes 32d, it is possible to prevent the damage of the memory caused by the improper access to the memory through misaligned contacts. In other words, by disposing the first electrodes 32d at the outermost ends of the electrode row, it is possible not only to detect whether or not liquid exists in the liquid container but also to detect whether or not the liquid container is properly positioned relative to the liquid consuming apparatus.

The voltage applied to the first electrodes 32d electrically connected to the terminal plates 45 of the piezoelectric sensor unit 35 is higher than the voltage applied to the third electrode 32c electrically connected to the memory 32f. Therefore, disposing the first electrodes 32dR, 32dL at the outermost ends of the electrode row (i.e. increasing the distance between the first electrodes 32dR, 32dL and the distance between the second electrodes 32eR, 32eL) is also advantageous from the viewpoint of preventing a short-circuit between the first electrodes 32dR, 32dL and between the second electrodes 32eR, 32eL.

In the circuit board according to the present embodiment, each of the second electrodes is larger in area than each of the first electrodes.

The contact between the second electrode 32e and the terminal plate 45 of the sensor unit 35, i.e. the electrical connection therebetween, can be made more reliable by effectively using a space of the second surface (back surface) of the board main body 32M.

In the circuit board according to the present embodiment, the first and third electrodes have the same shape and size.

It is possible to increase the positioning accuracy of the first and third electrodes 32d, 32c relative to the electrodes of the liquid consuming apparatus.

Since the electrodes of the liquid consuming apparatus, which respectively contact the first and third electrodes 32*d*, 32*c* can be made to have the same shape and size, it is possible to decrease manufacturing cost.

In the circuit board according to the present embodiment, the first and third electrodes are arrayed at the same pitch.

Since the electrodes of the liquid consuming apparatus, which respectively contact the first and third electrodes 32*d*, 32*c* can be arrayed at the same pitch, it is possible to decrease manufacturing cost.

The circuit board according to the present embodiment has fourth electrodes 32*c* formed on the first surface of the board main body 32M and electrically connected to the memory 32*f*. The fourth electrodes 32*c* are arrayed in a second row parallel to the first row, and a distance DR2, DL2 between a center line CL32M of the board main body 32M and each of outermost ones of the fourth electrodes 32*d* in the second row is smaller than a distance DR1, DL1 between the center line CL32M of the board main body 32M and each of the first electrodes 32*d*.

In a case in which a number of the electrodes 32*c* electrically connected to the memory 32*f* is large, it is preferable to arrange the electrodes 32*c* in plural electrode rows in order to prevent the distance between the adjacent electrodes 32*c* from becoming too small. In the present embodiment, three electrodes 32*c* are arrayed in the lower row (first row), and four electrodes 32*c* are arrayed in the upper row (second row). In a case in which the electrodes 32*c* are arrayed in plural rows, it is advantageous that not only the third electrodes 32 arrayed in the first row together with the first electrodes 32*d* but also the fourth electrodes 32*c* arrayed in the second row be disposed between the first electrodes 32*d*. This is because by detecting whether or not the first electrodes 32*d* are properly positioned relative to the electrodes 91*c* of the liquid consuming apparatus, it is possible also to detect whether or not the third and fourth electrodes 32*c* in the first and second rows are properly positioned relative to corresponding electrodes of the liquid consuming apparatus.

The circuit board 32 according to the present embodiment has a board main body 32M, a pair of first electrodes 32*d* for electrical connection to the electrodes 91*c* of the liquid consuming apparatus, the first electrodes 32*d* being formed on a first surface of the board main body, a pair of second electrodes 32*e* for electrical connection to the terminal plates 45 of the sensor unit 35, the second electrodes 32*e* being formed on an opposite, second surface of the board main body 32M and electrically connected respectively to the first electrodes 32*d*, a memory 32*f* mounted to the second surface of the board main body 32M, and third electrodes 32*c* formed on the first surface of the board main body 32M and electrically connected to the memory 32*f*. The first electrodes 32*d* and the third electrodes 32*c* are arrayed in a first row, and the first electrodes 32*d* are respectively disposed at the outermost ends of the row.

The pair of electrodes 32*d* for electrical connection to the electrodes 91*c* of the liquid consuming apparatus are formed on the first surface (front surface) of the board main body 32M, and the pair of electrodes 32*e* for electrical connection to the terminal plates 45 of the sensor unit 35 are formed on the opposite, second surface (back surface) of the board main body 32M. Accordingly, since the side on which the electrodes 91*c* of the liquid consuming apparatus are electrically connected to the first electrodes 32*d*, and the side on which the terminal plates 45 are electrically connected to the second electrodes 32*e* can be surely separated from each other by the board main body 32M, the electrical connection between the terminal plates 45 and the second electrodes 32*e* is not adversely affected by the electrical connection between the electrodes 91*c* of the liquid consuming apparatus and the electrodes 32*d*.

By disposing the first electrodes 32*d* at the outermost ends of the electrode row, it is possible not only to detect whether or not the liquid exists in the liquid container but also to detect whether or not the liquid container is properly positioned relative to the liquid consuming apparatus.

It is also advantageous to dispose the first electrodes 32*d* at the outermost ends of the electrode row to prevent short-circuiting between the first electrodes 32*d* and between the second electrodes 32*e*.

The liquid container (ink cartridge) 21 according to the present embodiment includes a main body 31 which accommodates liquid (ink) therein and which preferably has a substantially parallelepiped shape, a board 32 having an output terminal 32*d* for outputting an electric signal to an apparatus (printer) to which the liquid container is mountable, and a sensor 35 which is disposed close to a surface of the main body 31 (front surface) having the board 32 thereon and which can output the electric signal through the output terminal 32*d* of the board 32 to the apparatus. The electric signal is indicative of whether or not the liquid is consumed up to a point where the sensor 35 is disposed.

For example, when the main body 31 has the substantially parallelepipedal shape having a first surface (front surface) and a second surface (back surface) opposite to the first surface, the sensor 35 is disposed at a location closer to the first surface on which the board 32 is disposed than to the second surface. The sensor 35 outputs, through the output terminal 32*d* of the board 32, an electric signal corresponding to an amount of the liquid.

By this arrangement, a transmission path for the electric signal from the sensor 35 to the board can be shortened, and therefore even if the sensor 35 is disposed on the liquid container 21, the size of the liquid container can be kept small. Accordingly, the size of the apparatus (the carriage 91 and thus the printer 81) can be kept small regardless of whether or not the sensor 35 is mounted to the liquid container 21.

In the liquid container according to the present embodiment, the sensor 35 detects the amount of liquid existing in a portion of a liquid flow path (liquid supply path) between a liquid accommodating portion (ink accommodating portion) 61 and a liquid supply port (ink outlet) 31*b*, and the liquid supply port 31*b* and the sensor 35 are located close to the surface (front surface) on which the board is disposed. The sensor 35 is located closer to the front surface than is the liquid supply port 31*b*.

By this arrangement, not only the electric signal transmission path from the sensor 35 to the board 32 but also the liquid flow path from the liquid accommodating portion 61 through the sensor 35 to the liquid supply port 31*b* can be shortened, and therefore even if the sensor 35 is disposed on the liquid container 21, the size of the liquid container can be reduced. Accordingly, the size of the apparatus (the carriage 91 and thus the printer 81) can be kept small regardless of whether or not the sensor 35 is mounted to the liquid container 21.

In the liquid container according to the present embodiment, a check valve 62 is disposed in a portion of the ink supply path between the liquid accommodating portion 61 and the liquid supply port 31*b* to prevent a reverse flow of the liquid. The sensor 35 detects the amount of the liquid in the portion of the liquid supply path between the ink accommodating portion 61 and the check valve 62, and the check valve 62 and the sensor 35 are both disposed close to the surface (front surface) on which the board 32 is disposed. The sensor 35 is located closer to the front surface than is the check valve 62.

By this arrangement it is possible to shorten both the electric signal transmission path from the sensor 35 to the board 32 and also the liquid flow path from the liquid accommodating portion 61 through the sensor 35 and the check valve 62 to the liquid supply port 31*b*. Therefore, even if the sensor 35 is disposed on the liquid container 21, the size of the liquid container can be kept small. Accordingly, the size of the apparatus (the carriage 91 and thus the printer 81) can be reduced regardless of whether or not the sensor 35 is mounted to the liquid container 21.

In the liquid container according to the present embodiment, a lever 31*a* is provided, which is operated when the liquid container 21 is mounted to and removed from the apparatus (the carriage 91 of the printer 81), and which can engage the apparatus (the carriage 91). The lever 31*a* and the board 21 are provided on the same surface of the main body 31, and the sensor 35 is disposed close to the surface on which the lever 31*a* and the board 32 are provided.

By this arrangement, the engagement of the lever 31*a* contributes to more accurately positioning of the board 32 provided on the same surface.

The liquid container 21 according to the present embodiment is mountable to the carriage 91 of the apparatus (printer) 81, and the sensor 35 is disposed close to a surface that is the closest surface of the main body 31 to an encoder board 51 fixed to the carriage 91 when the liquid container 21 is mounted to the carriage 91.

By this arrangement, the distance from the sensor 35 through the board 32 to the encoder board 51 can be reduced, and therefore even if the sensor 35 is disposed on the liquid container 21, the size of the liquid container can be kept small.

In the liquid container according to the present embodiment, the board 32 has a memory 32*f* that can store data concerning the amount of liquid consumed from the main body 31 or the amount of liquid remaining in the main body 31, and a memory terminal 32*c* for both reading the data from and writing the data to the memory 32*f*.

By this arrangement, the board can be used commonly for mounting the memory thereon and outputting the electric signal of the sensor 35 therefrom, and therefore even if the sensor 35 is disposed on the liquid container 21, the size of the liquid container can be kept small. Accordingly, the size of the apparatus (the carriage 91 and thus the printer 81) can be kept small regardless of whether or not the sensor 35 is mounted to the liquid container 21.

The liquid container 21 according to the present embodiment includes a sensor 35 a cover member 33, and a board 32. The sensor 35 can outputs an electric signal corresponding to an amount of liquid. The cover member 33 covers at least a part of the sensor 35 attached to the main body 31 of the container 21. The board 32 is fixed to the cover member 33 and has a terminal 32*d* for outputting the electric signal of the sensor 35.

This arrangement is simple but can realize both the output of the electric signal from the sensor 35 through the board 32 and the isolation of the sensor 35 from the ambient environment. Accordingly, it is possible to eliminate erroneous operation and damage to the sensor 35 which could be caused by dust, liquid mist (ink mist), etc. In addition, even in a case in which an electric or electronic device different from the sensor 35 is disposed in place of the sensor 35, it is similarly possible to eliminate erroneous operation of and damage to the equipment.

In the liquid container according to the present embodiment, the board 32 covers at least a part of a portion of the sensor 35, which portion is not covered by the cover member 33. For example, in the present embodiment, the cover member 33 has an insertion hole 33*h*1, and a portion of the sensor 35 corresponding to this insertion hole 33*h*1 is covered by the board 32.

By this arrangement, the sensor 35 can be isolated from the ambient environment, and therefore it is possible to eliminate erroneous operation and damage to the sensor 35 that could be caused by dust, liquid mist (ink mist), etc.

In the liquid container according to the present embodiment, the sensor 35 is disposed in a sensor accommodating recess portion 31*c* formed in the main body 31, and the cover member 33 is fixed to an open end of the sensor accommodating recess portion 31*c* (i.e. to the front surface of the main body 31).

By this arrangement, the sensor 35 can be isolated from the ambient environment, and therefore it is possible to eliminate erroneous operation and damage of the sensor 35 that could be caused by dust, liquid mist (ink mist), etc.

In the liquid container according to the present embodiment, independently of the cover member 33 and the board 32, the sensor 35 is attached to the main body 31 through a spring 36 and a seal 44, each of which functions as an elastic member.

By this arrangement, the sensor 35 is not rigidly fixed relative to the cover member 33 and/or the board 32 that are contacted by an apparatus (printer) 81 to which the liquid container 21 is mountable. Accordingly, even in a case in which the sensor 35 employs a dynamic effect such as a piezoelectric element, it is possible to obtain an accurate detection signal corresponding to an amount of liquid.

In the liquid container according to the present embodiment, the board 32 has a memory 32*f* that can store data reflecting an amount of the liquid consumed from the main body 31 or an amount of liquid remaining in the main body 31, and a memory terminal 32*c* for reading the data from and writing the data to the memory 32*f*.

By this arrangement, the board can be used commonly for outputting the electric signal of the sensor 35 therefrom and mounting thereon the memory 32*f* capable of storing the data reflecting the consumed or remaining liquid amount, and therefore without any increase in the number of boards mounted to the liquid container, it is possible to output the electric signal of the sensor 35.

In the liquid container according to the present embodiment, the cover member 33 is disposed between the sensor 35 and the board 32, and has an insertion hole 33*h*1 into which a part of the sensor 35 (an electrode terminal 45 of the sensor 35). In addition, in a case in which a different conductor member or another conductor member is used to electrically connect the sensor 35 to the board 32, the conductor member may be inserted into the insertion hole 33*h*1 for electrical connection therebetween.

By this arrangement, the electric signal path can be disposed within the hole 33*h*1, and therefore more area of the sensor 35 can be covered, and the sensor 35 can be better isolated from the ambient environment. It is possible to eliminate erroneous operation and damage to the sensor 35 which could be caused by dust, liquid mist (ink mist), etc.

The sensor assembly according to the present embodiment includes a sensor 35 attachable to a main body 31 of a liquid container (ink cartridge) 21 and capable of outputting an electric signal depending on an amount of liquid (ink) a cover member 33 for covering at least a part of the sensor 35, the cover member 33 having a connection portion 33*a* that can be fixed to the main body 31, and a board 32 fixed to the cover member 33, the board 32 having a terminal 32*d* for outputting the electric signal of the sensor 35.

This arrangement is simple but can realize both the output of the electric signal from the sensor 35 through the board 32 and the isolation of the sensor 35 from the ambient environment. Accordingly, it is possible to eliminate erroneous operation and damage to the sensor 35 which could be caused by dust, liquid mist (ink mist), etc.

The sensor assembly according to the present embodiment includes a sensor 35 attachable to a main body 31 of a liquid container (ink cartridge) 21 and capable of outputting an electric signal depending on an amount of liquid (ink) and a board 32 for covering at least a part of the sensor 35, the board 32 having a terminal 32*d* for outputting the electric signal from the sensor 35.

This arrangement is simple but can realize both the output of the electric signal from the sensor 35 through the board 32 and the isolation of the sensor 35 from the ambient environment. Accordingly, it is possible to eliminate erroneous operation and damage of the sensor 35 caused due to dust, liquid mist (ink mist), etc.

The cover according to the present embodiment includes a cover member 33 having a connection portion 33*a* that can be fixed to a main body 31 of a liquid container (ink cartridge) 21, the cover member 33 being configured to cover at least a part of an electric or electronic equipment 35 attached to the main body 31 when the connection portion 33*a* is fixed the main body 31 and a board 32 fixed to the cover member 33, the board 32 having a terminal 32*d* for outputting the electric signal from the equipment 35.

This arrangement is simple but can realize both the output of the electric signal from the electric or electronic equipment 35 and the isolation of the equipment 35 from the ambient environment. Accordingly, it is possible to eliminate erroneous operation and damage of the equipment 35 caused due to dust, liquid mist (ink mist), etc.

A liquid container (ink cartridge) 21 according to the present embodiment includes a sensor 35, a cover member 33 and a board 32. The sensor 35 outputs an electric signal corresponding to an amount of liquid (ink). The cover 33 covers at least a part of the sensor 35 attached to a main body 31 of the liquid container. The board 32 is fixed to the cover member 33, and has an input terminal 32*e* on one surface (back surface) thereof, which is contacted by an electrode terminal 45 and to which an electric signal of the sensor 35 is input, and an output terminal 32*d* on another surface (front surface) thereof, from which the electric signal of the sensor 35 is output.

This arrangement is simple but can establish an electrical connection between the sensor 35 and the liquid container side contact terminal (i.e. the output terminal 32*d* of the board 32) provided for outputting the electric signal of the sensor 35 because the electrode terminal 45 of the sensor 35 directly contacts the input terminal 32*e* of the board 32 having the output terminal 32*d*. Further, since the input terminal is provided on a surface different from a surface on which the output terminal is provided, it is possible to increase the area of the input terminal contacted by the sensor, and therefore it is possible to increase assembly tolerances of the sensor and the board.

In the liquid container according to the present embodiment, the input terminal 32*e* of the board 32 is electrically connected to the output terminal 32*d* through a through hole TH extending between the back surface of the board main body 32M and the front surface thereof.

By this arrangement, since the input terminal 32*e* and the output terminal 32*d* are electrically connected to each other through the interior of the board main body 32M, the input terminal 32*e* and the output terminal 32*d* can be electrically connected to each other without any increase in the number of component parts.

In the liquid container according to the present embodiment, each input terminal 32*e* of the board 32 at least in part overlaps with the corresponding output terminal 32*d* as viewed in a direction perpendicular to the back surface and the front surface of the board main body 32M.

By this arrangement, the length of the circuit between the input terminal 32*e* on the back surface and the output terminal 32*d* on the front surface can be shortened.

In the liquid container according to the present embodiment, each input terminal 32*e* on the back surface of the board 32 is larger in area than each output terminal 32*d* on the front surface thereof.

By this arrangement, even if the contact point between the sensor 35 and the board 32 is shifted, the contact therebetween can be maintained, and therefore it is possible to tolerate assembly errors in the sensor 35 and the board 32 in comparison to any positioning error of the liquid container (ink cartridge) 21 relative to the apparatus (printer) 81.

The sensor assembly according to the present embodiment includes a sensor 35 having a sensor output terminal for outputting an electric signal depending on an amount of liquid (ink) when the sensor is attached to a main body 31 of a liquid container (ink cartridge), a cover member 33 which has a connection portion 33*a* configured to be fixed to the main body 31 and which covers at least a part of the sensor 35, and a board 32 fixed to the cover member 33. The board 32 has an input terminal 32*e* on one surface (back surface) thereof, which is contacted by the sensor output terminal 45 and to which an electric signal of the sensor 35 is input, and an output terminal 32*d* on another surface (front surface) thereof, from which the electric signal of the sensor 35 is output.

This arrangement is simple but can establish an electrical connection between the sensor 35 and the liquid container side contact terminal (i.e. the output terminal 32*d* of the board 32) provided for outputting the electric signal of the sensor 35 because the sensor output terminal 45 of the sensor 35 directly contacts the input terminal 32*e* of the board 32 having the output terminal 32*d*. Further, since the input terminal 32*e* is provided on a surface different from the surface on which the output terminal 32*d* is provided, it is possible to increase the area of the input terminal 32*e* contacted by the sensor 35, and therefore it is possible to increase assembly tolerances of the sensor 35 and the board 32.

The board for the liquid container according to the present embodiment includes a board main body 32M, an input terminal 32*e* on one surface (back surface) of the board main body 32M, which can be contacted by a terminal 45 of an electric or electronic sensor 35 attached to the liquid container and to which an electric signal of the sensor 35 can be input, and an output terminal 32*d* on another surface (front surface) of the board main body 32M, from which the electric signal of the sensor 35 can be output.

This arrangement is simple but can establish an electrical connection between the sensor 35 and the liquid container side contact terminal (i.e. the output terminal 32*d* of the board 32) provided for outputting the electric signal of the sensor 35 because the terminal 45 of the sensor 35 directly contacts the input terminal 32*e* of the board 32 having the output terminal 32*d*. Further, since the input terminal 32*e* is provided on a surface different from a surface on which the output terminal 32*d* is provided, it is possible to increase the area of the input terminal 32*e* contacted by the sensor 35, and therefore it is possible to increase assembly tolerances of the sensor 35 and the board 32.

The board according to the present embodiment includes a memory mounted to the board main body 32M, and a memory terminal 32*c* which is formed on the other surface (front surface) having the output terminal thereon and which is for data input and/or data output.

By this arrangement, the board 32 can be used commonly for signal transmission to and from the sensor 35 and for mounting the memory (such as a memory for storing data on liquid consumed amount or the like), and therefore without increase of the number of the board, the output signal of the sensor 35 can be output from the liquid container.

The liquid container (ink cartridge) 21 according to the present embodiment includes a main body accommodating ink therein, a board 32 and a cover member (board attaching member) 33. The board 32 has a terminal for an input signal and/or an output signal of an electric or electronic equipment (a memory 32, and/or a sensor 35) attached to the container 21. The board 21 is attached to a fixing surface of the cover member 33, and the cover member 33 has a pawl 33*a* serving as a fitting portion provided on a surface opposite to the fixing surface. The cover member 33 is fixed to the main body 31 by the fitting portion such as the pawl 33*a*. The cover 33 serves as the board attaching member.

By this arrangement, the cover member 33 and thus the board 32 are fixed to the main body 31 by the fitting portion such as the pawl 33*a* which is provided on the surface of the cover member 33 opposite to the board surface contacted by a contact terminal 91*c* of an apparatus (printer) 91. Therefore, the contact terminal 91*c* does not contact a thermally caulked portion or the like, and it is possible to suppress the generation of cut resin particles or debris caused as a consequence of the contact by the contact terminal 91*c*. Accordingly, a risk of electrical contact error between the apparatus 91 and the liquid container 21 can be reduced.

The cover member 33 having the board 32 thereon may be attached to the main body 31 in the following matter. That is, after the cover member 33 is temporarily retained on the main body 31 against an elastic force of an electrode terminal 45 of the sensor 35 by fitting the pawl 33*a* to the main body 31, the cover member 33 is completely fixed to the main body 31 by thermal caulking using a hole 33*b* and a shaft 31*d*. This can simplify a jig for fixing the cover 33 having the board 32 thereon to the main body 31.

In the liquid container according to the present embodiment, one end side of the cover member 33 is fixed by thermal caulking using the hole 33*b* and the shaft 31*d*, and the other end side of the cover member 33 is fixed by the pawl 33*a*.

By this arrangement, one end side of the cover member 33 can be simply and firmly fixed by thermal caulking, and the other end side of the cover member 33 does not have to be attached by thermal caulking. Accordingly, during the process of mounting the liquid container (ink cartridge) 21 to the apparatus (printer) 81 in which the contact terminal 91*c* of the apparatus advances from the other end side and is finally positioned and brought into contact with the terminal 32*c* of the board 32, the contact terminal 91*c* does not contact a thermally caulking portion or the like. For this reason, it is possible to suppress the generation of cut resin particles or debris caused as a consequence of the contact by the contact terminal 91*c*, and it is possible to reduce a risk of electrical contact error between the apparatus 91 and the liquid container 21.

In the liquid container according to the present embodiment, the pawl 33*a* of the cover member 33 is located at a position closer to the other end of the cover member 33 than to the one end (thermal caulking side) of the cover member 33.

By this arrangement, since the distance can be increased between a position where the thermal caulking is applied and a position where the pawl 33*a* is fitted, the cover member 33 can be firmly fixed to the main body 31.

In the liquid container according to the present embodiment, the board 32 is fixed, by thermal caulking, to the one end side of the cover member 33, which is the same one side where the cover member 33 is fixed to the main body 31 by thermal caulking. For example, the board 32 is fixed to the cover member 33 by thermal caulking using a protruded portion 33*f* located in the vicinity of the hole 33*b*.

By this arrangement, thermally caulked portions on the cover member 33 and the main body 31 are located only on the upper side, and the lower side uses the pawl 33*a* and a side cover 34 to avoid the need for thermal caulking.

Also, by this arrangement, one end side of the board 32 can be simply and firmly fixed by thermal caulking, and the other end side of the board 32 does not need thermal caulking. Accordingly, during the process of mounting the liquid container (ink cartridge) 21 to the apparatus (printer) 81 in which the contact terminal 91*c* of the apparatus advances from the other end side and is finally positioned and brought into contact with the terminal 32*c*, 32*d* of the board 32, the contact terminal 91*c* does not contact a thermally caulked portion or the like. For this reason, it is possible to suppress the generation of cut resin particles or debris caused as a consequence of the contact by the contact terminal 91*c*, and it is possible to reduce a risk of electrical contact error between the apparatus 91 and the liquid container 21.

In the liquid container according to the present embodiment, the board 32 is fixed to the cover member 33 so that the terminal 32*c*, 32*d* are located closer to the other end of the cover member 33 than to the end of the cover member 33 that is thermally caulked.

By this arrangement, during the process of mounting the liquid container (ink cartridge) 21 to the apparatus (printer) 81 in which the contact terminal 91*c* of the apparatus advances from the other end side and is finally positioned and brought into contact with the terminal 32*c*, 32*d* of the board 32, a traveling length or contact length of the contact terminal 91*c* relative to the liquid container 21 can be shortened. For this reason, it is possible to suppress the generation of cut resin particles or debris caused as a consequence of the contact by the contact terminal 91*c*, and it is possible to reduce the risk of electrical contact error between the apparatus 91 and the liquid container 21.

The board attaching member 33 for the liquid container 21 according to the present embodiment includes a fixing portion 33*f* for fixing a board 32 having a terminal 32*c*, 32*d* for signal input and/or signal output of an electric or electronic equipment attached to the liquid container 21 and a fitting portion 33*a* for fitting to the liquid container 21, the fitting portion being provided on a surface opposite to a surface on which the fixing portion is provided.

By this arrangement, the board attaching member 33 is fixed to the liquid container 21 by the fitting portion 33*a* which is provided on the surface of the board attaching member 33 opposite to the board surface contacted by a contact terminal 91*c* of an apparatus (printer) 91. Therefore, the contact terminal 91*c* does not contact a thermally caulked portion or the like, and it is possible to suppress the generation of cut resin particles or debris caused as a consequence of the contact by the contact terminal 91*c*. Accordingly, a risk of electrical contact error between the apparatus 91 and the liquid container 21 can be reduced.

In the board attaching member 33 according to the present embodiment, a hole 33*b* is provided at one end side for thermal caulking and the fitting portion 33*a* is provided at the other end side.

By this arrangement, one end side of the board attaching member 33 can be simply and firmly fixed by thermal caulking, and the other end side of the board attaching member 33 does not require thermal caulking. Accordingly, during the process of mounting the liquid container (ink cartridge) 21 to the apparatus (printer) 81 in which the contact terminal 91*c* of the apparatus advances from the other end side and is finally positioned and brought into contact with the terminal 32*c*, 32*d* of the board 32, the contact terminal 91*c* does not contact a thermally caulked portion or the like. For this reason, it is possible to suppress the generation of cut resin particles or debris caused as a consequence of the contact by the contact terminal 91*c*, and it is possible to reduce a risk of electrical contact error between the apparatus 91 and the liquid container 21.

The aforementioned embodiment is an example of the present invention, and therefore the present invention should not be restricted thereto or thereby, and can be embodied with various modifications and changes without departing from the spirit of the present invention.

By way of non-limiting example, in the present embodiment, an adhesive agent may be used in place of thermal caulking for fixing members to each other.

In the present embodiment, the electrode terminal 45 of the sensor 35 directly contacts the terminal 32*e* on the back surface of the board 32 to electrically connect the sensor 35 to the board 32. In place of this arrangement, an intermediate electrically conductive member, such as a lead wire, may be used for electrical connection, and/or the board 32 and the sensor 35 may be electrically connected to each other on the front surface of the board 32.

In the present embodiment, the board 32, the cover member 33 and the sensor 35 may be constructed to form an assembly (unit) that is discrete from the container main body 31 and that is attachable, as one unit, to the container main body 31. Similarly, the board 32 and the sensor 35 may be constructed to form an assembly (unit). In a case in which the cover member 33 is not required, the board 32 may be directly fixed to the container main body 31.

In the present embodiment, the board 32 and the cover member 33 may be configured to cover an electric or electronic equipment such as the sensor 35.

In the present embodiment, in place of the sensor 35, a sensor of a different system may be used. For example, in place of the sensor 35 that can detect whether or not the liquid is present, a sensor that can detect a remaining amount or a consumed amount of liquid as continuous values may be used.

The various arrangements including but not limited to the arrangement of the board 32, etc. as discussed above can be used not only for a case in which the sensor 35 is provided to the liquid container 21 but also for a case in which an electric or electronic equipment other than the sensor 35 is provided to the liquid container 21.

In the present embodiment, the protruded portion (pawl 33*a*) is provided to the cover member 33 and the recess portion 31*h* is provided to the container main body 31 in order to fit the cover member 33 to the container main body 31, but the recess portion may be provided to the cover member 33 and the protruded portion may be provided to the container main body 31 for fitting.

In the present embodiment, sensor 35 has been shown located in the ink path between the ink accommodating portion 61 and the check valve 62. It will be appreciated that other arrangements could be employed. By way of non-limiting example, the sensor 35 could be located in the ink path between the check valve 62 and the ink supply port 31*b*.

This invention is not to be limited to the check valve described herein; any suitable structure for regulating ink flow can be used.

Also, the discussion of the location of the sensor 35 is equally applicable to the first embodiment of the invention.

In the present embodiment, the printer 81 to which the ink cartridge 21 is mountable is not limited to one of the type illustrated in FIG. 13, and may be constructed such that the ink cartridge 21 is mountable to a portion of the printer within a printer housing but other than the carriage, and tubing or the like is used to supply ink from the ink cartridge 21 to an ink ejection head of the carriage.

The sensor unit according to the present invention is not limited to specific structure discussed with reference to the sensor unit 35, 200. For example, the plate 42 or sensor base 220 may be modified or omitted, the lower housing 43 or unit base 210 may be modified or omitted, and so on.

INDUSTRIAL APPLICABILITY

The present invention is applicable to a liquid container for a liquid consuming apparatus, and also to a circuit board for the liquid container. Typical examples of a liquid consuming apparatus include an ink jet type recording apparatus. Examples of other liquid consuming apparatuses include an apparatus comprising a coloring material ejecting head to be used for manufacturing a color filter of a liquid crystal display, an apparatus comprising an electrode material (conducting paste) ejecting head to be used for forming an electrode of an organic EL display or a field emission display (FED), an apparatus comprising a bioorganism ejecting head to be used for manufacturing a biochip, and an apparatus comprising a sample ejecting head serving as a precision pipette.

The invention claimed is:

1. A liquid container adapted to be removably mounted to a liquid consuming apparatus, the liquid container comprising:

- a container body having a liquid accommodating portion to accommodate a liquid therein, a liquid supply port from which the liquid can be discharged to the liquid consuming apparatus, and a liquid supply path providing fluid communication between the liquid accommodating portion and the liquid supply port;
- an outer electrode contactable with an electrode of the liquid consuming apparatus;
- an electrode supporting member which supports the outer electrode and is fixed to the container body;
- a piezoelectric sensor unit distinct from the electrode supporting member and which is attached to the container body and detects if the liquid is present in a part of the liquid supply path and which includes a piezoelectric element having an electrode; and
- an elastic connector which electrically connects the outer electrode to the electrode of the piezoelectric element.

2. The liquid container according to claim 1, further comprising:

- a deformable seal member disposed between the piezoelectric sensor unit and a wall of the container body;

an urging member that urges the piezoelectric sensor unit toward the wall of the container body, wherein the piezoelectric sensor unit is attached to the container body by the seal member and the urging member.

3. The liquid container according to claim 2, wherein the urging member is a coil spring.

4. The liquid container according to claim 2, wherein the elastic connector is elastically deformable in a direction substantially perpendicular to a direction in which the urging member urges the piezoelectric sensor unit.

5. The liquid container according to claim 1, wherein:

the outer electrode receives a force in a first direction from the electrode of the liquid consuming apparatus when the outer electrode contacts the electrode of the liquid consuming apparatus, the elastic connector is elastically deformable in a second direction, and the first direction is substantially parallel to the second direction.

6. The liquid container according to claim 5, further comprising:

a deformable seal member disposed between the piezoelectric sensor unit and a wall of the container body;

an urging member that urges the piezoelectric sensor unit toward the wall of the container body in a third direction substantially perpendicular to the second direction, wherein the piezoelectric sensor unit is attached to the container body by the seal member and the urging member.

7. The liquid container according to claim 1, wherein:

the container body has a recess dimensioned to accommodate the piezoelectric sensor unit, the recess having an opening; and the electrode supporting member at least partially closes the opening of the recess.

8. The liquid container according to claim 1, wherein:

the container body includes a first wall and an opposing second wall;

the liquid supply port is disposed at an offset position closer to the first wall than to the second wall; and the piezoelectric sensor unit is, disposed at an offset position closer to the first wall than to the second wall.

9. The liquid container according to claim 8, wherein:

the piezoelectric sensor unit is disposed between the liquid supply port and the first wall in a horizontal direction in which the first wall and the second wall are opposed to each other.

10. The liquid container according to claim 9, wherein:

the container body includes a top wall and a bottom wall having the ink supply port; and the piezoelectric sensor unit is disposed at an offset position closer to the bottom wall than to the top wall.

11. The liquid container according to claim 10, wherein:

the container body has a recess; and the piezoelectric sensor unit is accommodated in the recess of the container body.

12. The liquid container according to claim 11, wherein:

the recess has an opening, and the opening of the recess is at least partially closed by the electrode supporting member, the electrode support member being fixed to the first wall of the container body.

13. The liquid container according to claim 1, wherein:

the container body includes, a first wall, an opposing second wall, and a lever having an engagement portion located closer to the first wall than to the second wall and displaceable toward and away from the first wall for engagement with the liquid consuming apparatus;

the liquid supply port is disposed at an offset position closer to the first wall than to the second wall; and the piezoelectric sensor unit is disposed at an offset position closer to the first wall than to the second wall.

14. The liquid container according to claim 13, wherein:

the piezoelectric sensor unit is disposed between the liquid supply port and the engagement portion in a horizontal direction in which the first wall and the second wall are opposed to each other.

15. The liquid container according to claim 14, wherein:

the piezoelectric sensor unit is disposed between the liquid supply port and the engagement portion in a vertical direction perpendicular to the horizontal direction.

16. The liquid container according to claim 15, wherein:

the container body has a recess; and the piezoelectric sensor unit is accommodated in the recess of the container body.

17. The liquid container according to claim 16, wherein:

the recess has an opening, and the opening of the recess is at least partially closed by the electrode supporting member, the electrode supporting member being fixed to the first wall of the container body.

18. The liquid container according to claim any one of claims 1 to 17, further comprising:

an inner electrode which is electrically connected to the outer electrode and which is supported by the electrode supporting member, wherein the elastic connector contacts the inner electrode for electrical connection to the outer electrode.

19. The liquid container according to claim 18, wherein:

the elastic connector includes an elastic terminal plate;

the elastic terminal plate is attached to the piezoelectric sensor unit and electrically connected to the electrode of the piezoelectric element; and the elastic terminal plate contacts the inner electrode for electrical connection between the outer electrode and the electrode of the piezoelectric element.

20. The liquid container according to claim 19, wherein:

the elastic terminal plate is displaceable relative to the inner electrode while still maintaining contact with the inner electrode.

21. The liquid container according to claim 20, wherein:

the electrode supporting member includes a circuit board that has a first surface on which the outer electrode is disposed and an opposite, second surface on which the inner electrode is disposed, and the circuit board is fixed to the container body so that the second surface is located between the first surface and the piezoelectric sensor unit.

22. The liquid container according to claim 21, wherein:

the electrode supporting member further includes a circuit board receptacle that supports the circuit board, and the circuit board is secured in the circuit board receptacle.

23. The liquid container according to claim 22, wherein:

the circuit board receptacle has a through-hole into which a protruded portion of the elastic terminal plate is inserted to contact the inner electrode of the circuit board.

24. The liquid container according to claim 23, wherein:

the through-hole is dimensioned to provide clearance between the through-hole and the protruded portion so that the protruded portion is displaceable relative to the through-hole without contacting with the through-hole.

25. The liquid container according to claim 23, wherein: the through-hole is at least partially covered by the circuit board.

26. The liquid container according to claim 22, wherein: the circuit board supporting receptacle has a protruded engagement portion; and the container body has an engagement recess portion for mating engagement with the protruded engagement portion when the circuit board supporting receptacle is mounted to the container body.

27. The liquid container according to claim 21, further comprising:

a memory mounted to the second surface of the circuit board; and a memory electrode electrically connected to the memory and disposed on the first surface of the circuit board.

28. The liquid container according to claim 1, further comprising a fluid flow regulator disposed in the liquid supply path, and wherein the piezoelectric sensor unit is disposed in the liquid supply path between the fluid flow regulator and the liquid supply path.

29. The liquid container according to claim 28, wherein the fluid flow regulator is a check valve.

30. The liquid container according to claim 1, wherein the liquid container is an ink cartridge.

31. A liquid container adapted to be removably mounted to a liquid consuming apparatus, the liquid container comprising:

a container body having a liquid accommodating portion for accommodating liquid therein, and a liquid supply port from which the liquid can be discharged to the liquid consuming apparatus;

an outer electrode contactable with an electrode of the liquid consuming apparatus;

an electrode supporting member which supports the outer electrode and is fixed to the container body;

a sensor unit which is discrete from the electrode supporting member, is attached to the container body and includes an electrode; and a connector which has an elasticity and which electrically connects the outer electrode to the electrode of the sensor.

32. A liquid container according to claim 31, wherein the container body has a liquid supply path which is in fluid communication with the liquid accommodating portion and the liquid supply port; and the sensor is for detecting liquid in a part of the liquid supply path.

33. A liquid container according to claim 31 or claim 32, wherein the sensor unit is a piezoelectric sensor unit.

34. A liquid container according to claim 31, wherein:

the outer electrode receives a force from the electrode of the liquid consuming apparatus in a first direction when the outer electrode contacts the electrode of the liquid consuming apparatus, the connector is elastically deformable in a second direction, and the first direction is the same as or substantially parallel to the second direction.

35. A liquid container according to claim 31, further comprising:

a deformable seal member disposed between the sensor unit and a wall of the container body; and an urging member that urges the sensor unit toward the wall of the container body, wherein the sensor unit is attached to the container body through the seal member and the urging member.

36. A liquid container according to claim 35, wherein the connector is elastically deformable in a direction substantially perpendicular to a direction in which the urging member urges the sensor unit.

37. A liquid container according to claim 31, wherein:

the sensor unit is accommodated in a recess of the container body.

38. A liquid container according to claim 37, wherein:

an opening of the recess is closed by the electrode supporting member.

39. A liquid container according to claim 31, wherein:

the container body includes: a first wall; and an opposite, second wall;

the liquid supply port is disposed at an offset position closer to the first wall than to the second wall.

40. A liquid container according to claim 39, wherein the sensor unit is disposed at an offset portion closer to the first wall than to the second wall.

41. A liquid container according to claim 39, wherein:

the sensor unit is disposed between the liquid supply port and the first wall in a horizontal direction in which the first wall and the second wall are opposed to each other.

42. A liquid container according to claim 39, wherein:

the container body includes a lever having an engagement portion located closer to the first wall than to the second wall and displaceable toward and away from the first wall for engagement with the liquid consuming apparatus; and the sensor unit is disposed at an offset portion closer to the first wall than to the second wall.

43. A liquid container according to claim 42, wherein:

the sensor unit is disposed between the liquid supply port and the engagement portion in a horizontal direction in which the first wall and the second wall are opposed to each other.

44. A liquid container according to claim 43, wherein:

the sensor unit is disposed between the liquid supply port and the engagement portion in a vertical direction perpendicular to the horizontal direction.

45. A liquid container according to claim 39, wherein the electrode supporting member is fixed to the first wall.

46. A liquid container according to claim 31, wherein:

the container body includes a top wall and a bottom wall having the ink supply port; and the sensor unit is disposed at an offset position closer to the bottom wall than to the top wall.

47. A liquid container according to claim 31, further comprising:

an inner electrode which is electrically connected to the outer electrode and which is supported by the electrode supporting member, wherein the connector contacts the inner electrode for electrical connection to the outer electrode.

48. A liquid container according to claim 47, wherein:

the connector includes an elastic terminal plate;

the elastic terminal plate is attached to the sensor unit and electrically connected to a sensing element of the sensor unit; and the elastic terminal plate contacts the inner electrode for electrical connection between the outer electrode and an electrode of the sensing element.

49. A liquid container according to claim 48, wherein:

the elastic terminal plate is displaceable relative to the inner electrode while maintaining contact with the inner electrode.

50. A liquid container according to claim 48, wherein:

the electrode supporting member includes a circuit board that has a first surface on which the outer electrode is formed and an opposite, second surface on which the inner electrode is formed, and the circuit board is fixed to the container body so that the second surface is located between the first surface and the sensor unit.

51. A liquid container according to claim 50, wherein:

the electrode supporting member further includes a circuit board supporting member that supports the circuit board, and the circuit board is fixed to the container body through the circuit board supporting member.

52. A liquid container according to claim 51, wherein:

the circuit board supporting member has a through-hole into which a protruded portion of the elastic terminal plate is inserted for contact with the inner electrode of the circuit board.

53. A liquid container according to claim 52, wherein:

a clearance is provided between the through-hole and the protruded portion so that the protruded portion is displaceable relative to the through-hole without contacting with the through-hole.

54. A liquid container according to claim 52, wherein:

the through-hole is covered by the circuit board.

55. A liquid container according to claim 51, wherein:

the circuit board supporting member has a protruded engagement portion;

the container body has a mating engagement recess portion for engagement with the protruded engagement portion when the circuit board supporting member is disposed in place with respect to the container body.

56. A liquid container according to claim 50, further comprising:

a memory mounted to the second surface of the circuit board; and a memory electrode electrically connected to the memory and formed on the first surface of the circuit board.

57. A liquid container according to claim 31, wherein the liquid accommodating portion accommodates liquid.

58. A liquid container according to claim 31, wherein the liquid container is an ink cartridge.

59. A method of manufacturing a liquid container, comprising the steps of:

providing a container body having a liquid accommodating portion for accommodating liquid therein, and a liquid supply port from which the liquid can be discharged to the liquid consuming apparatus;

mounting a sensor unit provided with an electrode in a recess formed in the container body; and mounting an electrode supporting member supporting an outer electrode to the container body so as to cover the recess, thereby electrically connecting the electrode of the sensor unit to the outer electrode of the electrode supporting member.

60. A method according to claim 59, further comprising, before or after mounting the electrode supporting member, filling the liquid accommodating portion with ink.

61. A method according to claim 59, wherein the sensor unit and the connector are mounted to the liquid container as a single unit.

62. A method according to claim 61, wherein the electrode supporting member is included in the single unit.

* * * * *